United States Patent [19]
Aknin et al.

[11] Patent Number: 5,364,271
[45] Date of Patent: Nov. 15, 1994

[54] BICYCLE AND MOTORCYCLE RIDING SIMULATION SYSTEM

[75] Inventors: Jack Aknin, San Carlos; Wade Winblad, Hayward; Dennis Harper, Campbell, all of Calif.

[73] Assignee: Atari Games Corporation, Milpitas, Calif.

[21] Appl. No.: 956,035

[22] Filed: Oct. 2, 1992

Related U.S. Application Data

[63] Continuation-in-part of Ser. No. 670,268, Mar. 13, 1991, Pat. No. 5,240,417.

[51] Int. Cl.⁵ .......................... G09B 9/04; G09B 19/16
[52] U.S. Cl. ......................................... 434/61; 434/29; 273/148 B; 273/438; 364/410
[58] Field of Search ............... 434/29, 61, 69, 247, 434/307; 482/57; 273/148 B, 85 G, 434, 438, DIG. 28; 364/410, 578; 358/104; 180/218; 74/551.1, 551.9; D8 DIG. 8; 446/440

[56] References Cited

U.S. PATENT DOCUMENTS

| | | | |
|---|---|---|---|
| 3,686,776 | 8/1972 | Dahl | 434/61 |
| 3,708,913 | 1/1973 | Terzian et al. | 446/440 |
| 4,464,117 | 8/1984 | Foerst | 434/69 X |
| 4,542,897 | 9/1985 | Welton et al. | 273/DIG. 28 X |
| 4,799,668 | 1/1989 | Jansen | 74/551.9 X |
| 4,887,967 | 12/1989 | Letovsky et al. | 434/61 |
| 4,941,460 | 7/1990 | Working | 602/21 |
| 5,203,563 | 4/1993 | Lopen, III | 273/148 B |
| 5,209,662 | 5/1993 | Fujita et al. | 434/61 |

FOREIGN PATENT DOCUMENTS

0232380 9/1989 Japan ................................ 434/61

Primary Examiner—Richard J. Apley
Assistant Examiner—Joe Cheng
Attorney, Agent, or Firm—Knobbe, Martens, Olson & Bear

[57] ABSTRACT

A bicycle simulator having a follower assembly, a wheelie assembly and power assistance resistance means. A motorcycle simulator having a coupler, a slew generator and a throttle handle. The bicycle and motorcycle simulators having a computer, motors, sensors, controls, and a video display.

38 Claims, 23 Drawing Sheets

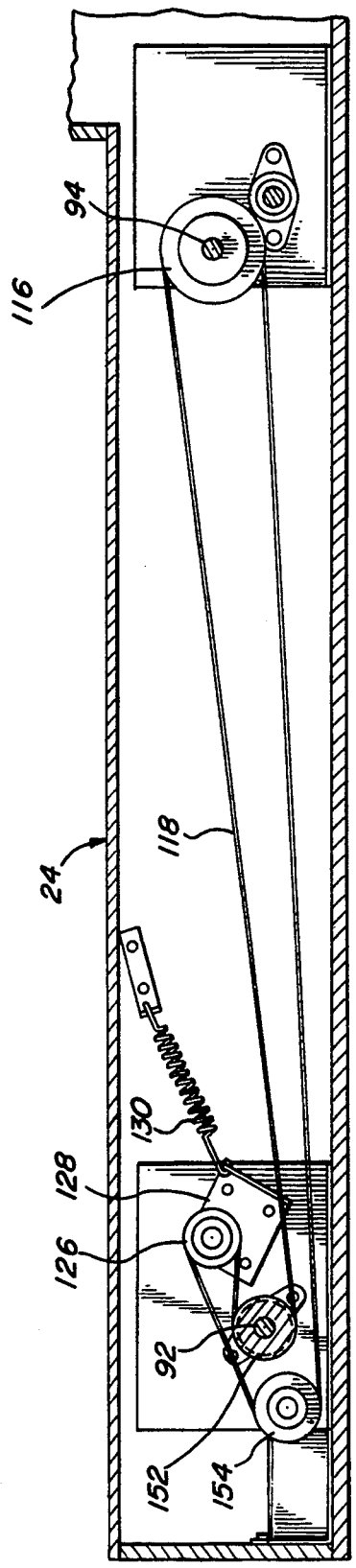
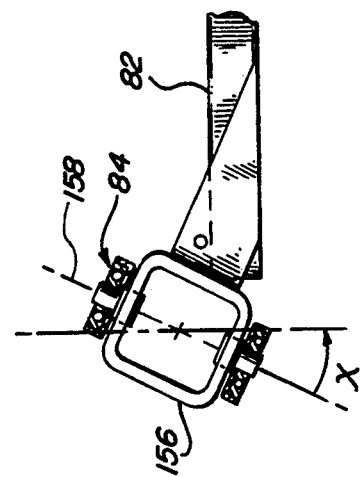
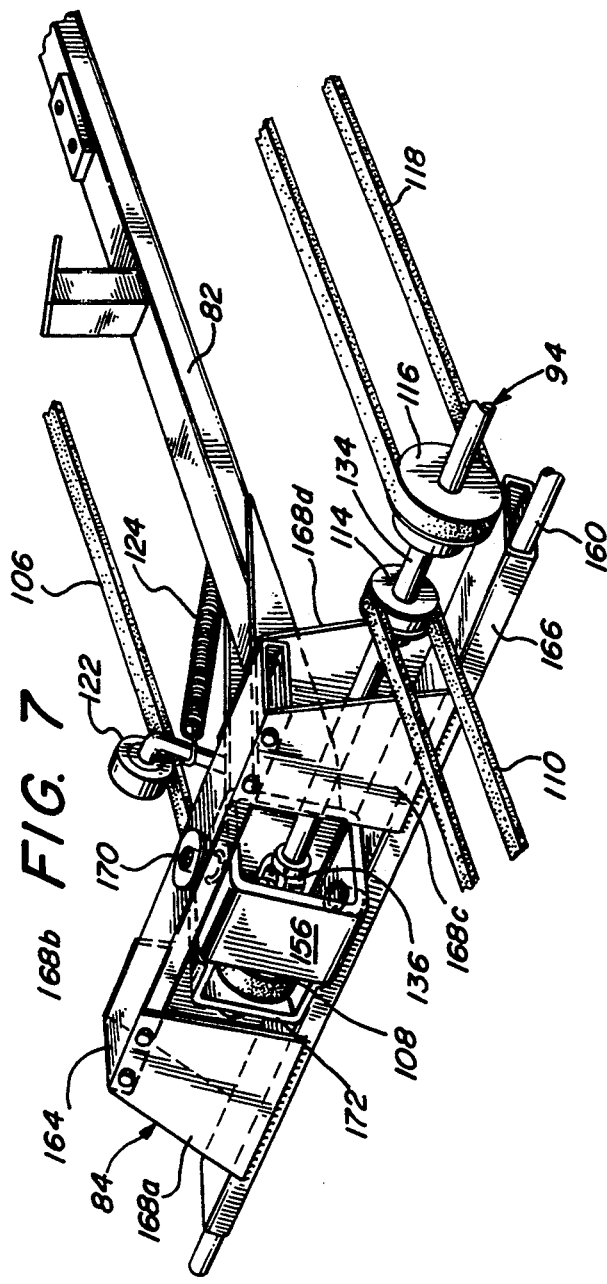

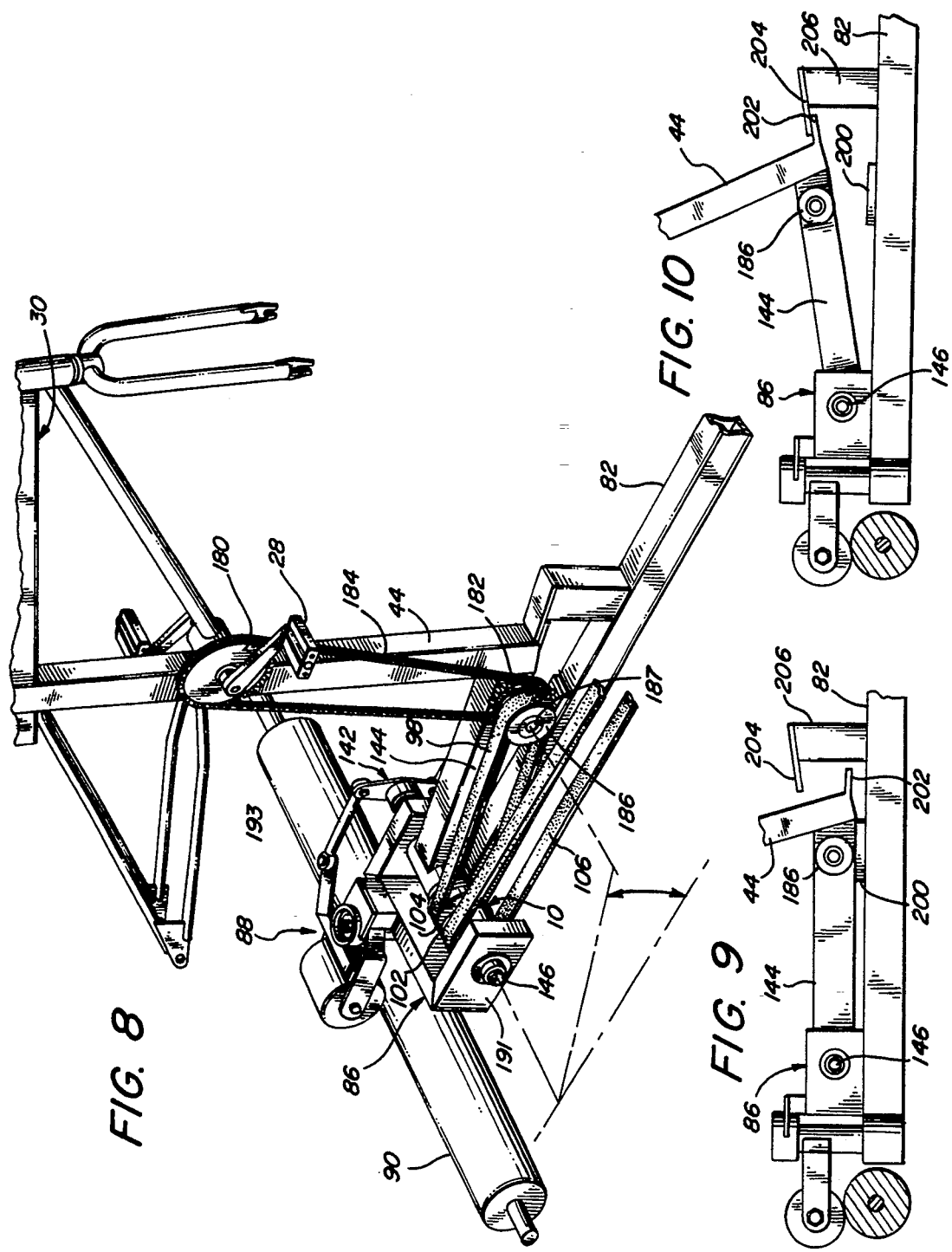

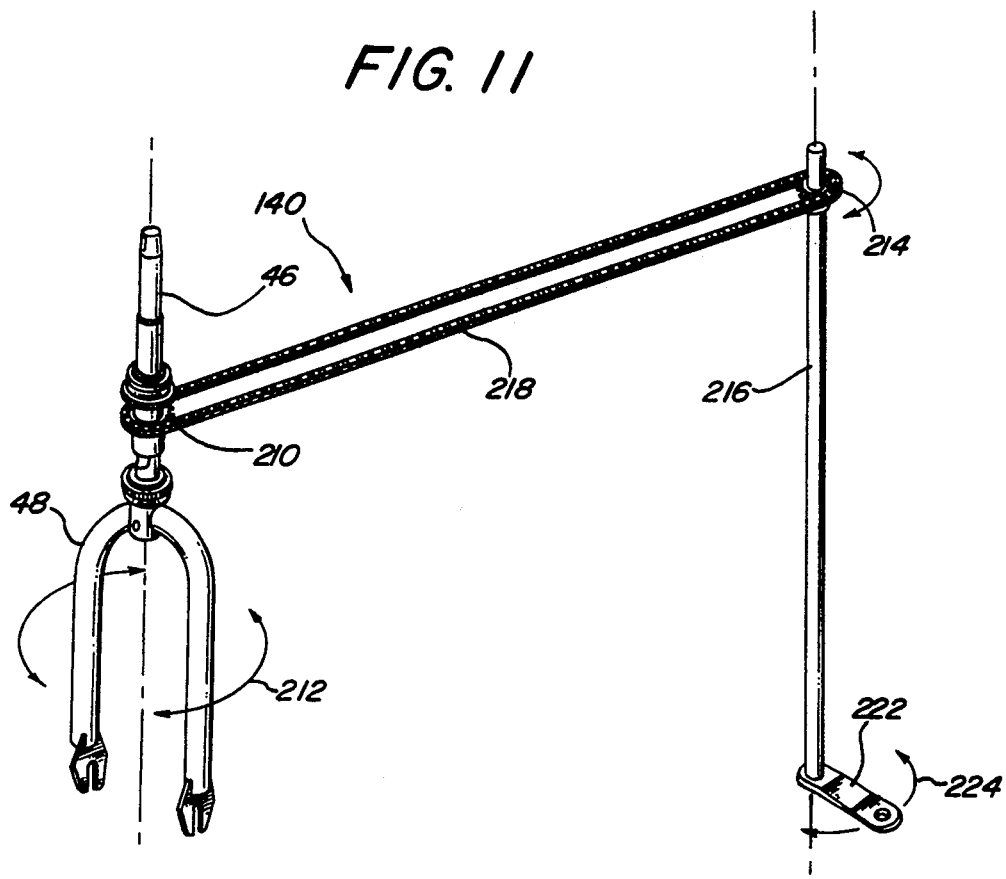
FIG. 11
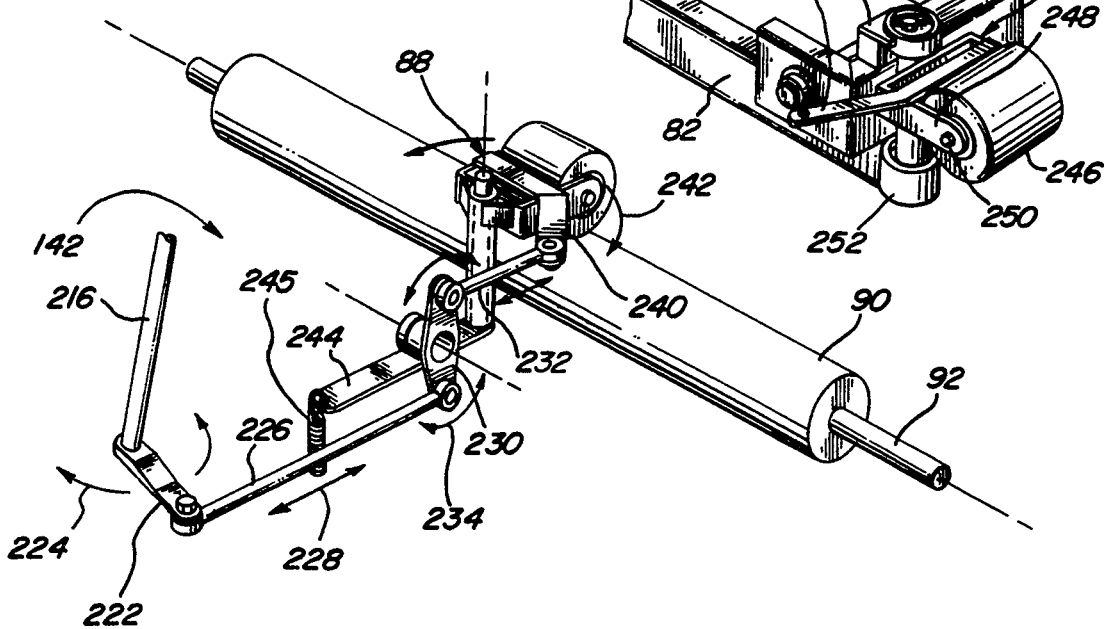
FIG. 12A
FIG. 12B

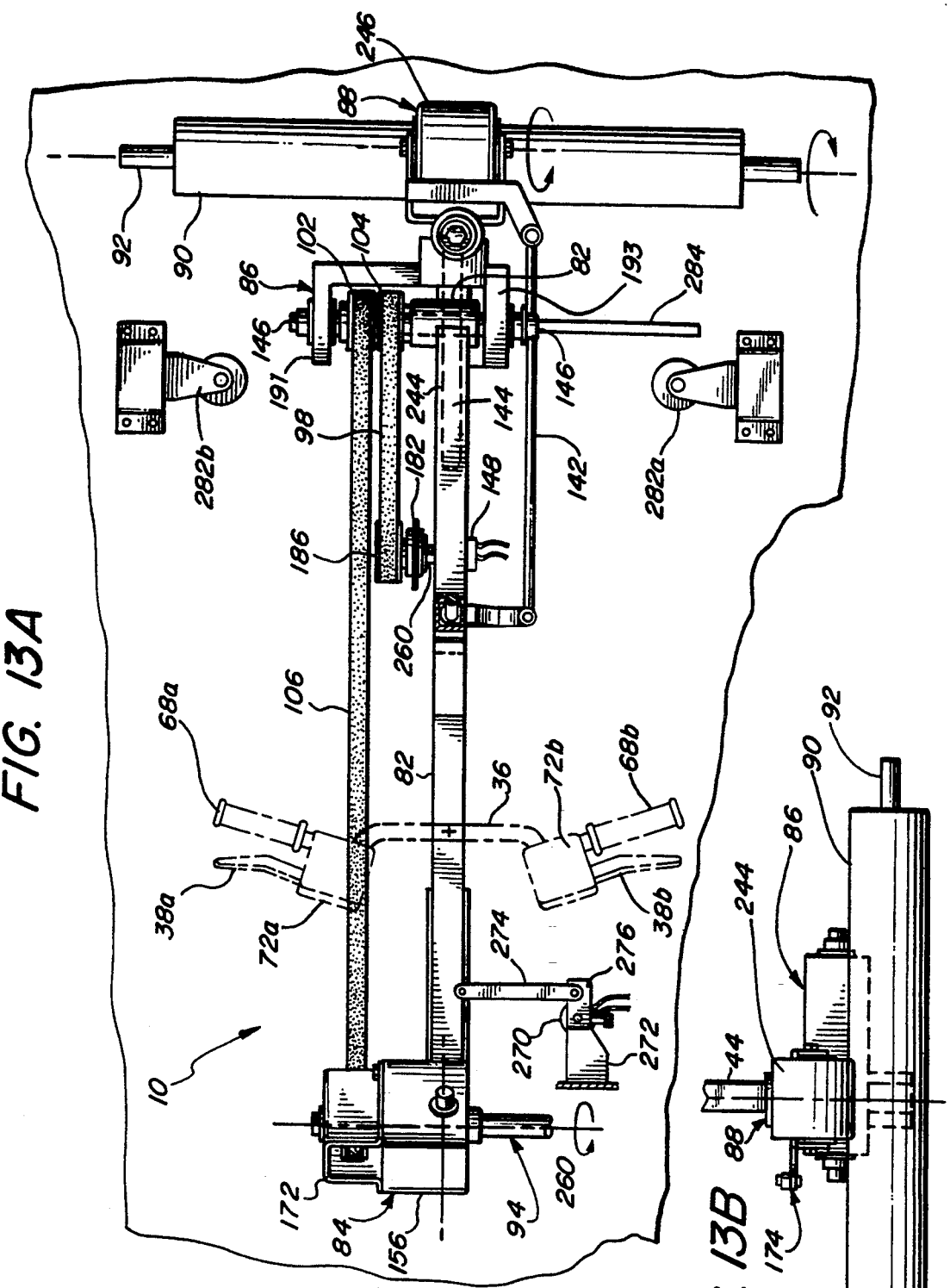

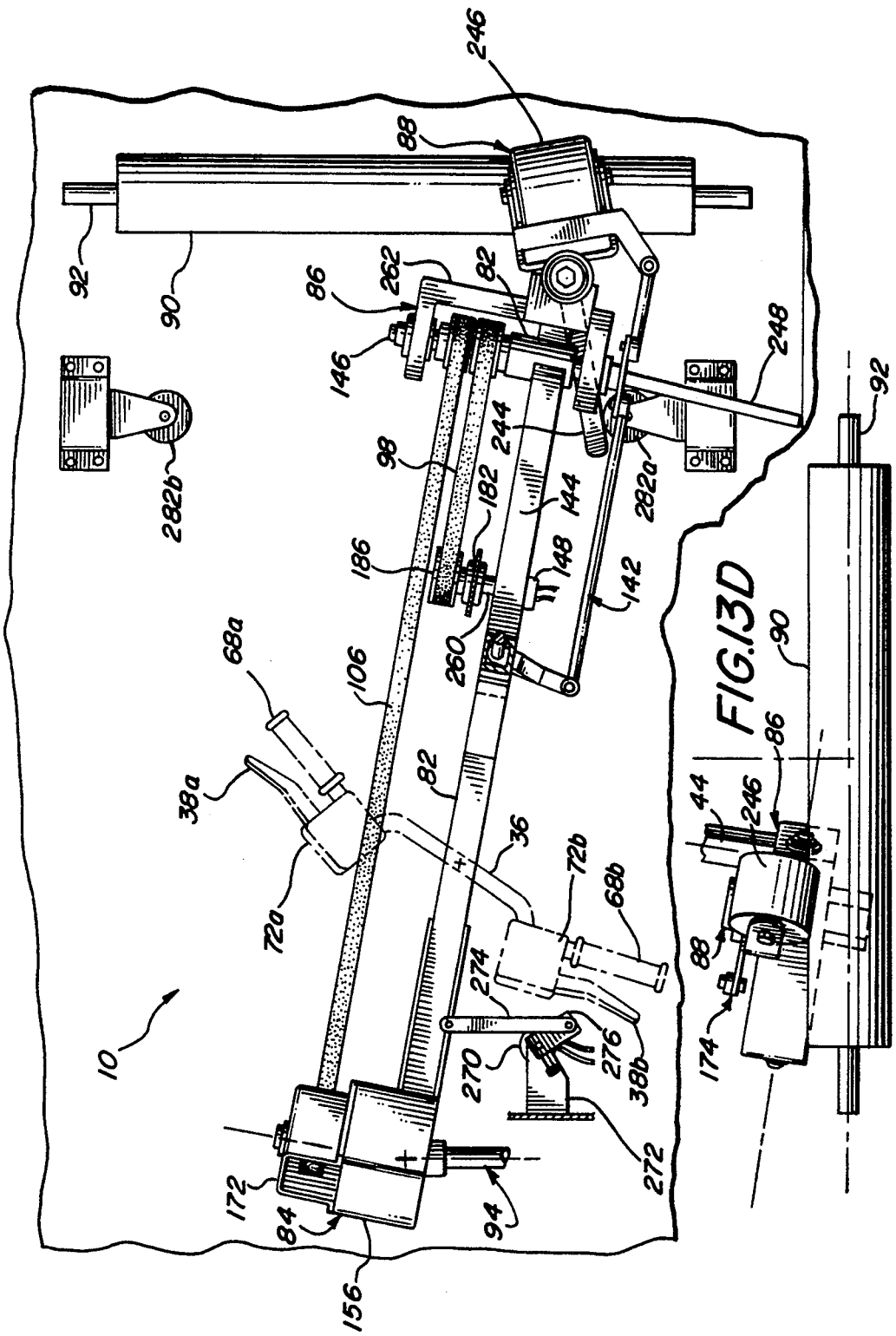

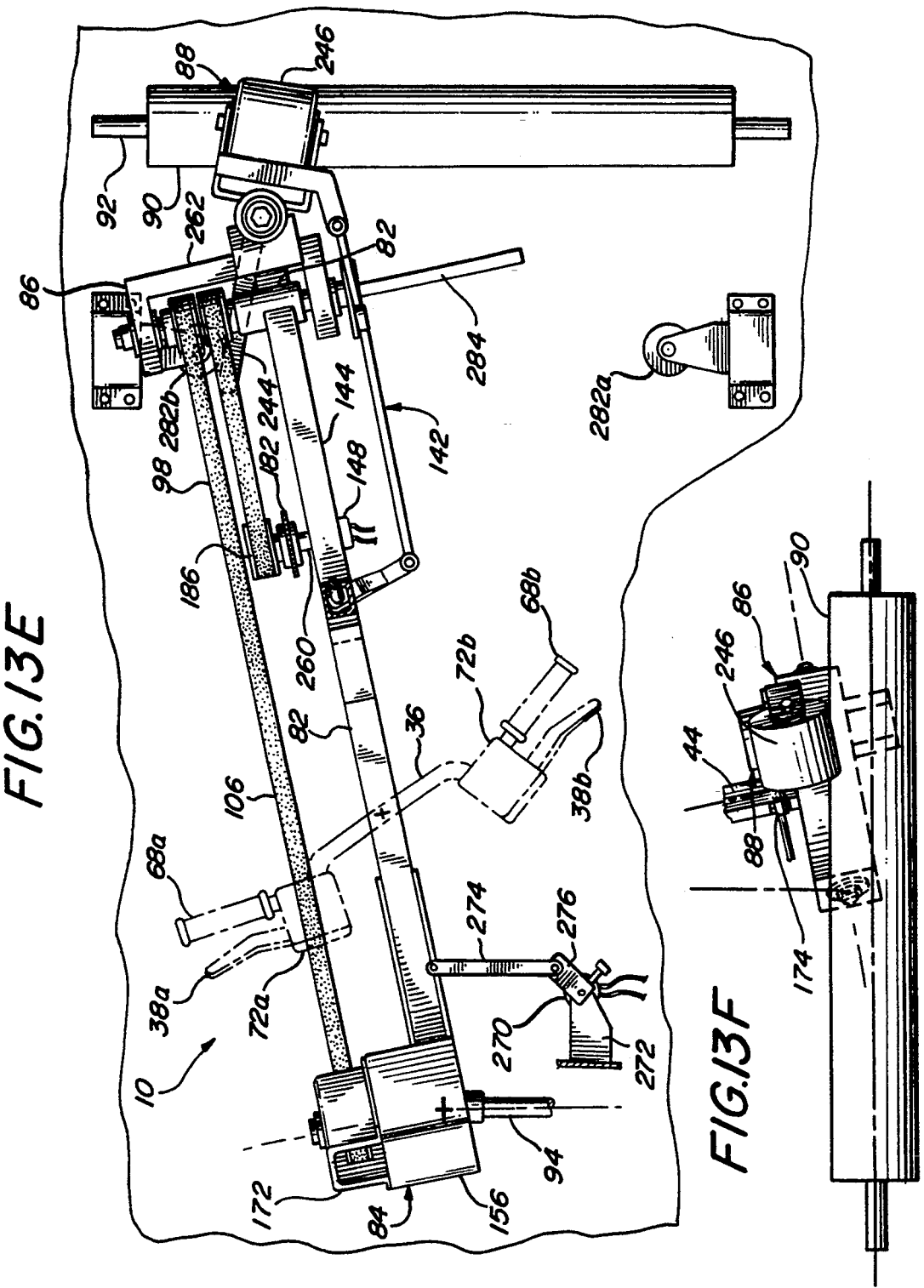

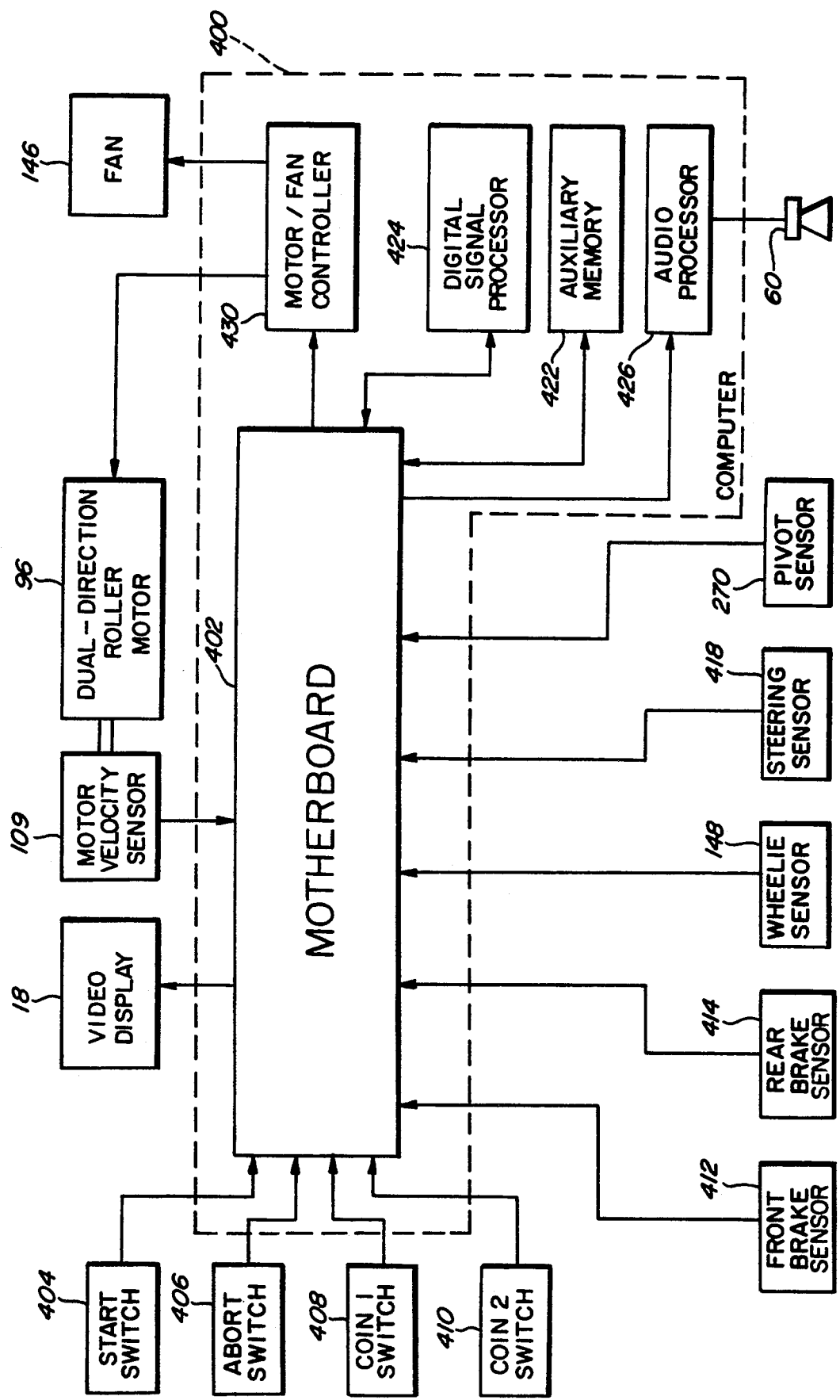

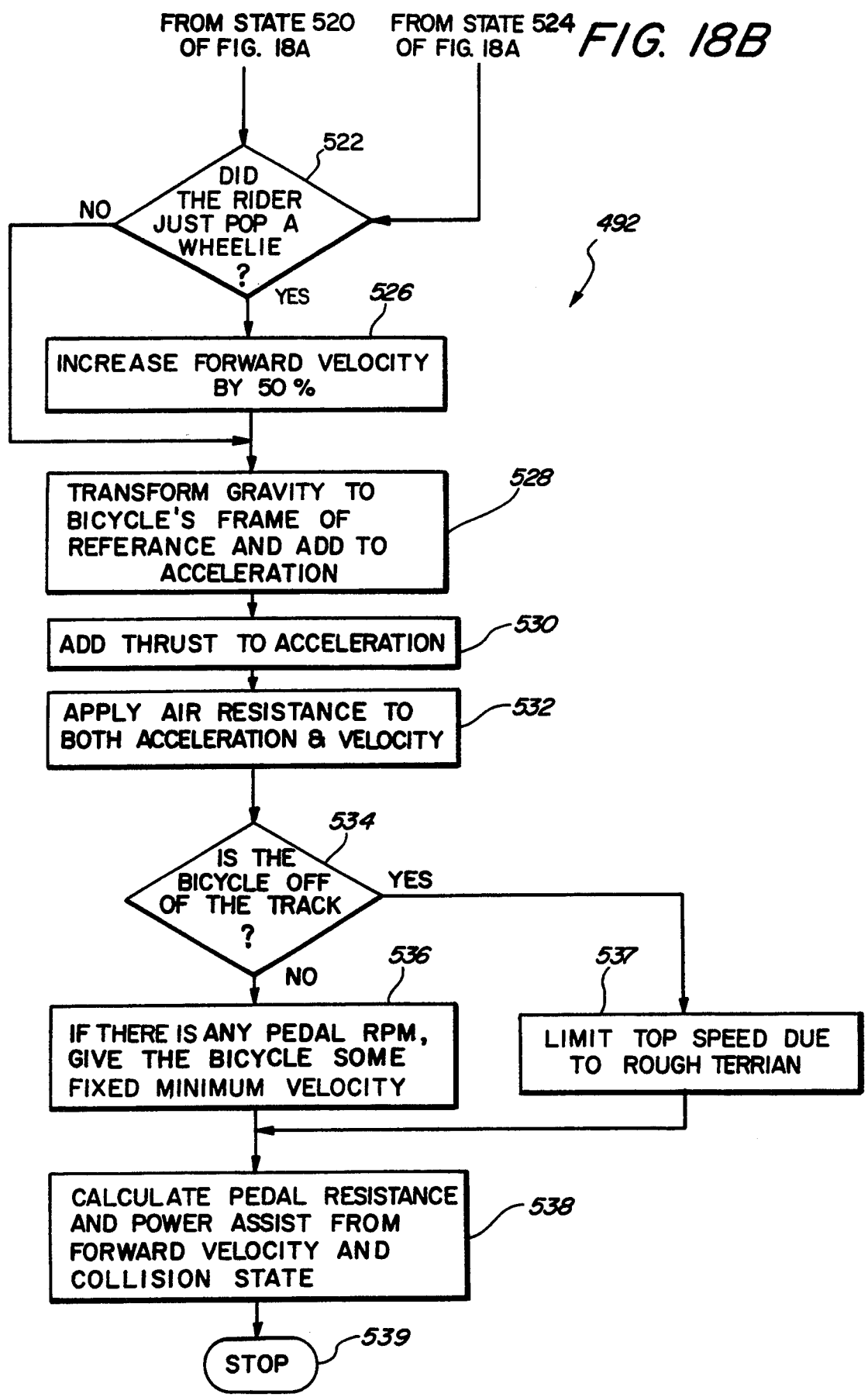

BICYCLE AND MOTORCYCLE RIDING SIMULATION SYSTEM

RELATED APPLICATIONS

This is a continuation-in-part of pending U.S. application Ser. No. 07/670,268, filed Mar. 13, 1991, now U.S. Pat. No. 5,240,417 and also corresponds to pending Patent Cooperation Treaty application No. PCT/US92/01697 filed Mar. 4, 1992.

FIELD OF THE INVENTION

This invention relates generally to simulating the movement of vehicles and, more particularly, to a system for realistically simulating the sensation of riding a bicycle or motorcycle wherein the system incorporates computer animation and power resistance/assistance feedback.

BACKGROUND OF THE INVENTION

A great deal of pleasure and excitement can be derived from racing a bicycle at high speeds, especially in a competitive atmosphere. For some, stunt riding, including the ability to pull "wheelies," provides added exhilaration. For others, vigorous cycling provides an excellent aerobic exercise. As a practical matter however, many of those people desiring to participate in bicycle racing or exercising do not have the available equipment, or the available time. In addition, a great number of people prefer to exercise in the comfort and privacy of their home or office, thus eliminating the option of bicycling.

In response to this need, bicycle simulators have been developed which provide the sensation of riding a bicycle in a stationary position while offering the opportunity for vigorous exercise. Many of these bicycle simulators incorporate conventional or modified bicycle frames mounted in a stationary manner on a support framework such that the rider experiences the sensation of bicycle riding by actively pedaling the bicycle. Such activity provides an excellent aerobic workout without the need for leaving one's home or without the added strain of dealing with traffic and obstacles associated with outdoor riding.

While stationary bicycles have generally proven to be popular exercise devices, they are often mentally unstimulating since continuous pedaling while stationed in a static position can be monotonous and tedious. To address this problem, bicycle exercise machines have been developed which incorporate a visual display interfaced with the bicycle to enhance the pleasure derived from the activity. For example, U.S. Pat. No. 4,637,605 to Ritchie, discloses an exercise device which employs potentiometers positioned at different locations on the exercise bicycle in order to sense the speed of the bicycle wheel and the position of the handlebars, as directed by the user. The potentiometers electrically control the movement of a corresponding player on an interfaced video display. U.S. Pat. No. 4,512,567 to Phillips, discloses a conventional exercise bicycle which also incorporates a series of potentiometers and a generator that provide signals indicating the position of the handlebars and speed of the pedaling action, and thereby manipulate a corresponding character on a video display.

While bicycle exercisers such as the Ritchie and Phillips devices have proven satisfactory for many people bored with conventional monotonous exercising, they have very limited ability to simulate bicycle riding. Lacking a functioning rear wheel, these exercise devices are mounted on a rigid frame which precludes any lateral movement while exercising. As a result, there have been demands for more realistic simulation of bicycle riding.

Further to these demands, bicycle riding systems have been developed which attempt to simulate variable terrain conditions, such as uphill or windy conditions or bumpy roadways. Some exercise devices, such as that disclosed in U.S. Pat. No. 4,925,183 to Kim, employ a treadmill over which the wheels of the bicycle rotate wherein the treadmill incorporates surface irregularities in an effort to simulate road surface terrain. However, the Kim device lacks usual feedback to simulate travel up and down inclined surfaces or participate in a racing atmosphere.

Other devices offer resistance to pedaling action to increase the amount of exertion necessary to operate the exercise device. For example, the Ritchie device, referenced above, includes adjustable resistance to wheel rotation by employing a motor secured to the bicycle which varies the tension on the bicycle wheel. In addition, U.S. Pat. No. 3,903,613 to Bisberg, discloses a bicycle training system which provides a dynamometer for increasing resistance to rear wheel rotation by the user to simulate uphill and wind conditions. However, the Bisberg device fails to effectively simulate bicycle riding as the frame is rigidly restricted from lateral movement. While U.S. Pat. No. 4,932,651 to Defaux, also discloses a bicycle training device capable of varying resistance to user pedaling action, it too fails to simulate many features of bicycle riding, including the ability to lean or pull a wheelie. In addition, neither the Bisberg device nor the Defaux device provide any visual feedback.

To further enhance bicycle riding simulation, other devices have been developed which incorporate a video display and a mechanism for road simulation. For example, U.S. Pat. No. 4,709,917 to Yang, discloses an exercise and training device having a support frame including a seat and handlebars. The Yang device employs sensors on the support frame which interface with an electronic video display for controlling the relative position of a user with respect to a mock road as displayed from the view of the user on the display screen. Also incorporated within the Yang device is a means for providing resistance to pedaling action and for providing passive exercise by electronically rotating the pedals. However, the Yang device does not permit lateral or leaning movement of a bicycle or the ability to pull a wheelie.

Another device, disclosed in U.S. Pat. No. 4,938,475 to Sargeant, et al., is a bicycle training device which utilizes a conventional bicycle supported on a frame having a rear support roller incorporated therein. The front fork of the bicycle frame is supported on a flexible arm of the base while the rear wheel of the bicycle rests on the roller. A variable load is placed on the roller to generate resistance on the rear tire so as to simulate wind and road conditions. In addition, simulated movement of the bicycle is produced on a video display supported by the front fork support tube. In the Sargeant, et al. device, a user sees the position of the bicycle as it progresses along a racing course and in conjunction with a pack of other racers. However, the course is displayed graphically as a rectilinear line in which the simulated bicycle is shown as a cursor mark on the line. While the Sargeant, et al. device permits some bicycle riding simulation, there are drawbacks. As with the Yang device, there is no lateral or leaning movement permitted. In addition, the user is not permitted to pull a wheelie. Furthermore, there is no means for generating power assistance to bicyclist pedaling.

The Bisberg device, referenced above, interfaces an audio/visual display with an electronic means for changing the resistance. The audio/visual display is a tape recorder and/or video projector for apprising the user of the anticipated changes in conditions and instructs the user of proper operation. Despite these features, the Bisberg device suffers from the same drawbacks associated with the Yang and Sargeant, et al. devices.

While these above-described devices offer some degree of bicycle riding simulation they are lacking a realistic bicycle riding simulation. In apparent attempts to improve upon earlier devices, simulation systems have been developed which incorporate some of the above simulation features and include some form of lateral displacement. For example, the Kim device referenced above permits the bicycle to be maneuvered in such a manner as to move the front wheel laterally from side to side relative to the treadmill or to tilt the bicycle from side to side. The Defaux device also referenced above discloses a mechanism for providing some lateral movement of the bicycle by employing a horizontally-slidable member which supports the bicycle in a vertical position.

Other simulation devices have been developed which attempt to simulate "wheelies, " i.e. vertical rotation of the cycle in the vertical plane. For example, U.S. Pat. No. 4,887,967 to Letovsky et al., U.S. Pat. No. 4,049,262 to Cunningham, Jr., and U.S. Pat. No. 4,711,447 to Mansfield, each disclose a device which permits a user to tilt rearwards. Letovsky discloses a motorcycle positioned on a platform in such a manner as to provide six degrees of movement, including rearward rotation. Cunningham, Jr. similarly discloses a motorcycle simulator which incorporates a motorcycle body supported from a U-shaped guide member having vertical springs which permits rearward rotation. Finally, the Mansfield device is an exercise apparatus for use with a video game which incorporates a frame assembly pivotable in rearward direction. While the Letovsky, Cunningham and Mansfield devices provide for some vertical rotation, they fail to truly simulate "wheelies" wherein a cycle rotates in a rearward direction about an axis proximate to the rear wheel. On the contrary, each of the three devices rotate about an axis located directly beneath the rider. As such, vertical rotation is more analogous to a "rocker chair". In addition, none of the devices incorporate such a feature in a bicycle simulating format.

Some prior art devices employ a computer to simulate movement of the user on a track or in competition with other computer-generated cyclists. An example of such computer-interfaced simulators can be found in the patents to Sargeant et al., Yang and Letovsky, all of which have been referenced above. In each, the static movement of the bicycle, i.e., pedaling and steering of the vehicle without actual forward motion, is continuously monitored and registered with a computer or microprocessor wherein such static movement is translated into dynamic movement of a corresponding cycle about a track on a video display. However, with such systems, there are drawbacks. For example none of the prior art devices show computer generated replicas of competitors as they progress along a variable terrain racing track.

Regarding the specific mechanics of prior art simulators, some devices incorporate one or more horizontally-positioned rollers which slidably support the cycle upon which the rider sits. For example, U.S. Pat. No. 3,686,776 to Dahl, and the British patent to Creasey, U.S. Pat. No. 1,577,866 each disclose a motorcycle simulator wherein a motorcycle is vertically supported on a base having crown rollers at opposite ends for supporting the front and rear tires. In the Dahl device, a vertical support is hingeably attached to both the motorcycle frame and the base so that a certain amount of leaning movement of the motorcycle is permitted when the front wheel is turned. There is also a certain amount of vertical linear movement permitted wherein springs provide resistance to such vertical movement. Other devices providing roller support for a bicycle include those disclosed in the patents to Bisberg, Kim, and Defaux, each of which are referenced above. The roller support system has proven advantageous in that it facilitates lateral horizontal movement of the cycle and provides an effective means of transferring resistance to pedaling action of the rider. However, the above-referenced systems have drawbacks associated with direct contact between the cycle wheels and the rollers. For example, although some of the systems support the cycle from below or from the rear, the user may sometimes find it difficult to balance the cycle. In addition, there is a certain amount of slippage associated with tire rotation on the rollers, especially when resistive means are employed to exert a load on rotation of the cycle wheels. Furthermore, a shift in the rider's weight will necessary entail reduced engagement of a cycle tire with a roller thereby diminishing effective transfer of mechanical energy.

Another important drawback to the prior art devices is the exposure of moving parts to the user. Typically, with those devices providing rotating front or rear bicycle tires, the spokes supporting the wheels create a hazard as they often rotate at speeds which could cause significant injury to a young user who inadvertently places their hands near the wheel. In addition, in those devices employing a roller assembly, the juncture of the rotating wheels and the spinning rollers also presents an obviously dangerous situation. As such, direct operation of the bicycle wheels, either rigidly supported from a base mount or freely supported from a roller, is a serious drawback.

Despite the above described developments of the bicycle simulators and exercise machines described above, there is still lacking in the prior act a bicycle simulator which truly presents a realistic overall simulation of active riding of a bicycle on a track and in competition with other simulated cyclists. Indeed, while many of the prior art devices incorporate some of the above-described features, none disclose all of the features simultaneously. Furthermore, none disclose or suggest a system which could incorporate all of these features in a functionally effective fashion wherein the rider experiences the thrill of bicycle racing on an actual bicycle. Consequently, it is desired to have a bicycle riding simulating system which incorporates a "bicycle" mechanism having a conventional bicycle appearance. In addition, it is desired that this new system harness such a "bicycle" to a mechanical support assembly connected electronically with a computer and video display so as to more realistically simulate travel about a variable-terrain, multi-geometrically-shaped track, including the ability to simulate wheelies.

SUMMARY OF THE INVENTION

The present invention provides a system for simulating bicycle riding which employs the above simulating features in a novel fashion and combines them in a manner which creates a truly exhilarating experience. The simulation system incorporates a bicycle mechanism, having a conventional bicycle appearance, which accommodates riders or bicyclists of various levels of riding aggressiveness. Using the present system, a bicyclist can control stationary movement of the "bicycle" in broad degrees of freedom in combination with a computer and a video display. The present invention provides electrical communication between mechanical maneuvering of the bicycle and the video display to visually reflect changes in bicycle speed and track position in response to pedaling, braking and steering changes of the bicyclist. In addition, the computer is connected to a motor so as to partially control bicycle performance in order to simulate changing conditions of the track terrain, such as uphill and downhill gradients, as they are illustrated on the video display. Also incorporated is an audio system and a variable-speed air blower, both interfaced with the computer video display to enhance the simulation activity.

The conventional-appearing bicycle of the present simulation system is movably harnessed to a structural assembly housed in a base enclosure. The base enclosure is uniquely configured to incorporate a turntable which covers the structural assembly and prevents exposure thereof to system users. In addition, the turntable includes a rotatable collar which surrounds a portion of the structural assembly which extends upwardly from within the base enclosure to support the bicycle. With this arrangement, the system prevents injury associated with exposed moving parts while providing for efficient connection of the bicycle to the structural assembly and optimal operation of the system. The bicycle preferably has a rigid frame for supporting a bicyclist, a pedaling mechanism, steerable handlebars and handbrakes mounted on either side of the handlebars. While not functionally operable, front and rear bicycle wheels are provided for visual authenticity. Extending upright in front of the bicycle is a separate upright cabinet which houses the computer, the video display and the audio speakers. The upright cabinet, which also supports a variable-speed blower, is configured such that the video display and audio speakers are conveniently positioned to be in forward view and earshot of the bicyclist.

Incorporated in the present invention are various mechanically and electronically-linked features which cooperate to provide realistic overall simulation. In particular, the simulation system of the present invention provides a follower means for simulating leaning and travel about a curve. The follower means permits the bicycle to swing and lean in opposite directions and to move laterally across the base enclosure while simultaneously moving the rear tire and the bicycle frame relative to the front tire of the bicycle. Such an arrangement duplicates more realistically the maneuvering of a bicycle when a bicyclist directs the bicycle around a curve or corner.

The follower means generally comprises a number of mechanically-linked structural members including a main horizontal beam which is pivotally secured at an angle to a gimbal assembly positioned at a forward end thereof. Because the main beam is secured at an angle from a vertical axis of rotation, lateral movement of the main beam to one side or the other causes the vertical bicycle support to lean respectively. The main beam supports an orthogonally-positioned horizontal axle at a rear end thereof, which axle supports a pivoting bicycle support and a yoke assembly.

The bicycle support comprises a generally L-shaped frame pivotally positioned in a vertical plane, wherein a vertical leg portion supports the bicycle frame in a substantially vertical orientation. Besides moving coincidentally with the main beam, the bicycle support also pivots about the horizontal axle to permit simulation of bicycle "wheelies," i.e., rotation in a vertical plane about a pivot point proximate to the rear bicycle tire. The axis of wheelie rotation is positioned such that a shift in the center of mass of the bicyclist in a rearward direction causes the L-shaped frame to pivot upwardly and rearwardly, thereby simulating, more closely, rotation about the rear wheel and consequently a more realistic "wheelie" than that attempted by prior art devices.

Pivotally secured to the rear of the main horizontal beam is the yoke assembly which is mechanically linked to the handlebars and is controlled by the bicyclist's steering of the handlebars. Incorporated within the yoke assembly is a roller which slidably engages a rolling pin mounted to the base of the system. As the handlebars are turned in one direction while pedaling, the yoke assembly is pivoted in the opposite direction thereby causing the main horizontal beam to move laterally across the rolling pin. The resulting lateral movement of the main beam causes the bicycle to lean into the direction of the turn while simultaneously accentuating angular movement of the bicycle frame and rear tire relative to the front tire.

Another important feature of the present invention is the means for varying resistance to bicyclist pedaling action to simulate uphill or windy conditions, which also includes varying power assistance to bicyclist pedaling action for simulating coasting during downhill movement. This road simulating feature generally comprises a drive axle which is linked to the pedaling mechanism of the bicycle frame and is interconnected with a computer-controlled motor. The drive axle is also linked with the rolling pin via a series of belts and pulleys. With this arrangement, rotation of the pedaling mechanism by the bicyclist in turn rotates the drive axle and the rolling pin. While rotation of the rolling pin assists in lateral movement of the bicycle, rotation of the drive axle is being influenced by the computer-controlled motor.

As variably directed, the motor exerts a specified amount of resistance to rotation of the drive axle in order to simulate travel across a generally level roadway surface. When the bicyclist reaches an uphill gradient on a computer-generated bicycle track, the computer commands the motor to increase resistance to drive axle rotation which in turn requires the bicyclist to pedal harder to travel up the incline. Likewise, when the bicyclist reaches a downhill gradient on the track, the computer signals the motor to augment power to rotation of the drive axle such that the bicyclist experiences temporary "coasting." This downhill simulation feature provides broadened roadway simulation not offered by other simulation devices in the prior art.

To further enhance the simulation of forward movement, the preferred embodiment of the present invention incorporates a variable-speed blower or fan attached to the upright enclosure which is directed at the bicyclist and creates the sensation of wind blowing in one's face. The force of the air blown at the bicyclist is varied by the computer depending on the speed of the bicycle and the pedaling velocity of the bicyclist.

Positioned strategically throughout the simulation system are a plurality of sensors which allow the computer to monitor relative speed and position of the bicycle as the bicyclist turns, pedals and leans. The sensors provide such information to the computer which correspondingly adjusts the position of a simulated bicycle in a track universe using computer animation. The computer animation is made possible by the use of a unique bicycle model program that maintains the motion of the simulated bicycle in the track universe and controls the aforementioned motor accordingly.

With the present system, numerous features are provided which more realistically simulate bicycle riding. First of all, a bicyclist is able to manipulate the bicycle to negotiate curves in the track, i.e., by leaning the bicycle into the turn and moving it laterally across the system so that accentuated angular movement of the rear wheel and bicycle frame relative to the front wheel and handlebars is provided. Secondly, the simulation system provides wheelie capabilities which more realistically provides vertical rotation about an axis proximate to the rear wheel. Furthermore, the present invention provides a means for simulating travel under variable terrain conditions which includes the ability to experience downhill coasting. Finally, the system provides a unique arrangement of mechanical components which effects enhanced bicycle riding simulation in a manner which is safe for youngsters and minimizes risk of injury from exposure to moving parts. These features are enabled by coupling the mechanical subsystem to a computer, motor and a video display such that movement on a track universe is simulated. With such a system, a bicyclist can experience the thrill of bicycle riding solo, or in competition with other animated bicyclists, and obtain a vigorous workout with spirited excitement and enthusiasm. Other advantages of the present system may be appreciated by reference to the attached drawings and the detailed description below.

In an alternate embodiment, a vehicle simulator has a frame on which a person can sit, and a coupler is movably connected to the frame. A beam is movably connected to the coupler, such that the frame can be moved relative to the beam. Preferably, the vehicle simulator is a motorcycle simulator, and the coupler that interconnects the frame and the beam comprises four links. Each link has two ends, with one end of each link being rotatably connected to the beam and the other end of each link being rotatably connected to the frame. Thus, the frame can rock forwardly and upwardly relative to the beam to simulate a wheelie movement of a motorcycle.

Additionally, the simulator includes a computer which has a predetermined program stored therein and a control that is electrically connected to the computer and attached to the frame. The control can be manipulated by the person sitting on the frame for generating a control signal, and this control signal is sent to the computer. The computer is operably engaged with the frame for causing the frame to move relative to the beam in response to the control signal.

Further, the simulator includes a video monitor that is positioned in the person's view, and the monitor is electrically connected to the computer. The computer causes a changing video image of a space to be displayed on the monitor in response to the predetermined computer program. Specifically, the computer causes a changing first-person image of a simulated space, i.e., an image of the space as the person sitting on the frame would see the space travelling through the space on a motorcycle, to be displayed on the video monitor. Also, the computer can change the video display in response to the control signal.

In the preferred embodiment, the control is a throttle handle that is rotationally mounted on a handlebar of the frame of the motorcycle simulator. When the throttle handle is rapidly rotated to simulate a sudden opening of the throttle of a motorcycle, the computer receives the control signal and causes the frame to move forwardly and upwardly to simulate the conduct of a so-called "wheelie" maneuver.

To generate the control signal, a potentiometer is mounted in the handlebar of the frame and is operably engaged with the throttle handle, so that when the throttle handle is rotated, the potentiometer generates the control signal and sends the control signal to the computer. Thus, the control signal is representative of the position of the handle relative to the frame.

Preferably, the throttle handle includes an annular hollow grip having a wall, a closed end, and an open end, and defining a longitudinal axis. Also, an elongated shaft is disposed within the annular grip coaxially with the grip, and the shaft has a first end attached to the closed end of the grip and a second end extending into a portion of the simulator. This portion is preferably a handlebar having an open end, wherein the second end of the shaft extends into the open end of the handlebar. The potentiometer is operably connected to the second end of the shaft for generating the control signal in response to rotational movement of the grip. Additionally, a support tube is positioned in the grip between the wall of the grip and the shaft. The support tube has an end, and the end of the support tube is connected to the handlebar. To reduce friction between the support tube and the shaft of the grip, and to radially support the grip, at least one bearing is positioned between the wall of the grip and the support tube.

In one presently preferred embodiment, a bracket is attached to the handlebar and a screw is threadably engaged with the bracket for holding the potentiometer onto the bracket. The bracket is preferably a two-piece bracket, to reduce potential binding of the potentiometer.

The operable engagement of the computer with the frame, discussed above, is effected by a wheelie motor, which is electrically connected to the computer through an encoder, and by a cam, which is engaged with the wheelie motor. The wheelie motor can be caused to rotate in the clockwise and counterclockwise directions by the encoder in response to commands from the computer. In turn, the cam is connected to a wheelie member, and the wheelie member connected to the frame, for translating rotational motion of the wheelie motor into translational motion of the frame relative to the beam.

In accordance with the present invention, the computer can command the encoder to cause the wheelie motor to vibrate the frame, to simulate passage of the frame over rough terrain. More particularly, the computer can be programmed such that when the simulated position of the frame in the space contained in the computer program correlates to the position of rough terrain in the space, the computer rapidly sends a series of alternating first and second command signals to the encoder. The first command signal causes the encoder to pass a positive voltage to the motor to turn the motor in the clockwise direction, and the second command signal causes the encoder to pass a negative voltage to the motor to turn the motor in the counterclockwise direction. Thus, the motor, and hence the cam, rapidly alternates its direction of rotation. Consequently, the wheelie member rapidly reciprocates relative to the beam, and this rapid reciprocating motion is transferred through the links to the frame.

Further, as also stated above, the computer can cause the encoder to activate the motor to move the frame in a wheelie-simulating motion. More specifically, the computer receives the control signal from the potentiometer, and in response to the control signal orders the encoder to rapidly rotate the motor through a predetermined angular range. This rapid rotation of the motor is transferred through the cam and wheelie member to the frame. The system of links is configured such that when the wheelie member urges against the frame, the frame moves forwardly and then upwardly relative to the beam.

In a preferred embodiment, the control signal from the potentiometer is conducted through an amplifier and a differentiator prior to being sent to the computer. Accordingly, the computer receives both the control signal, which indicates how far the throttle handle was turned, and the time derivative of the control signal, which indicates how rapidly the throttle handle was turned. Based upon the control signal and its derivative, the computer determines what the magnitude of the resultant wheelie motion of the frame should be. Consequently, the computer can control the encoder to cause the wheelie motor-cam-wheelie member system to move the frame an amount appropriate for the computed magnitude of the wheelie.

In addition to the wheelie-generating structure discussed above, the simulator of the present invention also includes a means to cause the frame to move in a swinging motion to simulate the motion of a motorcycle during a turn. This swinging means includes a handlebar that is rotatably attached to the frame, and a slew generator operably coupled to the frame. Also, a linkage system interconnects the handlebar and the slew generator. When the handlebar is rotated by the operator of the simulator to simulate turning a motorcycle, the motion of the handlebar is transferred through the linkage system to the slew generator. In turn, the slew generator causes the rear portion of the frame to swing relative to the front portion of the frame.

In a preferred embodiment, the frame has a longitudinal axis and a rear portion, and the rear portion of the frame is distanced from the handlebar. Also, the slew generator includes an elongated rolling pin which is rotatably disposed adjacent the rear portion of the frame and is oriented with its longitudinal axis generally perpendicular to the axis of the frame. Further, the slew generator also includes a slew motor which coupled to the rolling pin for causing the rolling pin to rotate about the longitudinal axis of the rolling pin.

A bracket has a forward end connected to the rear portion of the frame and a rear end distanced from the frame, and a pallet roller is connected to the rear end of the bracket. The pallet roller is disposed on the rolling pin. Preferably, the bracket is an A-shaped bracket. When the handlebar is turned, the linkage system transfers the rotational motion of the handlebar into turning motion of the pallet roller, and the pallet roller slews across the turning rolling pin in response.

A bearing roller is rotatably attached to the rear portion of the frame for supporting the frame. Thus, the weight of the frame is supported by the bearing roller, and not the pallet roller.

Accordingly, to hold the pallet roller against the rolling pin, a roller spring is connected in tension to the rear portion of the frame and the rear end of the A-shaped bracket. Preferably, to prevent the pallet roller from binding against the rolling pin near the limits of the slewing motion of the pallet roller, the pallet roller is wine barrel-shaped. Stated differently, the first and second ends of the pallet roller have diameters which are less than the diameter of the pallet roller near the middle of the pallet roller.

In another aspect of the present invention, a vehicle simulator comprises a frame on which a person can sit, and a handlebar rotatably attached to the frame. A slew generator is operably coupled to the frame, and a linkage system interconnects the handlebar and the slew generator for causing the slew generator to move the frame in response to rotational movement of the handlebar.

In yet another aspect of the present invention, a "stand-up" version of the vehicle simulator comprises a base and a computer having a predetermined computer program simulating a space. A handlebar is rotatably mounted on the base, and a post is rigidly connected to the handlebar. Further, a signal generator is connected to the post for generating a control signal in response to rotation of the handlebar relative to the base, the signal generator being electrically connected to the computer. Also, a video monitor is electrically connected to the computer for displaying a changing video image of the space in response to the control signal.

Preferably, a vibrational motor is electrically connected to the computer and is operably engaged with the base for causing the base to vibrate in response to the computer program. More specifically, the vibrational motor has a rotor shaft, and a weight is attached to the motor shaft for causing the shaft to vibrate when the shaft rotates, to thereby simulate passage of the simulated vehicle over rough terrain, or idling.

The details of the present invention, both as to the operation and construction thereof, can best be understood in reference to the accompanying drawings, in which like numerals refer to like parts.

BRIEF DESCRIPTION OF THE DRAWINGS

FIG. 5 is a cross-sectional side view of the left side interior of the base enclosure of FIG. 3 taken along lines 5—5.

FIG. 6 is a detail view of the connection of the main horizontal beam with a portion of the gimbal assembly.

FIG. 7 is a left front perspective view of the gimbal assembly and the forward portion of the main horizontal beam.

FIG. 8 is a right front perspective view of the bicycle frame and a portion of the mechanical support assembly as configured when the bicycle is in a wheelie position.

FIG. 9 is a side view of the wheelie assembly in its downward position.

FIG. 10 is a side view of the wheelie assembly in its upward position.

FIG. 11 is a right front perspective view of the steering assembly concealed within the bicycle frame.

FIG. 12A is a left front perspective view of the linkage assembly and the roller assembly.

FIG. 12B is a left rear perspective view of the roller assembly and the yoke assembly.

FIG. 13A is a top view of the mechanical assembly shown in its operating position when the bicycle is being directed forwardly.

FIG. 13B is a rear view of the roller assembly in its operating position shown in FIG. 13A.

FIG. 13C is a top view of the mechanical assembly shown in its operating position when the bicycle is being directed about a right-hand curve.

FIG. 13D is a rear view of the roller assembly in its operating position shown in FIG. 13C.

FIG. 13E is a top view of the mechanical assembly shown in its operating position when the bicycle is being directed about a left-hand curve.

FIG. 13F is a rear view of the roller assembly in its operating position shown in FIG. 13E.

FIG. 14 is a block diagram of the computer and input-/output (I/O) devices of the present bicycle simulator invention;

FIGS. 18A, 18B together form a flow diagram of the "add_forces" function used in the "game" function of FIG. 17;

DETAILED DESCRIPTION

Figure 1:
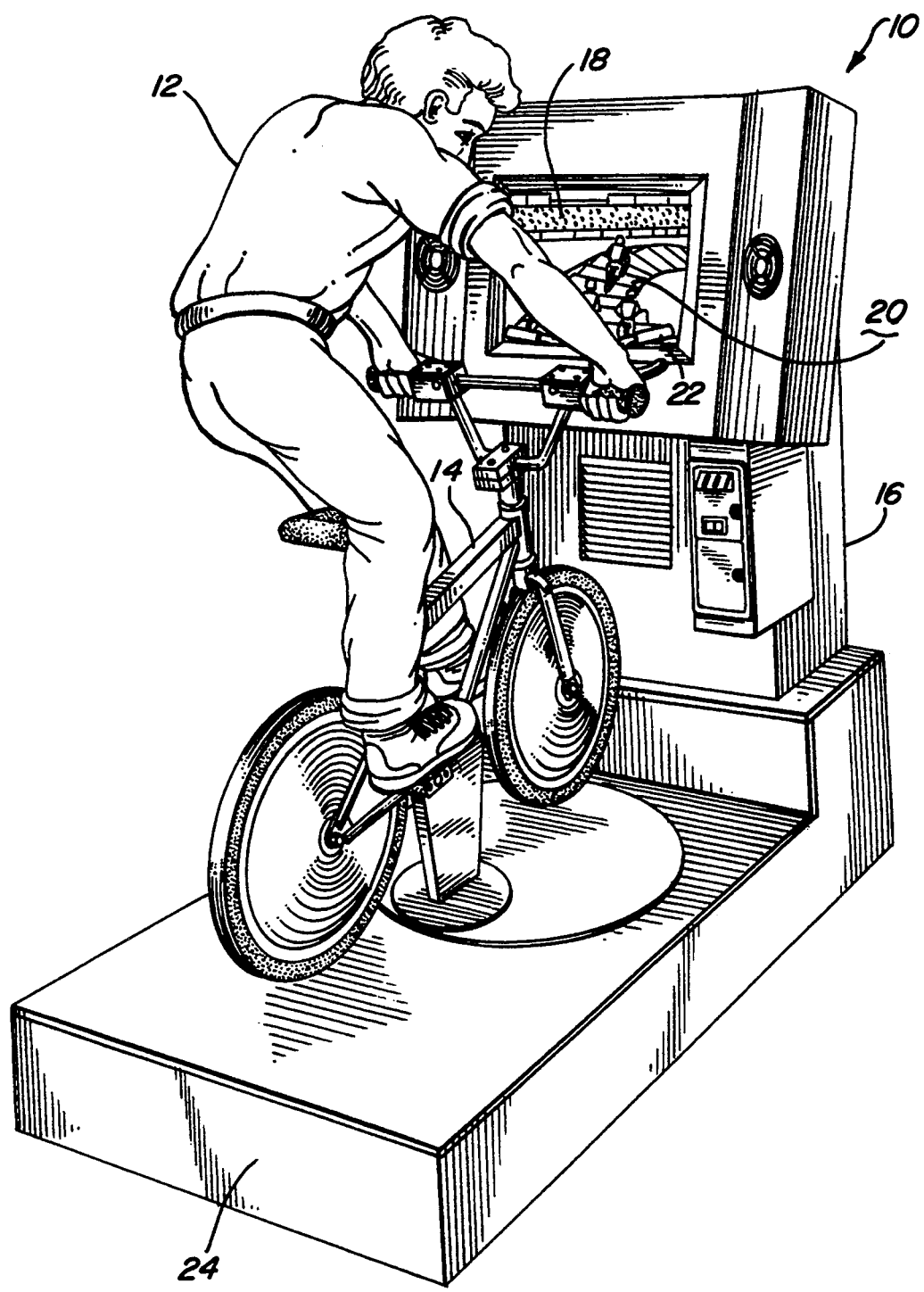
FIG. 1 is a right rear perspective view of the preferred embodiment of the present bicycle simulation system showing its intended use by a bicyclist.

Reference is now made to the accompanying drawings wherein like elements are referred to with like numerals. Referring to FIG. 1, the present invention is a bicycle simulator 10 which permits a user (bicyclist) 12 to mount and maneuver a bicycle mechanism ("bicycle") 14, having an authentic appearing configuration, in several degrees of freedom to simulate actual bicycle riding and racing. The bicyclist 12 may not only pedal the bicycle 14 in as aggressive a manner as desired, but may lean the bicycle 14 from side to side while simultaneously steering the handlebars in simulation of travel about a curve. In addition, when desired, the bicyclist can pull a "wheelie," i.e., pull the bicycle rearward in simulation of forward motion on the rear wheel only. While normally concealed from view of the bicyclist, a mechanical support assembly is integrated within the bicycle simulator 10 to support the bicycle 14 in a fashion which permits movement in the above-described manner.

The bicycle simulator 10 also includes a means for displaying and broadcasting simulated movement of the bicycle 14 which enhances the pleasure derived from racing the bicycle 14. Specifically the bicycle simulator 10 employs a computer (not shown), housed within an upright cabinet 16, which operates a computer program designed to model simulated movement of the bicycle 14 on a video display 18. The computer generates an animated variable terrain racing track 20 on the video display 18 as well as displaying the progress of one or more animated bicycles drones moving thereon. In addition, the computer controls output from a sound system (housed within the upright cabinet 16) to create audio sounds. Simulated progression of the bicycle 14 upon which the bicyclist 12 sits is depicted on the video display 18 by way of the computer animation that is discussed herein below. In the preferred embodiment, the handlebars 22 of the corresponding simulated bicycle are visible on the video display 18.

Enhanced by visual display of the racing track and an accompanying audio soundtrack, the bicyclist experiences a sense of racing the bicycle along a variable terrain track—alone or in competition with other racers. The bicyclist's enjoyment is further enhanced by the force of wind blown across himself and the bicycle by a variably controlled blower (also housed within the upright cabinet 16) in response to pedaling speed of the bicycle 14 by the bicyclist 12.

The mechanical support assembly (not shown) referred to above is housed within a base enclosure 24 which also supports the upright cabinet 16. The mechanical support assembly provides a means for effectively simulating actual bicycle racing and includes the ability to augment pedalling action. Translation of the mechanical support assembly is monitored by the computer which receives position and speed signals from several sensors secured to the mechanical support assembly.

In the preferred embodiment, the mechanical support assembly includes a "follower means" for allowing the bicycle to lean and move laterally in response to the bicyclist's steering of the bicycle 14. The mechanical support assembly also includes a "wheelie means" for simulating rearward rotation of the bicycle in a vertical plane about an axis orthogonal to, and proximate to the rear wheel of, the bicycle. In addition, with a variable speed motor integrated therewith, the mechanical support assembly is configured to alternatively add mechanical resistance or assistance to the bicyclist's pedaling action.

Figure 2:
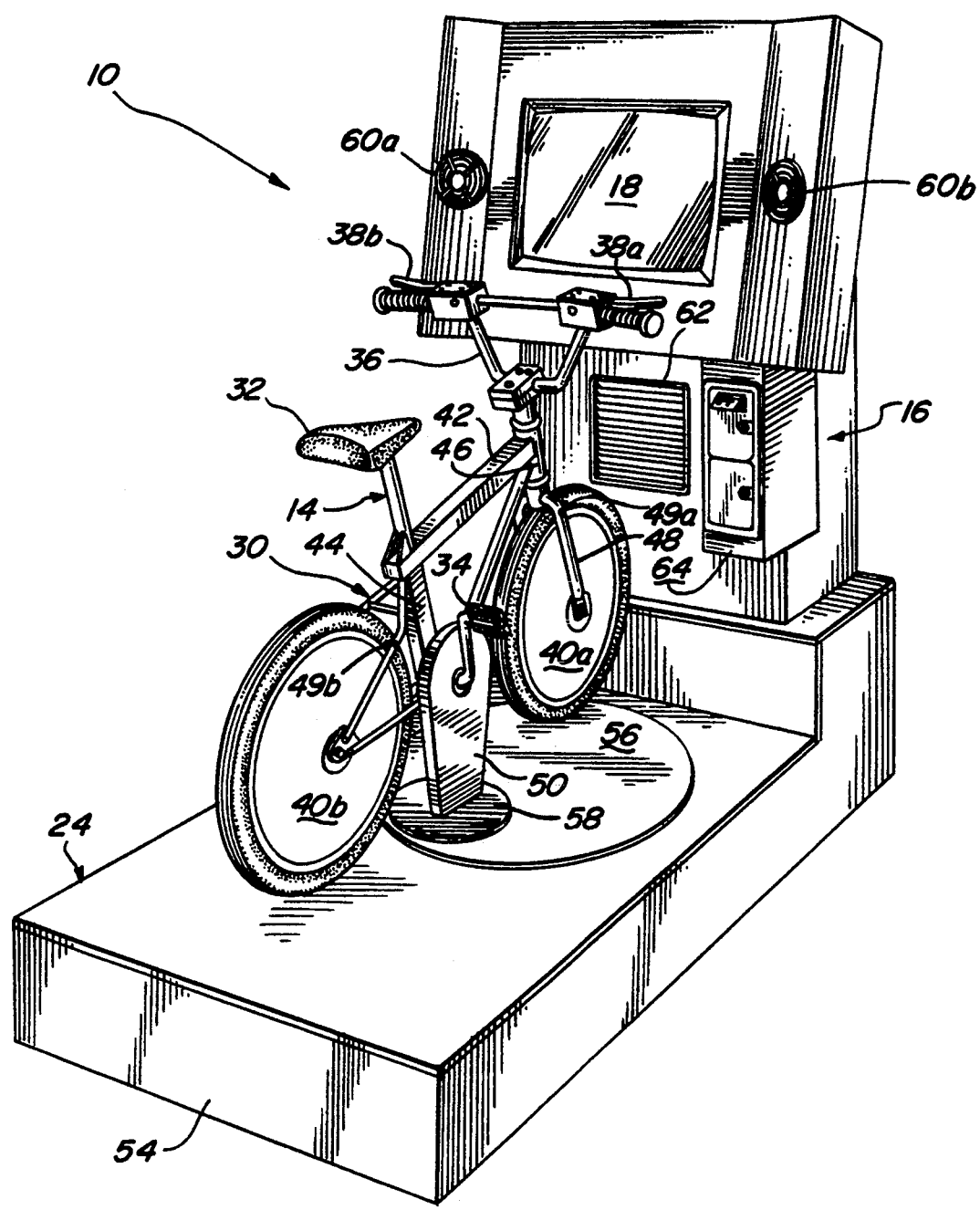
FIG. 2 is a second right rear perspective view of the overall embodiment of FIG. 1.

Referring now to FIG. 2, specific features of the bicycle simulator 10 may be appreciated. The bicycle 14 has a configuration designed to resemble a conventional bicycle; i.e., a bicycle frame 30, a seat 32 for a bicyclist to rest upon, rotatable pedals 34, steerable handlebars 36, first and second handbrakes 38a and 38b attached to each side of the handlebars 36, a front tire 40a and a rear tire 40b. The bicycle frame 30 further comprises a cross tube 42 and a seat tube 44 both of which house a steering assembly described in more detail below. In addition, the bicycle frame 30 includes a steering column 46 and a front fork 48. It is important to note that while the front and rear tires 40a, 40b, respectively, may be supported in a manner which permits free rotation, the preferred embodiment precludes such free rotation. A means is provided for bolting the tires in a stationary fashion so as to eliminate possible injury by the inadvertent placement of a bicyclist's fingers or hand near the tires 40a, 40b. In the preferred embodiment, the bolting means are bolts 49a and 49b which extend through the bicycle frame 30 and into the rigid rims supporting the tires 40a and 40b respectively.

The bicycle 14 is supported from below by the mechanical support assembly (not shown in full) that is normally concealed from view within the base enclosure 24. A portion of the mechanical support assembly which extends upwardly toward the bicycle is protectively hidden by a chain guard 50 extending downwardly from the pedals 34. In the preferred embodiment, that portion of the mechanical support assembly extending through the top wall of the base enclosure 24 is the seat tube 44 of the bicycle frame 30, as will be described in greater detail below. The balance of the mechanical support assembly is enclosed within the base enclosure 24 comprising a housing 54 sufficiently sturdy to support the weight of the bicyclist (not shown) upon mounting and dismounting the bicycle 14. An opening (shown in FIG. 4) in the top wall of the housing 54 is provided to permit the extension of a portion of the mechanical support assembly through the top wall of the base enclosure housing 54 in order to movably support the bicycle 14. In addition, the base enclosure 24 includes a rotatable turntable 56 which securably covers the opening in the housing 54 while safely concealing the mechanical support assembly which might otherwise present a hazard to the bicyclist 12. As will be explained further is association with FIG. 4, the turntable 56 rotates in a "lazy-Susan" fashion.

Extending upwardly from a forward portion of the base enclosure 24 is the upright cabinet 16 which houses the computer, the sound system and the variably controlled blower (each not shown). These components will be described in detail hereinafter. As indicated above, the computer models simulated movement of the bicycle 14 as it progresses on the variable terrain track 18 using the selected software program, described in more detail below. In addition, a plurality of audio speakers 60a and 60b, integrated with the computer-controlled sound system, are mounted in the upright cabinet 16 to permit announcement of the progress of the animated bicycle on the track 18, as well as to transmit the normal ambient sounds associated with competitive bicycle racing. Enhancing racing simulation is the variably controlled blower for simulating wind conditions during the race. The variably controlled blower is positioned behind an air grill 62 and directs forced air across the bicyclist in response to the bicyclist's pedalling action. For purposes of public arcade use, the preferred embodiment of the present invention also includes an electronic token receptacle 64 for activation of the system by the bicyclist. However, it is to be understood that the token receptacle 64 is not necessary for the operational effectiveness of the present invention.

The integration of the computer, a sound system, a variably controlled air blower and an authentic appearing and operating bicycle supported by a novel mechanical support assembly is unique. Pursuant to a functional description of each item in detail below, one skilled in the art will appreciate how to integrate the computer with the sound system and the variably controlled blower. The computer and computer software program will be discussed in more detail below. One presently preferred embodiment of a variably controlled blower for use with the present invention is manufactured by Dawton Motor Co. of Chicago, Ill., and identified as model no. 4CG88.

A bicyclist activates the bicycle simulator 10 by depositing a token or coin in the token receptacle 64 or by turning on a conventional power switch (in non-arcade use). The computer is then activated to operate the software program which generates the starting point of the racing track on the display screen 18. The bicyclist may then mount the bicycle 14, placing his feet upon the pedals 34 and hands on the handlebars 36. The bicyclist then awaits the start of the race. When the computer program signals the beginning of the race, the bicyclist is permitted to begin manipulating the bicycle to correspondingly move the animated bicycle along the track. In operating the bicycle 14, the bicyclist rotates the pedals 34 in a forward direction, steers the handlebars 36 in a reciprocating fashion and selectively applies the hand brakes 38a, 38b so as to control movement of the animated bicycle as it progresses along the racing track.

Due to the unique manner in which the bicycle 14 is supported by the mechanical support assembly housed in the base enclosure 24, the bicyclist is permitted to steer the bicycle 14 so as to cause lateral movement of the bicycle 14 from side to side, and rearwardly in a "wheelie" fashion, if so desired. As explained above and in more detail below, particular movements of the bicycle 14 are monitored by a plurality of sensors which communicate with the computer, which responds thereto by generating signals causing the display 18 to illustrate the progressive movement of the animated bicycle on the variable terrain track.

When the race is complete, the computer signals the end of the race on the display screen 18, at which point the bicyclist stops pedalling and may dismount from the bicycle 14. During the course of operation of the bicycle simulator 10, the bicyclist will have experienced a truly simulated feel of manipulating a bicycle while watching progression of its animated counterpart on the track in the display screen 18 and while listening to announcements of that progression from audio speakers 60. It should therefore be appreciated from FIGS. 1 and 2 that operation of the bicycle 14 is virtually identical to operation of a conventional bicycle on a variable terrain roadway. With an overall understanding of the bicycle simulator 10 as described above, further details of the bicycle simulator 10 and its subcomponents may now be described. It will may be of some assistance to introduce individual components where they may be readily viewed in the Figures before describing their function and interrelation with other components.

Figure 3:
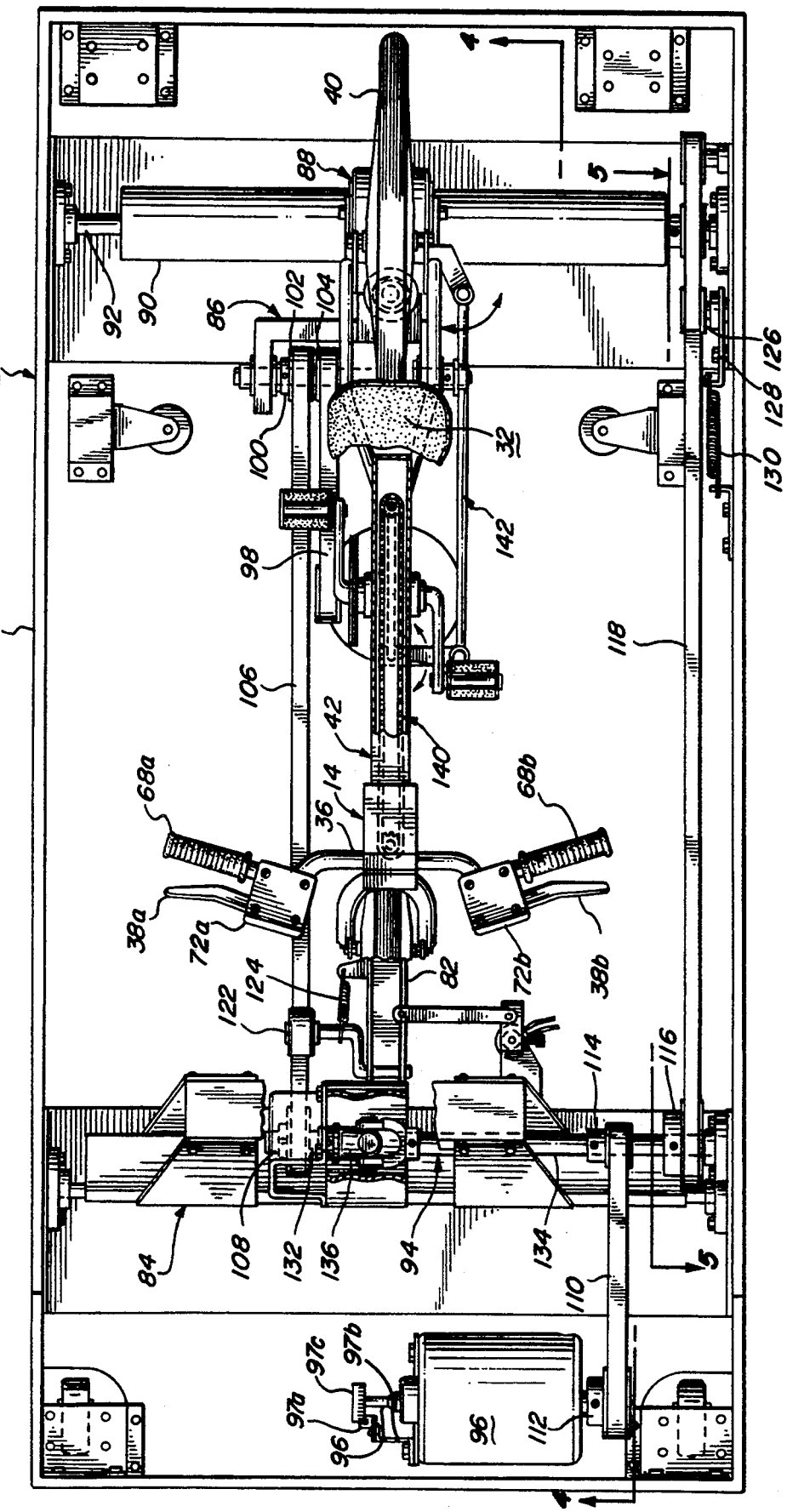
FIG. 3 is a top view of the embodiment of FIG. 2, showing a portion of the bicycle as it is supported from below by the mechanical support assembly.

Referring now to FIG. 3, a top view of the bicycle 14 is shown with the mechanical support assembly, housed in the base enclosure 24, revealed. The bicycle 14 is partially shown for ease of describing its relative position to the mechanical support assembly. It should be appreciated that although the mechanical support assembly is usually not visible, the top face of the housing 54 has been deleted to reveal the mechanical assembly therewithin. In addition, the upright cabinet (shown in FIG. 2) has also been deleted to reveal the forward portion of the mechanical assembly.

It can be seen from FIG. 3 that the bicycle 14 includes the handlebars 36, the cross tube 42, the seat 32 and the rear tire 40. At either side of the handlebars 36 are first and second handgrips 68a and 68b and the first and second handbrakes 38a and 38b, each extending outwardly from first and second potentiometer housings 72a and 72b. Each of the handbrakes 38a, 38b are pivotally secured from the housings 72a, 72b such that their pivotal movement is monitored by a brake potentiometer (not shown) enclosed within the potentiometer housings 72a and 72b. The speed of the animated bicycle progressing on the display screen (see FIGS. 1 and 2) is partially controlled by actuation of the handbrakes 38a, 38b, which actuation is detected by the brake potentiometers. The brake potentiometers generate signals to the computer as an indication of whether the handbrakes 38a, 38b are being applied. As such, when the handbrakes 38a and 38b are applied, the brake potentiometers signal the braking action of the bicyclist to the computer which reflects in alteration of the speed of the animated bicycle on the racing track.

Still referring to FIG. 3, the mechanical support assembly can be seen positioned below the bicycle 14. The mechanical support assembly of the present invention includes a plurality of individual components linked together so as to support the bicycle 14 in an easily translatable fashion. In the preferred embodiment, the mechanical support assembly comprises a main beam 82 extending between a gimbal assembly 84, at the front end of the bicycle simulator 10, and a yoke assembly 86 at the rear end thereof. In the preferred embodiment, the main beam 82 is positioned horizontally. The gimbal assembly 84 will be described in more detail in FIGS. 6 and 7 while the yoke assembly 86 will be discussed in more detail below in association with FIGS. 8-10. However, it is important to note at this point that the yoke assembly 86 supports the rear end of the main horizontal beam 82 by way of a roller assembly 88 which rotatably rests upon a rolling pin 90. The roller assembly 88 is described in more detail in association with FIG. 12A and 12B.

The rolling pin 90 is rotatably supported about a rolling pin axle 92 and is mechanically linked to rotation of the pedals 34 and a drive axle 94 housed within the gimbal assembly 84. Extending forward of the drive axle is a motor 96 which alternatively generates mechanical resistance and power assistance to rotation of the pedals 34 by the bicyclist. While mechanical resistance to pedalling functions to simulate bicycle travel on uphill terrain, mechanical power assistance uniquely simulates travel on downhill terrain. During periods of downhill travel, the bicyclist may "coast,", i.e. continue forward movement without actually pedalling.

The motor 96 of the present invention is preferably of a type having reverse direction capabilities to permit variable direction torque to be applied to the motor 96, as described more fully below. In addition, the motor 96 preferably is electrically connected to the computer so as to be controlled thereby wherein alternative resistive and power assistance may be exerted on rotation of the drive axle 94 by varying the speed of the motor shaft. In the preferred embodiment, the motor 96 is responsive to the computer which, depending on the conditions of the track at any particular location, affects the ease or difficulty of bicyclist pedalling action. As will be discussed in greater detail in reference to FIGS. 13A-13F, effective lateral movement of the mechanical support assembly depends upon continuous rotation of the rolling pin 90. As such, it is important to understand that rotation of the pedals 34 drives rotation of the drive axle 94 which, in turn, drives rotation of the rolling pin 90. In addition, by adding pedalling resistance or pedalling assistance to the bicyclist's pedalling action, the motor 96 also affects rotation of the rolling pin 90. Having identified some of the significant components of the mechanical support assembly, their mechanical interaction can now be described in detail.

Positioned on the rear side of the motor 96 is a motor velocity sensor, or optocoupler 97a which detects the rotational speed of a motor shaft 96i extending out the rear and front sides of the motor 96. The optocoupler 97a is mounted to the rear side of the motor 96 by a bracket 97b which supports the optocoupler immediately adjacent a hub light 97c axially secured to the rear end of the motor shaft 96i. Depending upon the pedalling speed of the bicyclist and the power resistance or assistance of the motor 96, as controlled by the computer, the motor shaft 96i rotates at a certain speed. This speed is monitored by the optocoupler 97a which is connected to the computer. Speed signals generated by the optocoupler 97a are received by the computer in order to vary the speed of the animated bicycle as it progresses along the variable terrain track. As such, the faster the motor shaft 96i rotates, the faster the animated bicycle progresses along the racing track. Likewise, the slower the motor shaft 96i rotates, the slower the animated bicycle progresses. It should be appreciated that resistance to pedalling action as applied by the motor 96 will result in a slower rotation of the drive axle 94 absent accelerated pedalling effort by the bicyclist. Pedalling resistance will be applied during travel upon uphill inclined surfaces. Consequently, absent increased pedalling effort by the bicyclist, the speed of rotation of the drive axle 94 will be reduced, thereby reflecting in slower progression of the animated bicycle along the track. One preferred embodiment of the optocoupler 97a is manufactured by Honeywell and designated as model no. SPX-5129-1.

The assembly of components which mechanically transfer rotational action of the pedals 34 to the rolling pin 90 comprise a plurality of belts and pulleys, as can be seen in FIG. 3. In the preferred embodiment, a clutch belt 98 transfers pedalling action to an idler coupling 100 journaled within the yoke assembly 86 and consisting of two rigidly secured idler pulleys 102 and 104 which rotate in unison. The clutch belt 98 passes over the first idler pulley 104 and transfers energy to the second idler pulley 102. This energy is further transferred from the first idler pulley 102 to a drive belt 106 which connects the idler coupling 100 to a universal joint ("U-joint") pulley 108 secured to the drive axle 94. While the drive axle 94 will be described in greater detail in association with FIGS. 6 & 7, the belts 98, 106 and the idler coupling 100 will be described further in association with FIG. 8.

As indicated above, the motor 96 adds resistance and power assistance to bicyclist pedalling through the drive axle 94. In the preferred embodiment, a motor belt 110 links the motor 96 with the drive axle 94 and circulates over a motor pulley 112 and a first drive axle pulley 114 secured to the drive axle 94. Adjacent to the first drive axle pulley 114 is a second drive axle pulley 116 over which circulates a roller belt 118 which connects the drive axle 94 with the rolling pin 90. The mechanical connection between the drive axle 94 and the rolling pin 90 will be described in more detail in association with FIG. 5. Ultimately, due to the arrangement of belts and pulleys, rotation of the pedals 34 directs rotation of the drive axle 94 and the rolling pin 90. However, as will be explained in greater detail in association with FIG. 5, the direction of rotation of the rolling pin 90 is opposite to the direction of rotation of the pedals 34 and the drive axle 94.

As can be seen in FIG. 3, the drive belt 106, which extends between the yoke assembly axle 86 and the drive axle 94, and the roller belt 118, which extends between the drive axle 94 and the rolling pin 90, are both relatively long. As such, they are subject to a certain degree of sagging and stretching. In addition, the drive belt 106 and the roller belt 118, normally rest slightly loose due to the following design dimensions. In the preferred embodiment of the present invention, the center-to-center pulley separation lengths are preferably slightly smaller than those recommended by manufacturers for the belts. This discrepancy is provided to accommodate inaccuracies in manufacturing tolerances that might otherwise cause the center to center dimensions to exceed the recommended separation length, thereby causing ineffective transfer of mechanical energy. Any resultant sagging in the drive and roller belts 106, 118, respectively, is overcome by applying a tension device to the belt in order to eliminate the slack. The tension device comprises an idler pulley continuously exerted on the belt by the force of a spring. In the preferred embodiment, a first tension pulley 122 is pivotally secured to the main horizontal beam 82 and downwardly applied to the drive belt 106 by the force of a spring 124. A second tension pulley 126, supported from a tensioner plate 128, is applied to the roller belt 118 by the force of a second spring 130. These latter components may be seen more clearly in FIG. 5.

Still referring to FIG. 3, it can be seen that the drive axle 94, positioned within the gimbal assembly 84, comprises a short shaft segment 132, extending through and supporting the U-joint pulley 108. The drive axle 94 also comprises a longer shaft segment 134 connected to the first shaft 132 by a universal joint 136. The second shaft 134 of the drive axle 94 extends through and rigidly supports the first and second drive axle pulleys 114 and 116, respectively, both positioned on the opposite side of the universal joint 136 from the U-joint pulley 108. As indicated above, the first drive axle pulley 114 accepts circulation of the motor belt 110 which transfers mechanical energy from the motor 96 to the drive axle 94. By linking the motor 96 to the drive axle 94, the bicycle simulator 10 is capable of adding pedalling resistance or pedalling assistance to rotation of the drive axle to simulate travel on variable terrain. The second drive axle pulley 116 accepts circulation of the roller belt 118 which transfers mechanical energy from the drive axle 94 to the rolling pin 90. In the preferred embodiment, the belts are of a gearbelt type, i.e., having teeth which securably engage corresponding teeth in gearbelt pulleys. Preferred embodiments of the gearbelts and gearbelt pulleys contemplated for the present invention are manufactured by Browning Mfg. Division, Emerson Electric Co. of Maysville, Ky.

Unique to the present bicycle simulator 10 is a "follower system" which directs lateral movement of the bicycle 14 and simultaneous leaning thereof to simulate travel about a curve in response steering of the handlebars 36. The bicyclist rotates the handlebars 36 by grasping one or both of the hand grips 68 to direct pivotal movement of the roller assembly 88 through a steering assembly 140 and a linkage assembly 142. The steering assembly 140 is enclosed within the frame of the bicycle 14; specifically, the cross tube 42 and the seat tube (not shown), to minimize exposure of the bicyclist to moving mechanical components.

As will be explained in further detail below, rotation of the roller assembly 88 in response to rotation of the handlebars 36 causes the bicycle 14 to move laterally within the base enclosure 24 relative to the rolling pin 90. This relative movement of the bicycle 14 with respect to the rolling pin 90 simulates travel about a curve and will be further appreciated by the detailed description in reference to FIGS. 13A through 13F. The steering assembly 140 will be described in greater detail in association with FIG. 11, while the linkage assembly 142 will be described in more detail in association with FIG. 12.

Figure 4:
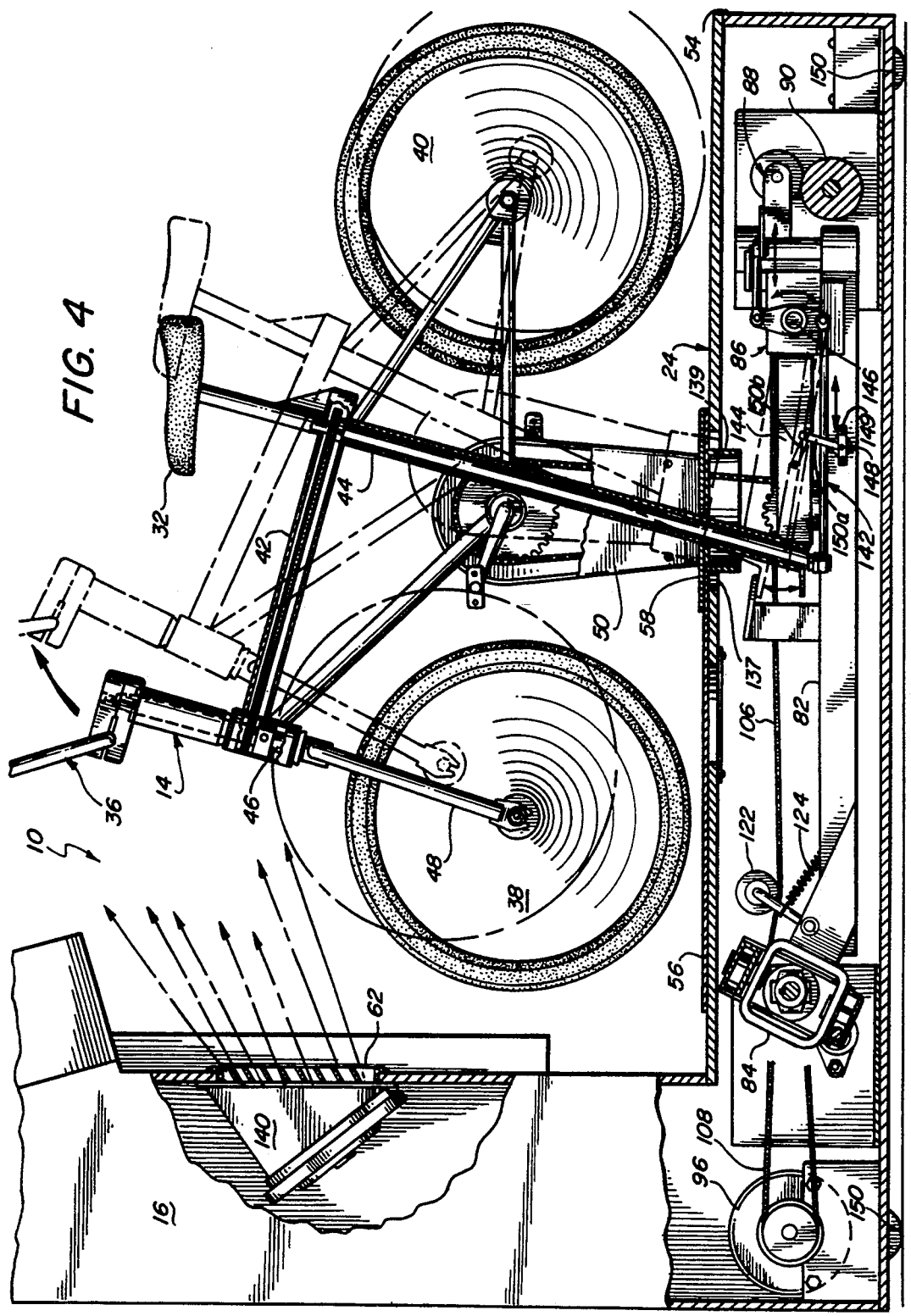
FIG. 4 is a cross-sectional side view of the embodiment of FIG. 3 taken along lines 4—4.

Referring now to FIG. 4, certain portions of the bicycle simulator 10 may be described from a different perspective. There, a side view of the mechanical support assembly below the bicycle 14 is shown. Positioned atop the forward end of the base enclosure 24 is the upright cabinet 16 which houses, among other things, the blower 140. The blower 140 directs forced air across the bicycle 14 through the grill 62 at speeds which are variably controlled by the computer in response to pedalling action to simulate changing wind conditions. Not shown is the computer, the video display and the audio speakers which are each positioned in the upper portion of the upright cabinet 16.

As indicated above, the majority of the mechanical support assembly is enclosed within the base enclosure 24 which comprises the housing 54 having a top wall and the rotatable turntable 56. As alluded to above, an opening 137 in the top wall of the housing 54 permits the extension of the seat tube 44 through the top wall of the base enclosure housing 54 in order to effectively support the bicycle 14. The rotatable turntable 56 securably covers the opening in the housing 54 and encircles a collar 139 directly secured to the seat tube 44 which engages an inner annular edge of the turntable 56 as the bicycle 14 is directed laterally. In the preferred embodiment, the opening 137 in the top wall of the base enclosure housing 54 has an elongate kidney shape wherein lateral movement of the bicycle 14 is generated about an arc. To conceal the joint between the collar 139 and the turntable 56, the present invention includes a loosely fitted cover 58 which encircles the seat tube 44 and rests directly on the turntable 56. As the bicycle 30 moves laterally from side to side, the collar 139 forces the turntable 56 to rotate accordingly while the cover 58 protects a bicyclist from the moving mechanical parts below. With this arrangement, it can be appreciated that the turntable 56 rotates in a "lazy-Susan" fashion.

At the forward end of the mechanical support assembly is the gimbal assembly 84 and the motor 96. At the rear end of the mechanical support assembly is the linkage assembly 142, the yoke assembly 86, the roller assembly 88 and the rolling pin 90.

Still referring to FIG. 4, it can be seen that the bicycle simulator 10 includes an additional feature for simulating actual bicycle racing action; namely, a means for pulling a "wheelie." While the wheelie means will be described in detail in association with FIGS. 8-10, it is identified briefly here. In the preferred embodiment, the wheelie means comprises a pivoting member 144 extending forward from the yoke assembly 86 and pivotally secured thereto about a yoke assembly axle 146. The pivoting member 144 is secured at its forward end to a lower portion of the seat tube 44 of the bicycle 14. The wheelie assembly will be described in more detail in association with FIGS. 8-10. However, it should be understood that with this arrangement, rearward rotation of the bicycle 14 by the bicyclist in a vertical plane causes upward rotation of the pivoting member 144 as shown by the outline of the bicycle 14 in phantom. This is accomplished by shifting the bicyclist's center of gravity to a point sufficiently rearward to effect vertical rotation of the bicycle 14.

It is noted that a wheelie sensor or potentiometer 148 monitors the position of the pivoting member 144 and is mounted to the side of the main horizontal beam 82 by a bracket 149. As actuated by movement of two pivoting sensing arms 150a and 150b, the wheelie potentiometer 148 detects whether or not the bicycle is in a wheelie position and generates an electrical signal accordingly. The first sensing arm 150a is pivotally secured to the potentiometer 148 while the second sensing arm 150b is pivotally secured to the pivoting member 144. As such, rotation of the pivoting member 144 causes rotation of the second sensing arm 150b and the first sensing arm 150a wherein rotation of the latter is detected by the potentiometer 148. The computer receives this signal and varies the progression of the animated bicycle along the racing track as displayed on the display screen. It should be noted that since the corresponding animated bicycle of the bicycle 14 is displayed only as a set of handlebars (see FIGS. 1 and 2), the progression along the track is displayed as it would be viewed by the bicyclist. On generally flat terrain, movement of the bicycle while the bicyclist "pulls a wheelie" reflects in continued forward movement about the rear bicycle tire only. However, when traveling about an inclined portion of the track, the bicycle may react differently when in a wheelie mode. For instance, depending upon the speed that the bicycle is travelling, pulling a wheelie while moving up an incline may reflect on the animated bicycle leaving the track surface in the form of a jump. Accordingly, the bicyclist is able to control movement of the animated bicycle in a more realistic fashion.

While not related to operation of the bicycle simulator 10, the base enclosure 24 is provided with a plurality of canisters 150, two of which are positioned at the forward corners and two of which are positioned at the rear corners. With such an arrangement, the bicycle simulator 10 is selectively mobile and may be directed easily from one location to another about a generally flat surface. Each canister 150 is provided with a conventional wheel lock (not shown) which permits the canisters to be locked in place so as to avoid any undesired movement of the base enclosure 24 during use.

Referring now to FIG. 5, it may be more clearly seen how the preferred embodiment of the bicycle simulator 10 is configured to permit mechanical linkage of the drive axle 94 with the rolling pin axle 92. There it is shown that the roller belt 118 is wound about the second drive axle pulley 116 and further wound about a rolling pin pulley 152, an idler pulley 154 and the tension pulley 126. The purpose of the idler pulley 154 is to reverse the direction of rotation of the rolling pin (shown in FIG. 3) relative to rotation of the drive axle 94. As indicated above, the roller belt 118 is subject to sagging and must therefore be pulled taught in order to maintain an effective transfer of mechanical energy. This pulling action is accomplished by continuously urging the tension pulley 126 away from the rolling pin pulley 152 by a linear spring. The tension spring 130 is secured at one end to the base enclosure 24 and at its other end to the tensioner plate 128 which supports the tension pulley 126.

Referring now to FIGS. 6 and 7, the gimbal assembly 84 may be described in greater detail. As indicated above, the gimbal assembly 84 is positioned oblique to a vertical plane such that the main horizontal beam 82, normally positioned in the horizontal plane, is secured to a gimbal assembly 84 at an angle less than 90°. In FIG. 6, it can be seen that the horizontal beam 82 is secured to a beam housing 156 by two gusset plates 158 preferably welded to each side of the beam 82. To accommodate lateral movement of the rear portion of the horizontal beam 82, the beam housing 156 is pivotally secured within the gimbal assembly 84 (shown more clearly in FIG. 7). In addition, to permit the bicycle to lean to simulate travel about a curve, the beam housing 156 is pivotally secured to the gimbal assembly 84 about an axis 158 at an angle "x" to the vertical plane. The connection of the beam housing 156 to the gimbal assembly 84 will be explained in greater detail in association with FIG. 7. In the preferred embodiment, the angle x is equal to 25°. As such, lateral movement of the main horizontal beam 82 necessarily entails some vertical translation of the main horizontal beam 82 as it moves laterally from side to side. This vertical movement of the main horizontal beam 82 forces the gimbal assembly to rotate forwardly in the direction of the arrow 162. To relieve stress on the gimbal assembly 84, it can be seen by referring to FIG. 7 that this vertical translation is accommodated by securably journalling the gimbal assembly 84 to a gimbal assembly axle 160 which spans the side walls of the base enclosure (shown in FIG. 3). In the preferred embodiment, the axle 160 is radially secured within a set of pillow bearings (not shown) which are commonly known and available to those skilled in the art.

Still referring to FIG. 7, the balance of the gimbal assembly 84 may be more fully described. As indicated above, the main horizontal beam 82 of the mechanical support assembly is secured to the beam housing 156 which pivots about an axis oblique to a vertical plane. It is this oblique orientation which causes the main horizontal beam 82 to lean as it rotates laterally within the base enclosure of the bicycle simulator. (See FIGS. 13D and 13F). It is to be understood that the main horizontal beam 82 is pivotally secured at its forward end to the beam housing 156 while it is free to move laterally at its rear end within the base enclosure. With this arrangement, the bicycle is permitted to lean as the handlebars are turned by the bicyclist to direct the bicycle about a curve.

The gimbal assembly 84 comprises a housing having a top weldment 164 and a lower weldment 166. The weldments 164 and 166 are spaced apart and rigidly supported by four side panels 168*a* through 168*d*. Journaled between tapered bearings (not shown) which are secured within the upper and lower weldments 164, 166 are two short housing axles 170 secured to the upper and lower sides of the beam housing 156. The lower axle is not fully in view in FIG. 7. With this arrangement, the beam housing 156 is permitted rotational movement within the gimbal assembly 84 to accommodate lateral movement of the main horizontal beam 82.

Secured to the far side of the beam housing 156 as viewed in FIG. 7 is a U-joint pulley housing 172 which partially encloses the U-joint pulley 108 about which the drive belt 106 travels. As indicated above, the U-joint pulley 108 is secured to the drive axle 94 so that pedalling action by the bicyclist is transferred through the drive belt 106 to the drive axle 94 and ultimately to the rolling pin (not shown) through the roller belt 118. To accommodate pivotal movement of the main horizontal beam 82, the U-joint 136 is inserted between the short shaft segment 132 (hidden from view by the beam housing 156) and the longer shaft segment 134 which together comprise the drive axle 94. As a result, while the longer shaft segment 134 is positioned in a stationary fashion within a pillow bearing (not shown) secured to the inside wall of the base enclosure housing, the short shaft segment 132 on the far side of the U-joint 136 is permitted lateral movement synchronous with the main beam 82. As such, when the main horizontal beam 82 pivots to the bicyclist's left, the beam housing 156, the U-joint pulley 108, the U-joint pulley housing 172 and the drive belt 106 move in unison.

As explained above, radially secured about the long shaft segment 134 of the drive axle 94 is the first and second drive axle pulleys 114 and 116, respectively. The first drive axle pulley 114 is linked to the motor (not shown) via the motor belt 110 while the second drive axle pulley 116 is linked to the rolling pin (not shown) by the roller belt 118.

A significant feature of the present invention is the ability to more accurately simulate bicycle travel about a variable terrain track. As indicated above, the motor can be variably controlled to not only add mechanical resistance to pedalling action, to simulate uphill travel, but also to add mechanical assistance to pedalling action to simulate downhill coasting. Rotational resistance and assistance to pedalling action is translated to the drive axle 94 by the motor belt 110.

It should be understood that the motor 96 is operated at variable speeds in the same radial direction as the drive axle 94. When the bicyclist has reached the beginning of an inclined portion of the track (visible to the bicyclist on the display screen), the computer signals the motor to apply a reverse torque to the drive axle 94 so as to resist the bicyclist's pedalling. As such, resistance is added to pedalling action because it becomes harder to rotate the drive axle 94. Varying degrees of resistance can be added by the variably controlled motor by simply varying the amount by which the motor's rotational speed is decreased in correspondence to the amount of the uphill grade. Alternatively, when the bicyclist has reached a downhill portion of the track, the computer signals the motor to increase the rotational speed of the drive axle 94 as caused by the bicyclist's pedalling action, thereby augmenting the bicyclist's efforts. This translates into easier pedalling by the bicyclist as the drive axle 94 is being rotated at a faster rate by the motor. As such, the bicyclist can coast along the downhill portion without pedalling as the bicycle continues to advance along the track. Again, variable degrees of power may be augmented based on the speed of the motor as controlled by the computer and corresponding to the amount of the downhill grade. It should be noted that pedalling assistance and resistance can be effectuated by the employment of gearbelts and gearbelt pulleys, as indicated above, which function similarly to gears and eliminate possible belt slippage. In addition, they maximize mechanical transfer efficiency.

It was indicated above that rotation of the bicycle pedals by the bicyclist drives the rotation of the drive axle and ultimately the rolling pin. Most of the components mechanically linking the bicycle pedals with the drive axle may be seen in FIG. 8. There it is shown that the pedals 28, secured to the bicycle frame 30, are connected to a pedal sprocket 180 in a manner typical of conventional bicycles. The pedal sprocket 180 is linked to a lower sprocket 182 by a continuous chain 184. The lower sprocket 182 is axially connected to a sprocket pulley 186 by a support axle 187 which itself is secured to the pivoting member 144. The clutch belt 98 is wound about the sprocket pulley 186 and extends about the first idler pulley 104 in the yoke assembly 86. The first pulley 104 is secured about a yoke assembly axle 146 which rotatably extends through apertures in arms 191 and 193 of the yoke assembly 86. The outer idler pulley 102 is secured adjacent to the pulley 104 and about the yoke assembly axle 146, as explained above. The drive belt 106 is wrapped about the pulley 102. In this manner, rotational energy is transferred from the pedals 28 via the pedal sprocket 180 and continuous chain 184 to the lower sprocket 182. The energy is then transferred from the lower sprocket 182 to the sprocket pulley 186 and then via the clutch belt 98 to the pulley 104. From pulley 104 the energy is transferred via the pulley 102 to the drive belt 106, from whence it is transferred to the drive axle 84 as described above.

By reference to FIGS. 8–10, the wheelie assembly may be more fully described. Referring to FIG. 8, it is noted that the wheelie means comprises the pivoting member 144, referred to above in association with FIG. 4. The pivoting member 144 is journaled at its rearward end about the yoke assembly axle 146. At its forward end, the pivoting member 144 is rigidly secured to the bottom of the seat tube 44 which supports the bicycle frame 30. With this arrangement, the pivoting member 144 is pivotable in a somewhat restrained fashion by the thrust of the bicyclist. The bicycle frame 30 is positioned relative to the pivoting member 144 such that shifting of the bicyclist's weight a sufficient distance in the rearward direction causes the pivoting member 144 to pivot upwardly and rearwardly thereby simulating a wheelie. As indicated above, wheelie movement of the bicycle 14 can be seen in FIG. 4 by the rearward position of the bicycle shown in phantom.

As shown in FIG. 8, pivotal motion of the pivoting member 144 necessarily causes the movement of the lower sprocket 182 and the sprocket pulley 186 relative to the yoke assembly axle 146. While slight slippage of the clutch belt 98 occurs, it is negligible and has not effect on the effective transfer of mechanical energy from the pedals 28 to the drive axle (not shown). This arrangement was designed to advantageously permit such energy transfer while still providing a means for simulating a wheelie.

To prevent possible injury to a bicyclist of the bicycle simulator while pulling a wheelie, a device is provided for limiting the pivotal movement of the bicycle. Referring to FIGS. 9 and 10, the limiting device can be described. In FIG. 9, the wheelie assembly can be seen positioned in a horizontal fashion. The pivoting member 144 normally rests on a resilient cushion 200 secured to the top side of the main horizontal beam 82. At the forward end of the pivoting member 144 is bottom portion of the seat tube 44 which supports the bicycle frame (shown in FIG. 8). Attached to the lower portion of the seat tube 44 is a first stop plate 202 that is engageable with a second stop plate 204 positioned atop a pedestal 206 rigidly secured to the top surface of the main horizontal beam 82. When the bicyclist throws his weight rearwardly, at the same time pulling upwardly on the handlebars, the pivoting member 144 will be caused to pivot upwardly as shown in FIG. 10. There it can be seen the two stop plates, 202, 204 are engaged when the bicycle has reached its rearward limit. As such, the pivoting member 144 is limited to rotation between the cushion 200 and the second stop plate 204. Depending on the extent of rotation desired in simulating a wheelie, the height of the pedestal 206 can be varied accordingly, thereby increasing or decreasing the range that the pivoting member 144 can rotate.

Referring now to FIGS. 11-12A, the steering assembly 140, the linkage assembly 142 and the roller assembly 88 can be described in detail. In order to understand how the follower system functions to effectively simulate bicycle travel about a curve, it is important to understand how the roller assembly 88 is controlled by rotation of the handlebars. That control is provided by the steering assembly 140 and the linkage assembly 142, as indicated above and described in detail below.

Referring first to FIG. 11, the steering assembly 140 can be more fully appreciated. There it is shown that the bicycle steering column 46 extends below the handlebars (not shown) and supports the front tire fork 48. Radially secured to the steering column 44 is a first steering sprocket 210 such that rotation of the handlebars causes rotation of the steering column 44, the first steering sprocket 210 and the front tire fork 256 in the direction of arrows 212. A second steering sprocket 214 is radially supported about a steering shaft 216 housed within the seat tube (shown in FIG. 4) of the bicycle frame (not shown). The first steering sprocket 210 is linked to the second steering sprocket 214 by a chain 218 housed within the cross tube (shown in FIG. 4) of the bicycle frame. The steering shaft 216 is secured at its base to a reciprocating arm 222 which is rotated in the direction of the arrow 224 in correspondence with the steering column 46. The reciprocating arm 222 is an integral member of the linkage assembly 142 described below in reference to FIG. 12A. The reciprocating arm 222, as with the handlebars and the steering sprockets 210, 214, rotates in the direction of arrows 212 and 224 in a generally horizontal plane.

Referring now to FIG. 12A, it can be seen that the steering shaft 216 is connected to the linkage assembly 142 by the reciprocating arm 222. In the preferred embodiment, the linkage assembly 142 comprises the reciprocating arm 222 connected to a first connecting rod 226. The first connecting rod 226 is connected to a first end of the reciprocating arm 222 such that rotation of the first connecting rod 226 results in linear movement of the first connecting rod 226 as shown by the arrow 228. A rocker arm 230 is rotatably secured about the yoke assembly axle 190 (FIG. 8) and is connected on a first end to the first connecting rod 226 and on a second end to a second connecting rod 232. Linear movement of the first connecting rod 226 causes rotation of the rocker arm 230 in the direction of arrow 234 and also linear movement of the second connecting rod 232 in the opposite direction. The second connecting rod 232 is, in turn, pivotally secured to a roller guide 240 which is rigidly secured to the roller assembly 88. The second connecting rod 232 is thus linked to the roller assembly 88 in a fashion so that linear movement of the second connecting rod 232 causes rotation of the roller assembly 88 in a horizontal plane as indicated by the arrows 242. The roller assembly 88 will subsequently be described in more detail in association with FIG. 12B.

Preferably mounted to the yoke assembly axle 190 (FIG. 8) at a location proximate to the rocker arm 230 is a steering potentiometer (not shown) which monitors movement of the rocker arm 230 and thereby provides an indication of the position of the linkage assembly 142 in response to the steering assembly 140 (FIG. 11). The steering potentiometer sends an electrical signal indicative of the position of the handlebars of the bicycle as the bicyclist steers the bicycle. This signal is received by the computer which directs movement of the animated bicycle on the display screen along the racing track. By steering the bicycle to the left, the animated bicycle is caused to veer to the left accordingly. Similarly, when the bicycle is turned to the right, the computer directs the animated bicycle to the right on the display screen.

By further reference to FIG. 12A, it can be seen that a roller stop 244 is connected to the bottom portion of the roller assembly 88 and extends forwardly thereof. The roller stop 244 functions to redirect the rotational position of the roller assembly 88 relative to the rolling pin 90 when the main horizontal beam (not shown) has reached the desired limit to its lateral movement within the base enclosure (not shown). Aiding the return of the roller stop 244 to its normally straight position in alignment with the main horizontal beam is a return spring 245 secured at its other end to the floor of the base enclosure. Actual operation of the roller assembly stop 244 will be discussed further below in association with FIGS. 13A through 13F.

Referring now to FIG. 12B, the roller assembly 88 illustrated as viewed from the left rear. While a roller assembly may be designed in various configurations which permit horizontal rotation thereof, the preferred embodiment comprises a roller 246 supported by a roller support 248. The roller 246 is permitted to freely spin about a roller axle 250 due to its frictional engagement with the rolling pin 90 which spins about the rolling pin axle 92. The roller support 248 is a U-shaped bracket rigidly secured to a roller shaft 252 rotatingly supported within tapered bearings (not shown) and extending between the rearward end of the horizontal beam 82 and the back portion of the yoke assembly 86. The top of the roller shaft 252 is journaled within bearing housings 254a and 254b. The lower bearing housing 254b is secured directly to the rear end of the main horizontal beam 82 while the upper bearing housing 254a is secured directly to a plate 258 extending rearwardly from the top rear portion of the yoke assembly 86. Secured across the top of the roller support 248 is the roller guide 248 referred to above in association with FIG. 12A. Since the roller guide 240 is secured to the linkage assembly 142 (FIG. 12A), movement of the linkage assembly results in the rotation of the roller assembly 88 in a horizontal plane. It should now be appreciated that rotation of the steering column 46 (shown in FIG. 11), in turn, causes the reciprocating arm 222 (shown in FIG. 12A) to reciprocate thereby causing linear movement of the second connecting rod 232 and ultimately rotation of the roller assembly 88. The rotation of the roller assembly 88 responsive to the bicyclist's steering action results in the movement of the roller 250 relative to the rolling pin 90. This interaction between the spinning rolling pin 90 and the spinning roller 250 significantly contributes to the simulation of travel about a curve as effectuated by the follower system.

Referring now to FIGS. 13A through 13F, the follower system may be described in detail. For simplification purposes, it is necessary to explain that FIGS. 13A and 13B illustrate the mechanical support assembly as it is positioned when the bicycle is brought by the bicyclist into a straight direction (i.e., in the middle of the base enclosure). FIGS. 13C and 13D illustrate the mechanical support assembly as positioned when the bicycle is turned to the right to simulate travel about a curve. In this position, the mechanical support assembly is located to the bicyclist's left side of the base enclosure. Finally, FIGS. 13E and 13F illustrate the mechanical support assembly when the bicycle is turned to the left (i.e., positioned to the bicyclist's right side of the base enclosure).

Referring first to FIG. 13A, the mechanical support assembly is shown positioned perpendicular to the rolling pin 90 in alignment with its mid-section. With this arrangement, the bicyclist experiences simulated travel in a straight direction. In FIG. 13A, it can be seen that the mechanical support assembly comprises the main horizontal beam 82 secured at its forward end to the gimbal assembly 84 and at its rear end to the yoke assembly 86 and the roller assembly 88. Extending outwardly from the side of the pivoting member 144 is the lower sprocket 182 and the sprocket pulley 186 which are physically secured together and are journaled about the axle 187. Together with the first and second idler pulleys 102, 104, the lower sprocket 182 and the sprocket pulley 186 transfer pedalling action to the drive axle 94 by circulation of the clutch belt 98 and the drive belt 106. As explained earlier, the yoke assembly 86 comprises a u-shaped frame having arms 191 and 193 in which the yoke assembly axle 146 is secured. The yoke axle 146 supports the first and second idler pulleys 102, 104 as well as the pivoting member 144 (FIG. 8).

The roller assembly 88 is supported from the rear portion of the yoke assembly 86. As indicated above in association with FIGS. 11–12B, rotation of the handlebars 36 causes the reciprocation of the roller assembly 88 through the steering assembly (not shown) and the linkage assembly 142.

As discussed above in association with FIG. 4, bicyclist pedalling action in the forward direction rotates the drive axle 94 in the direction of the arrow 260 which ultimately results in the reverse direction of the rolling pin 90. Because the roller 246 of the roller assembly 88 frictionally engages the rolling pin 90, clockwise rotation of the rolling pin 90 causes counter-clockwise rotation of the roller 246. In order for the follower assembly to operate effectively, the bicyclist must be pedalling so that rotation of the rolling pin 90 relative to the roller 246 facilitates lateral movement of the roller assembly 88 from one side to the next as will be discussed in FIGS. 13C through 13F.

Still referring to FIG. 13A, one of several potentiometers used to sense the position of the bicycle is shown. Secured to the forward portion of the main horizontal beam 82 is a pivot sensor or potentiometer 270 supported from a rigid bracket 272 extending from a rear portion of the gimbal assembly 84. The pivot potentiometer 270 movement of the main horizontal beam 82 through sensing arms 274 and 276 which are pivotally secured to each other and to the main horizontal beam 82. As will be appreciated from FIGS. 13C and 13D, movement of the main horizontal beam 82 from one side to the next triggers rotation of the sensing arm 276 thereby changing the resistance of the pivot potentiometer 270. The pivot potentiometer 270 monitors direction of the bicycle in cooperation with the steering potentiometer. As with all of the potentiometers, the pivot potentiometer 270 is electrically interfaced with the computer so that relative movement of the bicycle may be translated into movement of the corresponding animated bicycle on the display screen.

In addition to the pivot potentiometer 270, the present invention includes a wheelie potentiometer 148 (FIG. 4). The wheelie potentiometer 148 is mounted to the side of the pivoting member 144 and generates an electrical signal in response to the position of the pivoting member 144. In this manner, the computer receives additional information regarding the position of the animated bicycle relative to the variable terrain track.

Referring now to FIG. 13B, it can be seen that the main support for the bicycle extending upwardly from the main horizontal beam 82 is the seat tube 44. It can also be seen that when the main horizontal beam 82 is positioned in the middle of the rolling pin 90, that the seat tube 44 is aligned in a vertical plane. As will be explained below, lateral movement of the main horizontal beam from one side to the other of the base enclosure causes the seat tube 44 to lean oblique to the vertical plane from one side to the other. This leaning capability permits more accurate simulation of travel about a curve.

Referring now to FIGS. 13C and 13D, the mechanical support assembly is shown positioned to the left side of the rolling pin 90. In FIG. 13C it can be seen that the handlebars 36 are turned towards the right in simulation of travel about a righthand curve. Through movement of the steering mechanism (not shown) and the linkage assembly 142, this clockwise rotation of the handlebars 36 results in the counter-clockwise rotation of the roller guide 240 thereby rotating the roller assembly 88 accordingly. Because the roller assembly stop 244 is rigidly secured to the roller assembly 88 as described above, rotation of the roller assembly 88 causes radial movement of the stop 244 in the direction of the bicyclist's left side. Due to the spinning action of the roller 250 when engaged with the rolling pin 90, the energy necessary to overcome the weight of the roller assembly 88 is reduced. As the bicyclist pedals the bicycle, rotation of the roller assembly 88 in the horizontal plane causes the mechanical support assembly to travel in the direction that the roller 250 is spinning. As such, when the handlebars 36 are turned towards the right, the roller assembly 88 is directed towards the left side of the bicycle simulator 10. Continued lateral movement of the mechanical support assembly to the left causes the roller stop 244 to contact a first limit wheel 282a secured to the interior wall of the base enclosure housing (not shown). The limit wheel 282a provides a means for limiting lateral movement of the mechanical support assembly. Returning the handlebars 36 to a straight direction returns the mechanical support assembly to a central position relative to the rolling pin 90, as shown in FIG. 13A. As explained above in association with FIG. 12A, the return spring 245 (not shown) returns the roller stop 244 to its normal position in alignment with the main horizontal beam 82. In addition, a limit rod 284 extends axially from the left side of the yoke assembly axle 146 as a means for limiting laterally movement of the mechanical support assembly to the left. As indicated above, several mechanical components are positioned on the left interior side of the base enclosure. (See FIG. 5). These components are susceptible to damage if the mechanical support assembly is permitted to move to the left excessively. The length of the limit rod 284 is designed such that the end of the rod 284 almost meets the interior wall of the base enclosure (not shown) when the roller stop 244 engages the limit wheel 282a.

Because the main horizontal beam 82 is secured to the gimbal assembly 84 at an angle, as discussed in association with FIGS. 6 and 7, lateral movement of the main horizontal beam 82 from one side to the other causes slight rotation of the beam 82 in a vertical plane. Referring to FIG. 13D, it can be seen that the seat tube 44, which supports the bicycle (not shown), is now leaning oblique to the vertical plane. The bicyclist sitting upon the bicycle experiences leaning as the mechanical support assembly translates laterally within the base enclosure. This leaning action, in addition to rotation of the handlebars and front tire relative to the bicycle and turning of the bicyclist due to lateral movement of the rear of the bicycle, more accurately reflects movement of the bicycle as it travels about a curve.

Referring momentarily back to FIG. 13C, it can be seen that when the main horizontal beam 82 is at its furthest left position, the sensing arm 276 has rotated in a clockwise direction as directed by the first sensing arm 274. This rotation translates into a resistance change within the potentiometer 270 which in turn is reflective of the position of the bicycle within the computer.

Referring now to FIGS. 13E and 13F, it can be appreciated that when the handlebars 36 are turned towards the left, the mechanical support assembly is directed towards the right of the base enclosure (not shown) with simultaneous rotation of the roller assembly 88 towards the left. When the mechanical support assembly has moved to the furthest right position, the roller assembly stop 244 engages the other limit wheel 282b thereby limiting further lateral movement of the main horizontal beam 82. Lateral movement of the main horizontal beam 82 pulls the first sensor arm 274 so as to rotate the second sensing arm 276 in a counterclockwise direction thereby signalling a change of position to the computer through the potentiometer 270. As can be seen in FIG. 13F, when the mechanical support assembly has moved to the right, the seat tube 44 is now in an oblique position relative to a vertical plane, although in an opposite direction to that shown in FIG. 13D. Again, this oblique alignment permits the simulation of travel about a lefthand curve by movement of the handlebars and front bicycle tire relative to the rest of the bicycle and simultaneous leaning towards the left.

Having sufficiently described the mechanical aspects of the present invention, a description of the computer and the computer software program necessary to accomplish the various simulating features can now be discussed in detail.

The electrical aspects, including computer and computer software, of the present invention are best introduced by first presenting a system overview of the bicycle simulator 10 of FIG. 1. As shown in FIG. 1, the present bicycle simulator 10 is a device that allows the user, or bicyclist 12 to simulate movement through an artificial, computer-created track universe.

The track universe of the preferred embodiment, a portion of which is displayed on the video display 18 at any one time (for example, as further shown in FIG. 15), is designed by one or more artists who preferably use a computer animation tool such as, for example, the Super 3D program that is licensed by Silicon Beach Software of San Diego, Calif. To improve the storage capacity and display time for a simulated three-dimensional image, track 20 (e.g., endless loop or linear) is stored in a memory as a set of adjacent polygons, or tiles. Each track polygon is concisely defined and stored in the memory as a set of Cartesian points (the polygon vertices) which all lie in the same plane. In the presently preferred embodiment, to reduce the processing time associated with the calculations of conforming the bicycle 14 to one polygon of the track surface (as is described below), the track polygons are strictly limited to having either three or four vertices.

The polygonal tiles represent the track surface 10 on which the bicyclist moves. In one preferred embodiment, the track surface 10 has hills and valleys, banked corners, and other like features which would be typical of an authentic track for BMX racers. However, the track 10 can also comprise other settings, including "fantasy" tracks which do not relate to typical venues for bicycling. In the track universe, the track surface 10 is surrounded by other graphical objects built from polygons (such as a grandstand) which are separated from the track 20 and from one another by empty space. The track 10 is suspended inside of a colored box so as to provide the illusion of a ground surface underneath the undulating track 10. Polygons adjacent to the track 10, e.g., side skirts, can simulate the features of a terrain having surface irregularities.

As the simulated bicycle moves through the track universe, the video display 18 is updated so as to maintain a view into the universe from the first-person perspective of the bicyclist 12. In the track universe, forces of the bicyclist 12 and nature are applied to a bicycle simulation or model so as to move the simulated bicycle through the track universe. Further references hereinbelow to the bicycle 14 may also be used to indicate the simulated bicycle but it will be understood from the surrounding text that the simulated bicycle of the bicycle model is not the physical bicycle 14.

The bicyclist 12 applies a force on the pedals 34 (FIG. 2) of the bicycle 14 so as to increase the pedal velocity, as is commonly measured in revolutions per minute (rpm), and proportionately increase the force to the tires (of the bicycle model) in contact with the track 20. This rotational pedaling force is commonly called thrust. Thus, as the bicyclist 12 pedals, the thrust is sensed and the video display 18 is updated to provide the bicyclist 12 with the appearance of moving forward around the track 20.

The bicyclist 12 can also apply an opposing force (or resistance) to forward movement by using the front and rear hand brakes 38a, 38b on the bicycle 14. In addition, the bicyclist 12 can turn the bicycle 12 in the plane of the track surface by moving the handlebars 36 (FIG. 2). An out-of-plane force is affected when the bicyclist 12 pulls up on the handlebars 36, causing the bicycle 14 to "pop a wheelie" as previously described.

Nature applies another set of forces to a bicycle. These forces are simulated by the bicycle model. Chief among the forces of nature, and those which are modeled by the presently preferred embodiment of the bicycle model are gravity, friction and air resistance. Among these natural forces, gravity is the strongest, maintaining the bicycle on the track surface, increasing or decreasing speed according to the slope of the track surface, and counteracting any out-of-plane force initiated by the bicyclist such as a wheelie or a jump.

The motion of the bicycle 14 in the track universe is represented and maintained in the bicycle model by a vector containing three dimensional position, velocity and acceleration information. In calculating bicycle motion, the bicycle model uses the reference frame of the bicyclist 12. The momentum of the bicycle 14 is a function of velocity, i.e., momentum is the product of mass and velocity ($M=mv$), and force is a function of acceleration, i.e., force is the product of mass and acceleration ($F=ma$). In the preferred bicycle model, the mass is normalized to one (or ignored) to simplify calculations. The forces applied to a bicycle are well-known and may be consulted in any number of publications. One noteworthy source that describes the physics of the bicycle in some detail is the book entitled "Bicycling Science" Second Edition, by Frank Rowland Whitt and David Gordon Wilson, The MIT Press, Fourth Printing, 1988, chapters 4-9 of which are hereby incorporated by reference herein.

As noted above, the motion of the bicycle 14 in the track universe is communicated to the bicyclist 12 by the video display 18. The bicycle model is preferably embodied in computer software which is executed by the computer so as to generate three-dimensional polygon graphics to the video display 18. Thus, the bicyclist 12 receives visual feedback that simulates travel through the track universe.

In addition to the feedback provided by the video display 18, the computer controls the motor 96 (FIG. 3) by a motor velocity control line (not shown). By transmitting predetermined commands, the computer can vary the velocity of the motor 96. The motor 96 has a given dynamic range of velocity. Theoretically, the motor 96 would provide a maximum resistance so as to prevent any forward movement at all by the bicyclist 12, for example, when climbing a very steep incline. However, in the arcade game embodiment of the bicycle simulator 10, a precise emulation of the actual world is clearly undesirable and so such an event will not occur.

The preferred bicycle model therefore distorts reality so that the forces of nature acting against the thrust of the bicyclist 12 are not overly burdensome. For example, when the bicycle model simulates the bicyclist 12 climbing a hill, at the base of the hill the actual natural forces which would confront a bicyclist are generated by the motor 96. With time, the actual forces are gradually mitigated by the bicycle model, without presenting unrealistic feedback to the bicyclist 12.

A minimal resistance provided by the motor 96 corresponds to the small frictional forces associated with level surface. When the motor 96 is directed to disengage from the rolling pin 90 (FIG. 3), there is no resistance to bicycle thrust. In the real world, this situation corresponds, for example, to the bicycle 14 (of the bicycle model) being airborne after a jump. When the motor 96 is directed to increase its velocity, the bicyclist 12 is given power assistance via the action of the pulley mechanism, previously described, on the rolling pin 90. Thus, the bicycle model simulates downhill motion, for example.

The video display 18 is updated every display cycle. For the most part, the period of the display cycle depends on the number of visible polygons which are presented to the video display 18 by the computer, as the display of each additional polygon is the result of an incremental computational burden. In the presently preferred embodiment, the video display 18 is updated with a frequency in the range of 10 to 16 Hz.

As is shown in the electrical block diagram of FIG. 14, a computer 400 controls a number of input/output (I/O) devices connected to the bicycle simulator 10 (FIG. 1). The computer 400 is preferably housed in the upright cabinet 16 of FIG. 1. Central to the operation of the computer 400 is a main board, or motherboard 402 which comprises the central control functions of the computer 400. However, one skilled in computer technology will recognize that the separation of the computer into the motherboard 402 and associated circuits and boards as presented in FIG. 14 is, of course, just one possible logical and physical arrangement of the computer 400.

In the preferred embodiment, the motherboard 402 includes a microprocessor (not shown) such as a Motorola 68010 or another microprocessor from the 680×0 family. The motherboard 402 also includes a graphics processor (not shown) such as, for example, one of the Texas Instruments 340 Graphic System Processor (GSP) family. The preferred motherboard 402 further includes eight analog-to-digital (A/D) convertors for sensor input ports, a set of switch input ports, an optocoupler input port, a video controller circuit and a timer interrupt circuit, none of which are shown.

A start switch or button 404, an abort switch or button 406, a coin 1 switch 408 and a coin 2 switch 410 are connected through a set of switch inputs (not shown) to the motherboard 402. The coin switches 406, 408 are housed in the token receptacle 64 (FIG. 2). The start and abort switches 404, 406 are mounted on the housings 72a, 72b (FIG. 3) located on the handlebars 36.

The coin switches 408, 410 indicate whether coins have been received and thus whether to allow the bicyclist 12 to play the arcade game embodiment of the bicycle simulator 10. After depositing coins, the start switch, or button 404 can be depressed by the bicyclist 12 to start the bicycle simulator 10. Alternatively, the bicycle simulator 10 can be started by pedaling, depression of the handbrakes 70a, 70b or pushing the abort button 406. Once the bicycle simulator 10 begins operation, the abort button 406 can be depressed by the bicyclist 12 to terminate the operation of the bicycle simulator 10, for example, if the bicyclist 12 becomes too winded to continue. By aborting operation, the motor 96 is disengaged so that the bicyclist 12 can safely leave the simulator 10.

A set of sensors 412, 414, 148, 418 and 270 are also connected to the motherboard 402. These sensors are preferably embodied as potentiometers. The front and rear brake sensors 412, 414 indicate to the computer 400 whether either of the handbrakes 38a,b (FIG. 3) have been depressed. The brake sensors 412, 414 are located in the housings 72 mounted on the handlebars 36 as shown in FIG. 3. The wheelie sensor 148 indicates to the computer 400 when the front wheel of the bicycle 14 has left the ground (in the sense of the bicycle model). The wheelie sensor 148 is located inside the horizontal beam 82 (FIG. 3), forward of the pivot point at 192. The steering sensor 418 senses the axial position of the handlebars 36 (FIG. 3) of the bicycle 14 as indicated by the arrows 212 of FIG. 11. The steering sensor 418 is secured to the yoke assembly 86 (FIG. 8). Lastly, the pivot sensor 270 senses the yaw of the bicycle 14. The location of the pivot sensor 270 on the bicycle 14 is shown in FIG. 13A.

To accomplish its task, the microprocessor on the motherboard 402 is served by on-board random access memory (RAM) of *32* k bytes and a program ROM of 1 Megabyte where the bicycle model software is stored. In addition to the motherboard memories, an auxiliary memory 422 is connected to the motherboard 402 which in the preferred embodiment comprises 64 k bytes of RAM and 1.28 Megabytes of ROM. Furthermore, the motherboard 401 employs an audio processor 426 to generate music, shouts, noises and other such sounds from the speakers 60. A digital signal processor 424, including a DSP chip such as an Analog Devices ADSP-2100, is connected to the motherboard 402 for scaling, translation and rotation of the polygons which will be displayed to the user 12 on the video display 18.

The motherboard 402 also sends velocity commands to a motor/fan controller 430. The presently preferred controller 430 utilizes pulse width modulation (PWM) of the AC line (not shown) to vary the speed of the blower, or fan 146. For example, as the bicyclist 12 pedals faster, the computer 400 commands the controller 430 to proportionally increase the fan velocity hence simulating the naturally expected increasing rush of air associated with a speeding bicycle. The motor/fan controller 430 also controls the dual-direction motor 96 which is connected to the rolling pin 90 (FIG. 3) of the bicycle simulator 10. The controller 430 also uses PWM but of alternate halves of the AC line to control the velocity and direction of the motor 96. To drive the motor 96 in one direction, the positive halves of the AC line are used. To drive the motor 96 in the opposite direction, the negative halves of the AC line are used. The width of the positive or negative half, AC line pulse applied to the motor 96 by the controller 430 is varied to control the velocity of the motor 96. The dual-direction motor 96 is a motor of standard DC brush/commutator construction that is optimized for the load of the bicycle 14. The portion of the motor/fan controller 430 that controls the motor 96 is similar (if modified) to Dayton SCR Controller No. 6X165 available from W. W. Grainger of Chicago, Ill. However, the W. W. Grainger controller would have to be modified for the simulator 10 so that the controller would accept computer input.

The thrust of the bicyclist 12 is indirectly calculated by the bicycle model as a function of the motor velocity. The velocity of the motor 96 is measured by the motor velocity sensor 109. In the presently preferred embodiment of the bicycle simulator 10, the motor velocity sensor 109 is embodied by an optocoupler as set forth above. The sensor 109 is mechanically connected to the motor 96. The sensor 109 thus provides an electrical signal to the motherboard 402 which is proportional to the speed of the motor 96.

Figure 15:
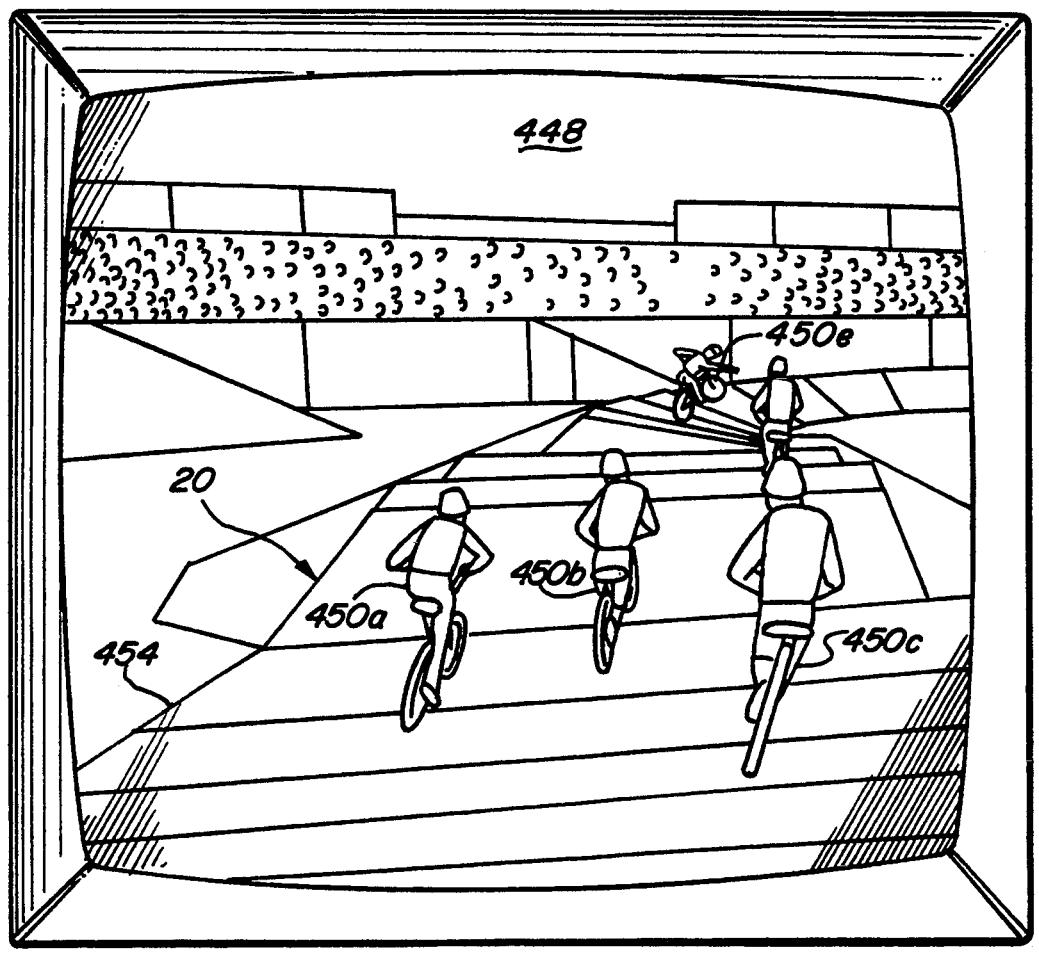
FIG. 15 is a diagram of the simulated bicycle track and bicycle drones corresponding to a representative screen provided by the computer and video display of FIG. 14.

The motion of the bicycle 14 through the track universe generated by the computer 400 is displayed to the user on the video display 18. One preferred video display 438, such as model no. 25K7171 available from Wells-Gardner of Chicago, Ill., is a multi-synchronous display that can be configured to display 512×288 pixels. FIG. 15 is an exemplary screen display that is presented on the video display 18 of the arcade game embodiment of the bicycle simulator 10.

The screen display of FIG. 15 shows one perspective at one point and time in a track (or graphical) universe 448. The perspective of the track universe 448 is from the first-person viewpoint of the bicyclist 12. In the view shown in FIG. 15, a number of drone bicyclists 450a, 450b, 450c, 450d, 450e are presented to appear on the track 20 in front of the bicyclist 12. The drones 450 are modeled so that they follow the contours of the track 20, but they may go airborne after cresting a hill as shown, for example, by the drone 450e. The track 20, on which the bicyclist 12 attempts to maneuver through the graphical universe 448, is shown to be in the forward direction of bicycle travel. As previously noted, the preferred track 20 includes a number of connected track polygons such as the one indicated at 454. To heighten the reality of the bicycle simulator 10, handlebars 22 (as shown in FIG. 1), representing those of the bicycle 14, can be displayed in the foreground of the screen display.

Figure 16:
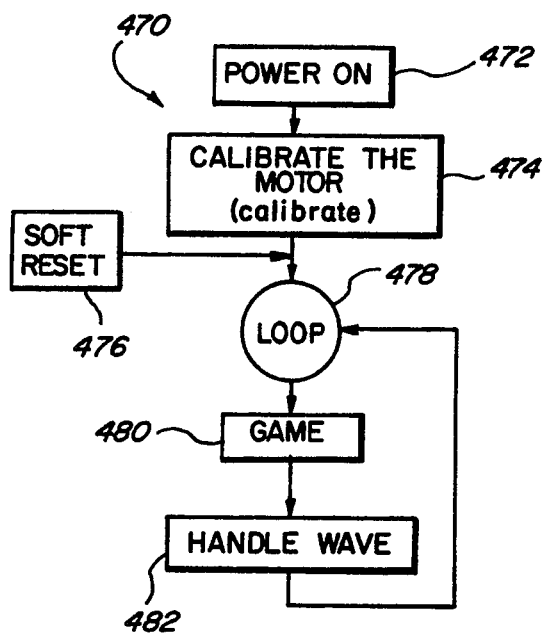
FIG. 16 is a flow diagram of the preferred bicycle model of the present invention.

The bicycle simulator 10 of the present invention includes a computer program called the bicycle model which is illustrated in diagrammatic flow format and generally designated at 470 in FIG. 16. In the presently preferred embodiment, the bicycle model 470 is written in the "C" language and cross-compiled on a Digital Equipment Company VAX computer using a Green Hills Software, Inc. "C" compiler available from Oasys, a division of Xel, Inc. of Waltham, Mass. The bicycle model 470 is then executed on the Motorola 68010 microprocessor located on the motherboard 402 (FIG. 14). However, one skilled in the art of computers will recognize that many other computers, computer languages and compilers, including more than one of each, may be used to achieve the same result.

The bicycle model 470 begins at a power-on state 472 after the power switch (not shown) has been switched to an "on" position. The bicycle model next moves to a state ("calibrate") 474, wherein the model 470 calibrates the motor 96 (FIG. 3) as will be further discussed below. The calibration state 474 is necessary for at least two reasons. First, if the motor 96 is not operational, then this fact will be detected during calibration. Second, as the motor 96 ages, the rotational force generated by the motor 96 will tend to decrease. Therefore, the control of the motor 96 will be dependent upon the limits of the most recently measured rotational force.

In general terms, calibrate 474 compares the velocity called for by the bicycle model 470 against the velocity read from the motor velocity sensor (optocoupler) 109

(FIG. 14). Spin delay data is gathered, as will be described, and then compared with a default table of spin delays, i.e., the difference in time between when the velocity command was sent and the time when the motor 96 has reached the specified velocity. The gathered spin delay data is then compared against a predetermined table of default values stored in a 2 k byte zero-power RAM on the motherboard 402. Then, using standard statistical techniques, if the gathered spin delay data is less than 5% different, for example, than the predetermined data, the new data is stored in zero-power RAM for use as the new default data. If, on the other hand, the tested spin delay is greater than the preselected tolerance, then the motor 96 is assumed to be out of tolerance due to operator error such as, for instance, the bicycle 14 being jiggled, and the default data is used by the bicycle model 470.

The data gathering step of calibrate 474 includes the steps of measuring the time to change velocity from the motor 96 at zero velocity to maximum velocity (spin-up), e.g., about a ¼ second, and measuring the time to change velocity from the motor 96 being at maximum speed to zero velocity (spin-down). Similar steps are performed for ¾ speed and ½ speed spin-up and spin-down times.

From either the calibrate state 474 or from a soft reset state 476, a loop is entered at the loop state 478. The soft reset 476 is caused whenever the bicyclist 12 puts coins in the bicycle simulator 10 as detected by the computer 400 via the coin switches 408, 410. From the loop state 478, the bicycle model 470 enters the game function 480 which will display animation comprising a continuous sequence of views around the track 20 as, for example, shown in FIG. 15. When the game function 480 has finished operation, i.e., a full circuit of the track 12 has been made, the bicycle model 470 moves to a state 482 to handle the "wave".

In the presently preferred arcade game embodiment, the bicyclist 12 may select one of four separate tracks 20 and associated with each region are five waves, or cycles, through the region. Thus, the bicycle model 470 will complete operation on the current wave, and will then move from the handle wave state 482 to the loop state 478 to continue until the given number of waves are complete or more money is deposited by the bicyclist 12. After completion of all waves, the loop 478–482 will continue in the so-called "attract mode", wherein a prerecorded game is replayed, until either more money is deposited or the bicycle simulator 10 is powered off.

For purposes of further discussion it is noted here that the bicycle model 470 also includes interrupt-driven software which is invoked asynchronously in relation to the control flow shown in FIG. 16. More specifically, a timer interrupt function will be discussed below with reference to FIG. 19.

Figure 17:
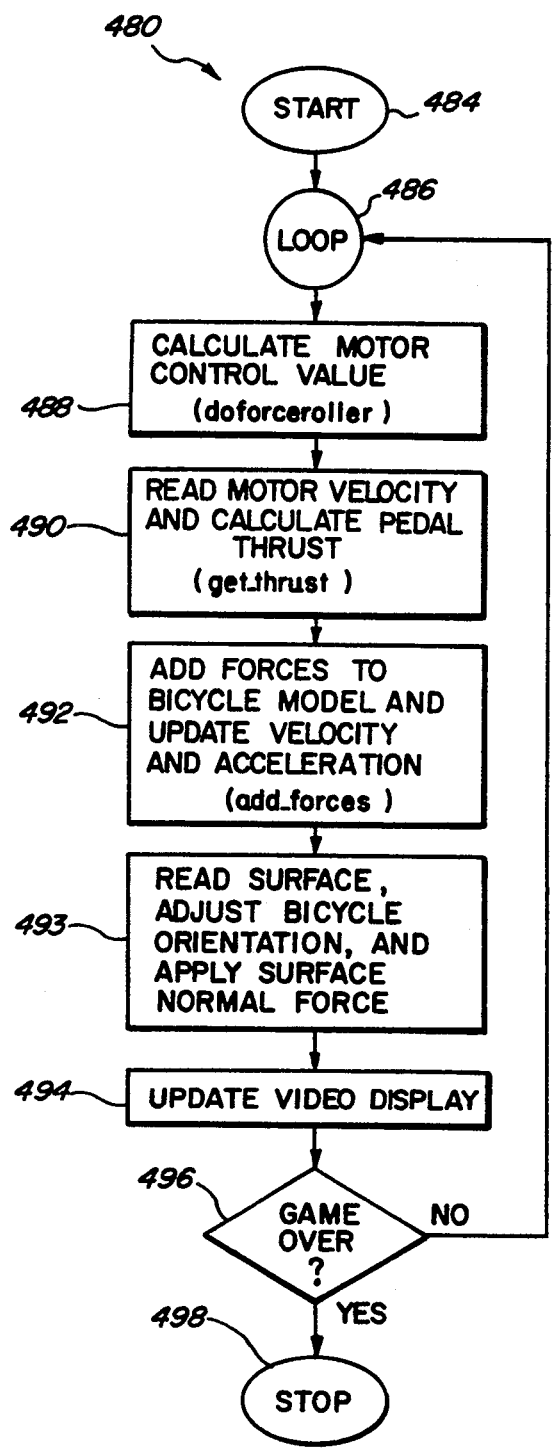
FIG. 17 is a flow diagram of the "game" function used in the bicycle model of FIG. 16.

Continuing the discussion with respect to the synchronous flow of the bicycle model 470, the flow of control for the game function 480 (introduced in FIG. 16) is shown in FIG. 17. The game function 480 is entered by the bicycle model 470 at a start state 484, from whence the bicycle model 470 moves to a loop state 486. The loop state 486 is the beginning of the previously noted display cycle. Thus, the display cycle corresponds to a single update of the video display 438 (FIG. 14). Moving from the loop state 486 to a state ("doforceroller") 488, the bicycle model 470 calculates a motor control value (roller assist or "rl_assist") which will later be sent to the motor 96 by the timer interrupt (further discussed below with reference to FIG. 19).

The doforceroller state 488 calculates a motor control value based on a percentage of the full range of resistance. In the presently preferred bicycle simulator 10, the range of resistance varies according to the rl_assist value, from −255 for maximum pedal resistance to +255 for essentially freewheeling. If the bicycle 12 is determined to be airborne (as later described), then rl_assist is set to +255 to freewheel. Otherwise, if there is a +Z (forward) component of velocity (where +X is to the right and +Y is straight up, relative to the bicyclist) then rl_assist is set equal to a scaled version (roller scale or "rl_scale") of the resistance range (roller range or "rl_range", e.g., −255 to +255 or 511 incremental values) plus a minimum resistance (roller minimum or "rl_min"), i.e., rl_assist=rl_scale * rl_range+rl_min. In general, the scaled range value will thus be a positive number and the minimum resistance number will be a negative number. The scaling factor and minimum resistance depend on option settings that are determined by the operator of the bicycle simulator 10 and on bicyclist feedback such as whether the handlebars 36 (FIG. 3) are turned.

As examples, in the attract mode of the game function 480, rl_assist=−128, or half-scale resistance. During the "gameplay" mode of the game function 480, the bicycle model 470 sets rl_scale to zero, resulting in rl_min being written to the motor controller 430 to simulate pedaling up a steep hill. When the bicycle model 470 detects that the bicycle 14 has collided with an object (e.g., a tree) in the track universe 448, the control value rl_assist to be sent to the motor controller 430 is set to −255, regardless of the difficulty setting reflected by the preselected value rl_min.

From the doforceroller state 488, the bicycle model 470 moves to a state ("get_thrust") 490 wherein the motor velocity sensor 109 is read and the pedal thrust generated by the bicyclist 12 is calculated. By definition, the bicycle model 470 needs to have a value for thrust if the motion of the bicycle 14 in the track universe 448 is to have any meaning at all. As previously discussed, the calibration state 474 of FIG. 16 provides the spin-up and spin-down times of the motor 96 without any thrust being applied. Therefore, during the gameplay mode of the game function 480, if, after the calibrated delay time, the motor velocity read from the motor velocity sensor 109 is greater than that commanded by the controller 430 (FIG. 14), then the difference is attributed to thrust.

The amount of thrust the cyclist 12 generates depends on the change in velocity of the motor 96 as well as the current velocity of the motor 96. For example, if the rolling pin 90 (FIG. 3) is stopped, very little pedaling is required to generate a large change in motor velocity. On the other hand, if the rolling pin 90 is spinning at maximum velocity, even a small change in velocity indicates a large thrust. Therefore, the get_thrust state 490 makes use of a precalculated table of thrust multipliers ("thrust_mult") that depend on the current motor velocity. The thrust_mult table was derived by looking at the data generated by the calibrate state 474.

After calculating pedal thrust at the get_thrust state 490, the bicycle model 470 moves to a function ("add_forces") 492 wherein the forces of gravity, air resistance and rolling resistance are applied to the bicycle 14, and bicycle velocity and acceleration are updated. Certainly other forces of nature could conceivably be added, but the present set of natural forces tends to provide a reasonable approximation of the real world. A further description of the add_forces function 490 is provided below with reference to FIGS. 18a, 18b.

Moving from the add_forces function 492 to a state 493, the bicycle model 470 next reads the track database associated with the track 20 to look-up the polygon (e.g., polygon 454 of FIG. 15) that is nearest to the last calculated position of the bicycle 14. The orientation of the bicycle 14 (in the model) is then adjusted according to the angle that the polygon makes with the horizontal. For example, the bicycle 14 may be riding up a ramp as represented by a track polygon that is inclined with respect to the horizon. Lastly, in state 493, the bicycle model 470 adjusts the bicycle motion according to the surface normal of the selected polygon (assuming the bicycle 14 is not airborne).

The bicycle model then moves to a state 494 wherein the position (Cartesian coordinates) of the bicycle 14 in the track universe 448 is determined from the velocity of the bicycle 14 and the intervening time between display cycles. This position is then reflected in the viewpoint of the bicyclist 12 into the track universe 448 as presented on the video display 18 (FIG. 1). From the state 494, the bicycle model 470 moves to a decision state 496 wherein a test is made to determine whether the game cycle, or wave, is over. If the wave is not over, then the bicycle model 12 moves from the decision state 496 to the loop state 486 to continue the display cycle. Otherwise, the bicycle model 470 moves to a stop state 498 and terminates the game function 480.

Figure 18A:
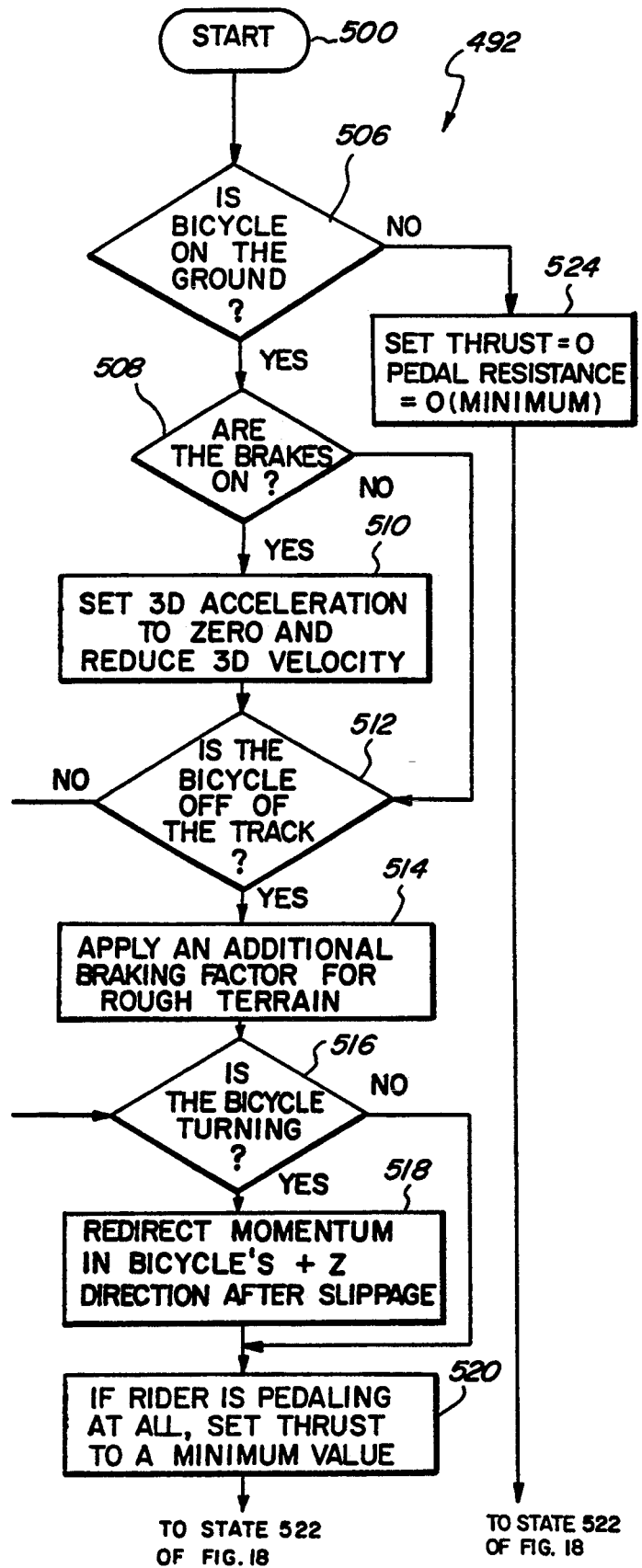

The control flow for the add_forces function 492 of the bicycle model 470 is shown in FIGS. 18a, 18b. The add_forces function 492 is entered at a start state 500. The bicycle model 470 moves from the start state 500 to a state 506 wherein the position of the bicycle 14 is tested to determine whether the bicyclist 12 is on the ground. If the bicycle 14 is on the ground (e.g., touching a track polygon), then the bicycle model 470 transitions to a decision state 508 and, using information read from the brake sensors 412, 414 (FIG. 14), determines whether the handbrakes 38 (FIG. 3) have been applied by the bicyclist 12. If the brakes are in use, then the bicycle model 470 moves to state 510 to set the three-dimensional components of acceleration of the bicycle 14 to zero. This is a simplifying assumption which follows from the physical phenomenon that the acceleration of the bicycle will tend toward zero after brakes are applied. At the same time, in state 510, the bicyclist's three-dimensional velocity is reduced according to the amount of brake force sensed by the brake sensors 412, 414.

Figure 19:
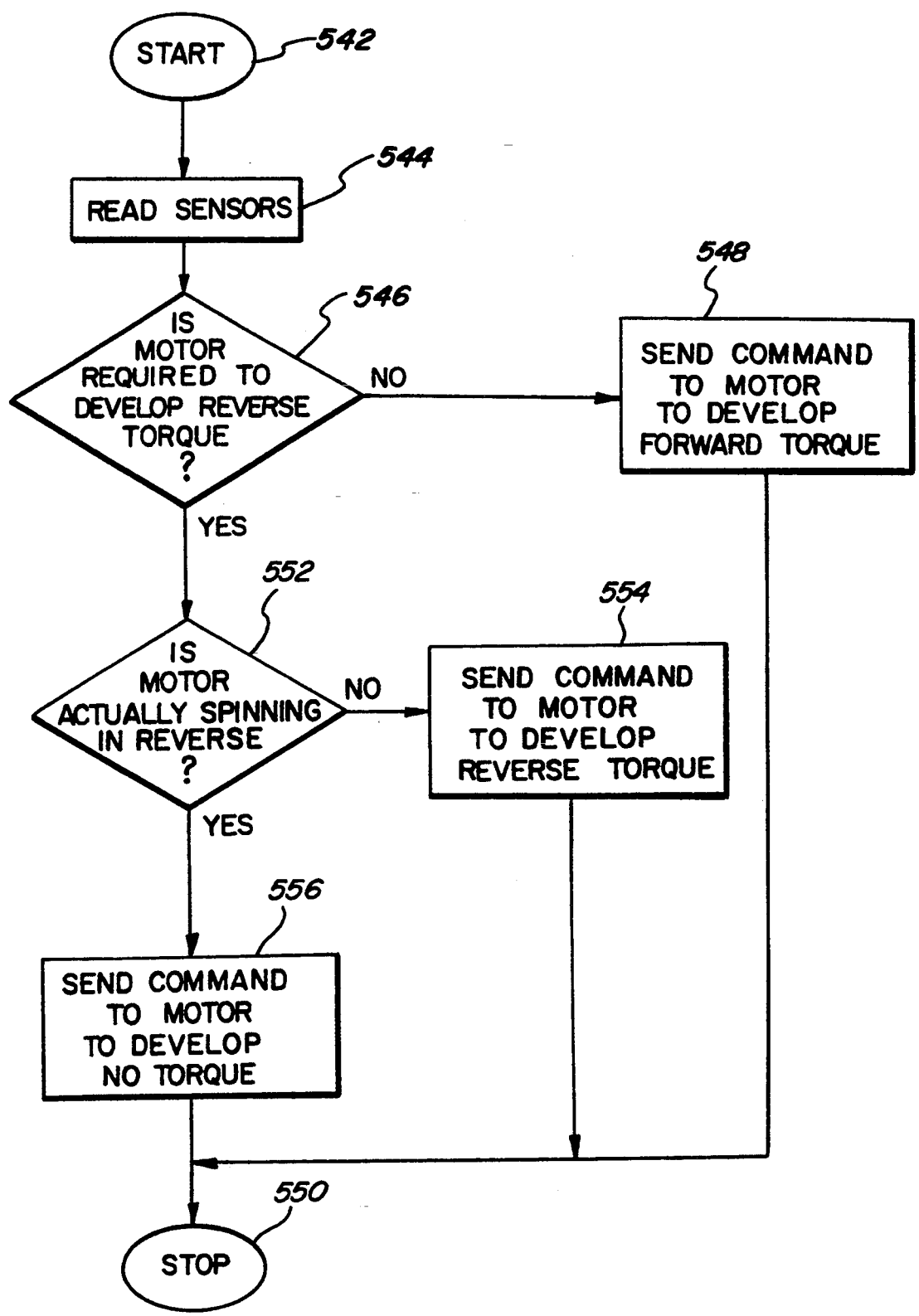
FIG. 19 is a flow diagram of the timer interrupt function of the bicycle model.

The bicycle model 470 then moves to a decision block 512 wherein the query is made as to whether the bicycle 14 is off of the track surface 20 (FIG. 15), i.e., off-road. Each polygon of the track 20 in the track universe 448 will indicate whether it is a section of track and so this test is a simple check of polygon information. The decision state 512 may also be reached when the bicycle model 470 determines that the brakes have not been applied at the state 508. If, at state 512, the bicyclist 12 is off of the track 20, the modeling software applies additional braking force to compensate for rough terrain as indicated at state 514. The decision state 516 is next entered from the state 514 by the bicycle model 470 to determine whether the bicycle 14 is turning. This state may also be entered from state 512. If the result of the test at state 516 is affirmative, that is, the bicycle 14 is turning as indicated by the steering sensor 418 (this value being read by the timer interrupt function as is shown in FIG. 19), then the momentum of the bicycle 14 is redirected with slippage to compensate for the lateral traction of the bicycle 14 after the bicycle model 470 moves to a state 518.

From state 518 the bicycle model 470 moves to state 520. As previously noted, the model 470 distorts reality by setting the bicycle velocity to a minimum value (e.g., if the bicyclist 12 is inside a pipe the velocity is increased by controlling the motor 96 (FIG. 3) via a preselected setting for the minimum velocity. The state 520 may also be entered by a transition from state 516 after it is determined that the bicycle 14 is not turning. The model 470 then moves from state 520 to a decision state 522 (FIG. 18B) to determine whether the bicyclist has just performed a wheelie. This information is available to the computer 400 from the wheelie sensor 148, as already described.

The decision state 522 may also be entered from the control path beginning at state 506 when it is determined that the player is airborne, and from there, the bicycle model 470 moves to a state 524 to set thrust equal to zero and pedal resistance to zero at state 524. At state 522 it can be determined whether the cyclist 12 "pops" a wheelie by the well-known technique called edge detection. Once a threshold value of movement is sensed, then the bicycle model 470 moves to a state 526 where forward velocity is increased by about 50% to let the bicyclist 12 simulate throwing the bike forward. The boost in momentum due to the motor 96 occurs for only one display cycle. However, the wheelie is simulated on the video display 18 for about 5 seconds before the natural force of gravity causes the wheelie to stop.

The state 528 is either entered by the bicycle model 470 from state 526 or the decision state 522 if the computer decides that the wheelie was not just popped. At state 528 the force of gravity is transformed into the bicyclist's frame of reference and added to the three-dimensional acceleration vector. The bicyclist's thrust, which was previously calculated at the state 504, is added to the acceleration vector at a state 530. The model 470 next enters state 532 to apply the force of air resistance to both the acceleration and velocity vectors. Moving to a decision state 534, the computer queries whether the bicyclist 12 is off of the track surface 20. If the bicyclist 12 is on the track the model moves to a state 536. At state 536, if there is any pedal velocity (rpm), as calculated from the get_thrust state 490 via the motor velocity sensor 109, then the bicyclist 12 is given some fixed minimum velocity such as in the range of 3 to 5 miles per hour, for example.

Alternatively, if at state 534 the bicycle model 470 determines that the bicycle 14 is off of the track then state 537 is entered to limit the bicyclist's top speed due to rough terrain. For instance, in the presently preferred embodiment the top speed is limited to 18 mph to 22 mph. After the bicycle 14 is off-road for a fixed period of time, such as five seconds, the bicycle model 470 places the bicyclist 12 back onto the polygon section of track surface 20 where he/she started. State 538 is then entered by the model 470 from either state 536 or 537. In state 538, the model 470 calculates pedal resistance and power assistance from the forward velocity and the collision state of the bicycle 14. The collision state is set whenever the bicyclist 12 brings the bicycle 14 (of the simulation) in contact with a wall, hay bale, tree or the like. The collision state is determined as a function of what the bicycle 14 is in contact with and how it is moving. After calculating pedal resistance and power assistance at state 538, the add_forces function 492 terminates at a stop state 539.

FIG. 19 is a flow diagram showing the timer interrupt function which, as previously stated, is a portion of the bicycle model 470. As mentioned with reference to FIG. 14, the preferred motherboard 402 includes a timer interrupt circuit comprising an oscillator set at, for example, 48 MHz, and a cascade of counters. In the present arcade game embodiment, the timer is set to generate an interrupt every 4 milliseconds. Thus, the timer interrupt function, shown in FIG. 19, will be executed once every 4 milliseconds by the bicycle model 470.

The timer interrupt function is entered by the bicycle model 470 at a start state 542 and, thereafter, moves to a state 544 to read the front brake 412, rear brake 414, wheelie 148, steering 418 and pivot 270 sensors (FIG. 14). The bicycle model 470 then moves to a decision state 546 to test whether the motor 96 is required to develop reverse torque. This determination of motor torque direction, made at state 546, is based on the rl_assist resistance value that was previously calculated in the doforceroller function 488. Reverse torque corresponds to a range of pedal resistance and would be required, for instance, when the bicyclist 12 begins cycling up an inclined plane on the simulated track 20 of the track universe.

If no reverse torque is required at the state 546, then a command is sent to the motor 96, via the motor/fan controller 430, to develop forward torque. The motor 96, in turn, spins the rolling pin 90 (FIG. 3) to simulate travel in the track universe. If the forward torque is greater than that applied by the pedaling of the bicyclist 12, then the motor 96 provides power assistance to the bicycle 14. After the command specifying the amount of forward torque is sent to the motor 96, the timer interrupt function terminates at a stop state 550.

Returning to the decision state 546, if the bicycle model 470 determines that the motor 96 is required to develop reverse torque, i.e., maximum resistance, then the bicycle model 470 transitions to another decision state 552. At state 552, the value read from the motor velocity sensor 109, at the get_thrust function 490, is checked to see if the motor 96 is actually spinning in a reverse direction. However, it should be noted that because the time that the motor 96 spins in reverse is so small, for instance, between 4 milliseconds and 12 milliseconds, that the inertia of the rolling pin 90 (FIG. 3) is not overcome so that the rolling pin 90 does not spin in a reverse direction.

If at state 552 the bicycle model 470 determines that the motor 96 is not spinning in reverse, then the model 470 moves to a state 554 wherein a command is sent to the motor 96, via the motor/fan controller 430, to reverse the direction of the motor 96. Here, if this is not the first command to reverse direction, the bicyclist 12 is overcoming the reverse torque of the motor 96 using leg muscles to increase thrust. It is thus desired to continue to cause the motor 96 to develop reverse torque so that the bicyclist 12 continues to feel pedal resistance. After the command is sent, the timer interrupt function terminates at the stop state 550.

Alternatively, from the decision state 552, if the motor 96 is found to be spinning in reverse, then the bicycle model 470 transitions to a state 556 to send a command to the motor 96 to halt spinning, i.e., develop no torque. In this way, the bicycle model 470 prevents possible injury to the bicyclist 12 caused by reverse spinning pedals, and also possible damage to the mechanical components of the bicycle simulator 10 which are designed to only move in a forward direction. The bicycle model 470 then transitions from state 556 to the stop state 550 to terminate the timer interrupt function shown in FIG. 19.

Having described the configuration and operation of the present invention in detail, it should now be appreciated that the bicycle simulator 10 provides numerous features which more realistically simulate bicycle riding as compared with prior art devices. In addition to surrounding a system user with an audio and visual ambience of realistic bicycle riding, the user is permitted to manipulate a bicycle mechanism having a conventional bicycle appearance within the realm of a track universe. With such a novel arrangement, the user can realistically negotiate curves in the track by leaning the bicycle into the turn and moving it laterally across the system so that accentuated angular movement of the rear wheel and bicycle frame relative to the front wheel and handlebars is provided. In addition, the simulation system provides wheelie capabilities which more realistically provides vertical rotation about an axis proximate to the rear wheel. Finally, the present invention provides a means for simulating travel under variable terrain conditions, including the ability to experience downhill coasting. These features are enabled by coupling the mechanical subsystem to a computer, motor and a video display such that movement on the track universe is simulated. With such a system, a bicyclist can experience the thrill of bicycle riding solo, or in competition with other animated bicyclists, and obtain a vigorous workout with spirited excitement and enthusiasm.

Figure 20:
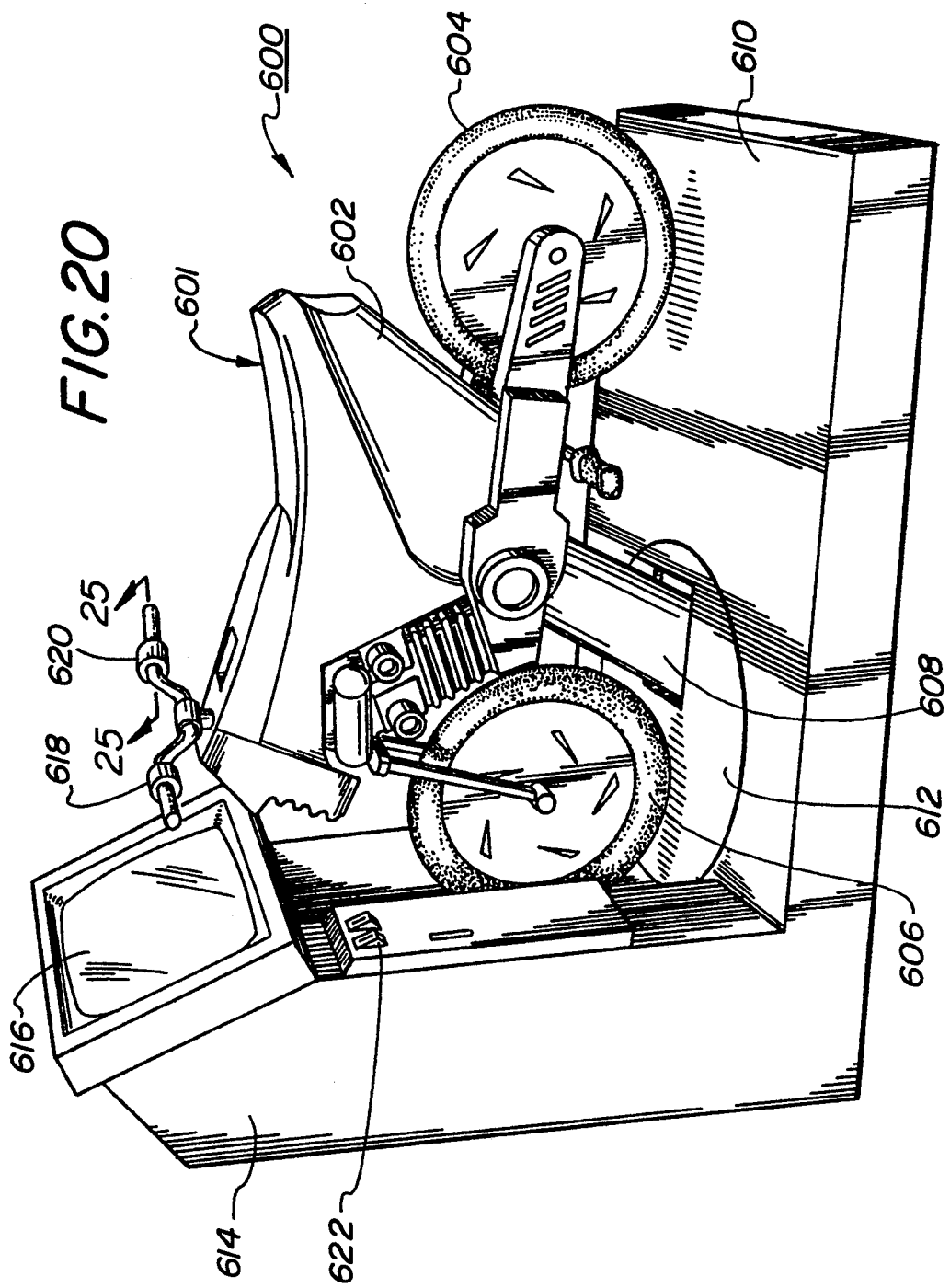
FIG. 20 is a perspective view of the presently preferred motorcycle simulator embodiment of the present invention.

Referring now to FIG. 20, an alternate embodiment of the simulator of the present invention is shown, generally designated 600. As shown, the simulator 600 is a motorcycle simulator. The simulator 600 includes a simulated motorcycle assembly 601 having a vacuum-formed shell 602 which simulates the body of a motorcycle. Also, the simulator 600 has two non-rotatable wheels 604, 606. The shell 502 is supported on a tube 608, a portion of which is shown in FIG. 20. As also shown, the tube 608 extends upwardly from a base 610, and the base 610 includes a turntable 612 through which the tube 608 extends. The base 610 and turntable 612 are, in essential respects, identical to the turntable 56 described above.

FIG. 20 also shows that the simulator 600 includes a cabinet 614. A computer (not shown in FIG. 20) is housed within the cabinet 614 for presenting a changing video display of a simulated space on a video monitor 616. As was the case with the bicycle simulator previously disclosed, the video monitor 616 presents a first-person view of the simulated space to the rider (not shown) of the simulator 600. In other words, the computer causes the video monitor 616 to present a view of a simulated space as the space would be seen from the vantage point of a rider riding a motorcycle through the simulated space.

Still referring to FIG. 20, the simulator 600 includes a rotatable handlebar 618 that can be grasped and manipulated by a rider of the simulator 600. As will be more fully described below, the shell 502 on which the rider sits is caused to move in response to movement of the handlebar 618, to simulate the movement that an actual motorcycle has when being turned. As will also be more fully described below, when the handlebar 618 is moved, a signal is sent to the computer causing the computer to change the image on the monitor 616 as appropriate to visually model the effects of turning through the simulated space.

FIG. 20 shows a throttle handle 620, which is rotatably attached to the handlebar 618. The rider of the simulator 600 can grasp the handle 620 and turn the handle to simulate revving a motorcycle. As will be more fully described below, when the handle 620 is turned, a signal is sent to the computer in response thereto to cause the computer to move the motorcycle assembly 601 in a motion that emulates the motion an actual motorcycle has when undergoing a wheelie maneuver. Also, the computer changes the display on the video monitor 616 to visually model the effect of performing a wheelie on a motorcycle in the simulated space. Finally, a currency receiver 622 may also be included for activating the simulator 600 in response to the insertion of a predetermined amount of currency in the receiver 622.

The details of the motorcycle assembly 601 can best be appreciated by referring to FIGS. 21-25. Specifically, the details of the wheelie mechanism can be seen in reference to FIGS. 21 and 22, the details of the steering mechanism can be seen in reference to FIGS. 22-24, and the details of the handle 620 can be seen best in FIG. 25.

Figure 21:
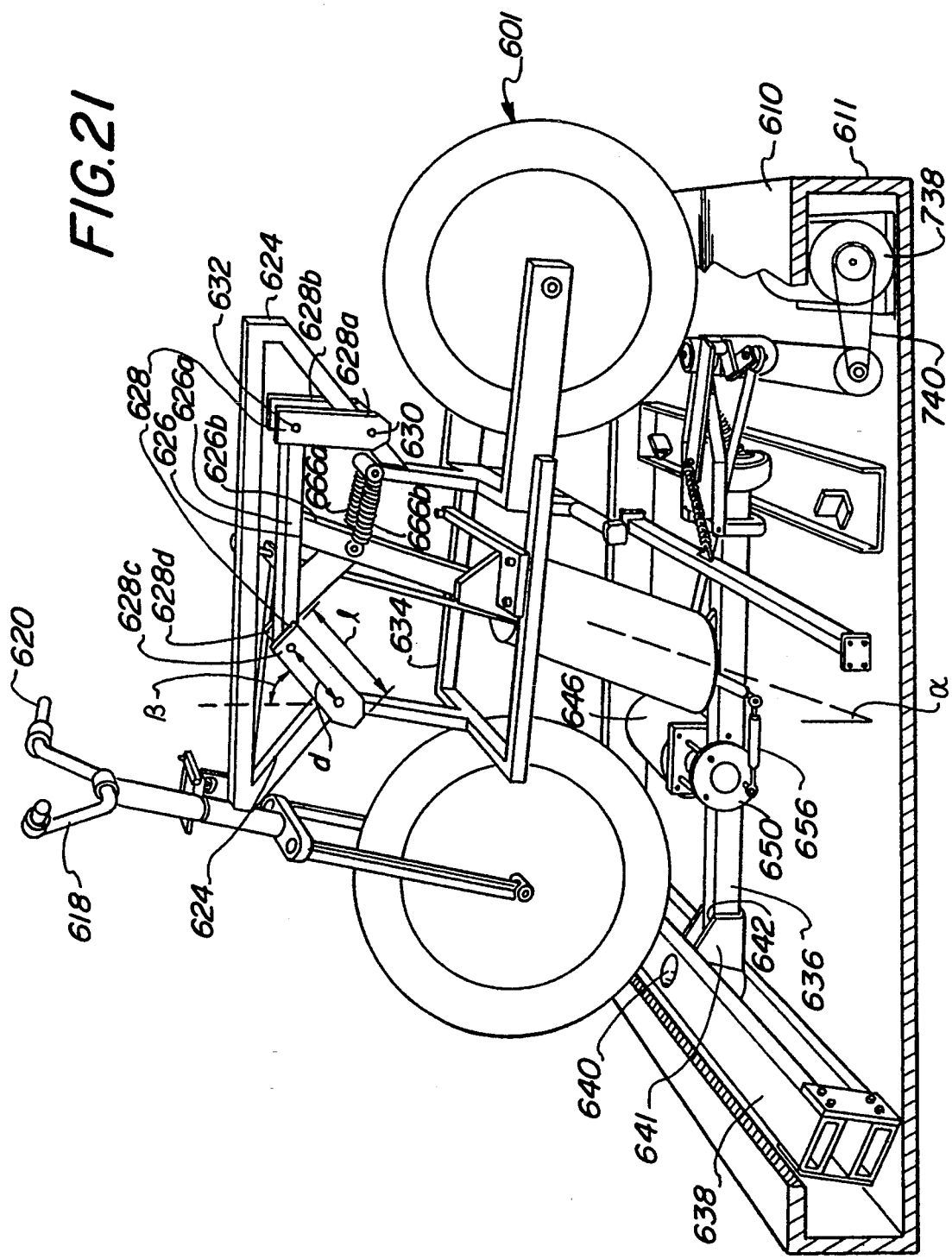
FIG. 21 is a left side, perspective view of the motorcycle simulator shown in FIG. 20, with the vacuum-formed body and the base removed.
Figure 22:
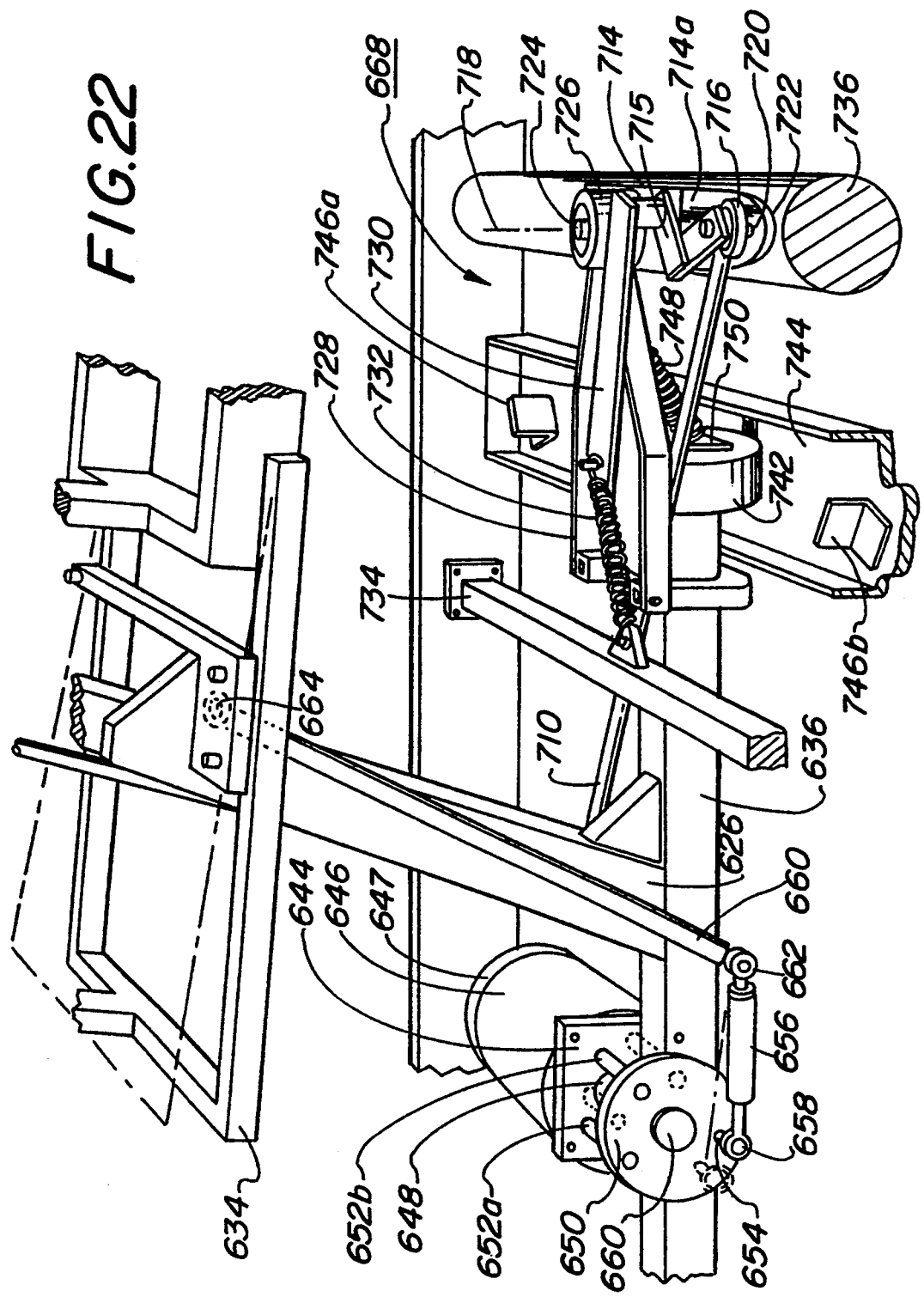
FIG. 22 is a left side, perspective view of a portion of the steering linkage and wheelie linkage of the motorcycle simulator shown in FIG. 21, with portions broken away.

Referring first to FIGS. 21 and 22, the details of the wheelie mechanism can be seen. FIG. 21 shows that the motorcycle assembly 601 includes a unitary frame 624 that is movably connected to a unitary beam 626. Preferably, the frame 624 is made of two inch by two inch (2"×2") steel tubing. It is to be understood that the shell 502 shown in FIG. 20 is attached to the frame 624 by well-known means, e.g., bolting, so that when a rider sits upon the shell 502, the rider is being supported in part by the frame 624.

As shown in FIG. 21, the beam 626 is shaped generally as a "T", having a horizontal bar 626a and a generally vertical bar 626b. Preferably, the generally vertical bar 626b is slightly offset from a vertical wall 611 of the base 610 by an angle α of about 60 degrees.

As shown in FIG. 21, the frame 624 is connected to the beam 626 via a coupler 628. Specifically, the frame 624 is connected to four links 628a, 628b, 628c, 628d and each link 628a-d is also connected to the horizontal bar 626a of the beam 626. More specifically, each link 628a-d is rotatably connected to the frame 624 by means well-known in the arts such as by forming a first hole near a first end of each link 628a-d and a second hole in a portion of the frame 624, and then positioning a pivot pin (e.g., a pivot pin 630, shown connecting the link 628a to the frame 624) through the juxtaposed holes. Also, each link 628a-d is rotatably connected to the beam 626 by means well-known in the art, such as by forming a first hole near a second end of each link 628a-d and a second hole in a portion of the beam 626, and then positioning a pivot pin (e.g., a pivot pin 632, shown connecting the link 628a to the beam 626) through the juxtaposed holes.

In one presently preferred embodiment, each link 628a-d is made of steel, and has a length "l" of about eight inches (8"). Also, the distance "d" between the centers of the first and second holes of each link 628a-d is about five inches (5"). Further, the two front links 628c,d are oriented at an angle β of about forty-five (45) degrees, relative to the vertical wall 611 of the base 610.

Still referring to FIG. 21, the frame 624 includes a generally rectangularly-shaped strut 634 formed beneath the coupler 628. In accordance with the present invention, the strut 634 and other components of the frame 624 can be welded or forged together to form a unitary frame 624, as shown.

In cross-reference to FIGS. 21 and 22, the vertical bar 626b of the beam 626 is rigidly connected, as by welding, to a bearing bar 636. In turn, the bearing bar 636 is pivotably connected to a bearing bar housing 638 which forms a portion of the base 610. More particularly, an end 642 of the bearing bar 636 is connected to a swing flange 641, and a swing pin 640 extends through the swing flange 641 and also extends through a portion of the bearing bar housing 638. The bearing bar 636 can thus pivot about the swing pin 640.

FIG. 22 best shows that a motor flange 644 is bolted or welded to the bearing bar 636, and a wheelie motor 646 is bolted to the motor flange 644. Preferably, the wheelie motor 646 is a 1 horsepower electric motor, and an optical motor encoder 647 is electrically connected to the motor 646. Preferably, the optical encoder 647 is a type optical rotary encoder made by Clarostat. The wheelie motor 646 can turn a shaft 648, and the shaft 648 is in turn rigidly connected to a cam 650. Two preferably rubber-coated stops 652a, 652b are attached to the cam 650 and extend inwardly therefrom. The stops 652a,b can contact the bearing bar 636 during rotation of the cam 650 and thereby limit rotation of the cam 650, as shown in phantom.

A cam pin 654 is rigidly attached to the cam 650 and extends outwardly therefrom. A link pin 656 is rotatably connected to the cam pin 654, so that as the cam 650 rotates, the rotational motion of the cam 650 is transformed into reciprocal motion of the link pin 656. Preferably, the coupling 658 that couples the link pin 656 and the cam pin 654 is a rod-end type coupling, such as the rod-end couplings made by Aurora Boaring Co. of Aurora, Ill. As is known to those skilled in the art, rod-end type couplings are essentially ball-and-socket couplings that permit universal rotational motion between the links that are connected through the rod end coupling.

Still referring to FIG. 22, a wheelie link 660 is rotationally connected to the link pin 656 through a rod-end coupling 562. Together, the wheelie link 660 and the link pin 656 establish a wheelie member. With this arrangement, horizontal reciprocal motion of the link pin 656 is transformed into vertical reciprocal motion of the wheelie link 660. The wheelie link 660 is in turn connected through a ball-and-socket joint 664 to the strut 634.

The skilled artisan will appreciate that with the above-described arrangement, the wheelie motor 646 can turn the cam 650, and this rotational motion is transferred through the system of links and couplings described above to reciprocal motion of the wheelie link 660. The wheelie link 660 can thus be made to push upwardly and pull downwardly on the frame 624, based upon the direction of rotation of the cam 650.

When the wheelie link 660 urges upwardly against the frame 624, the effect of the links 628a-d is to cause the frame 624 to initially move forwardly, relative to the beam 626 (and, hence, base 610), and then to cause the front end of the frame 624 (FIG. 21) to pivot upwardly to the position indicated by the dashed lines above the strut 634 in FIG. 22, in simulation of the motion of a motorcycle undergoing a wheelie maneuver. The wheelie motor 646 can then be energized to turn the cam 650 such that the wheelie link 660 pulls the frame 624 back to the position shown in FIG. 21. To further establish the nominal position of the motorcycle assembly 501 shown in FIG. 21, two anti-wheelie springs 666a,b are connected in tension to the frame 624 and beam 626.

In addition to the wheelie-generating structure discussed above, the motorcycle simulator 600 of the present invention also includes a means to cause the frame 624 to move in a swinging motion, to simulate the motion of a motorcycle during a turn. In cross-reference to FIGS. 22–24, this swinging means includes the handlebar 618 (FIG. 23) which, as discussed above, is rotatably attached to the frame 624. Further, a slew generator, generally designated 668 in FIG. 23, is operably coupled to the frame 624.

Figure 23:
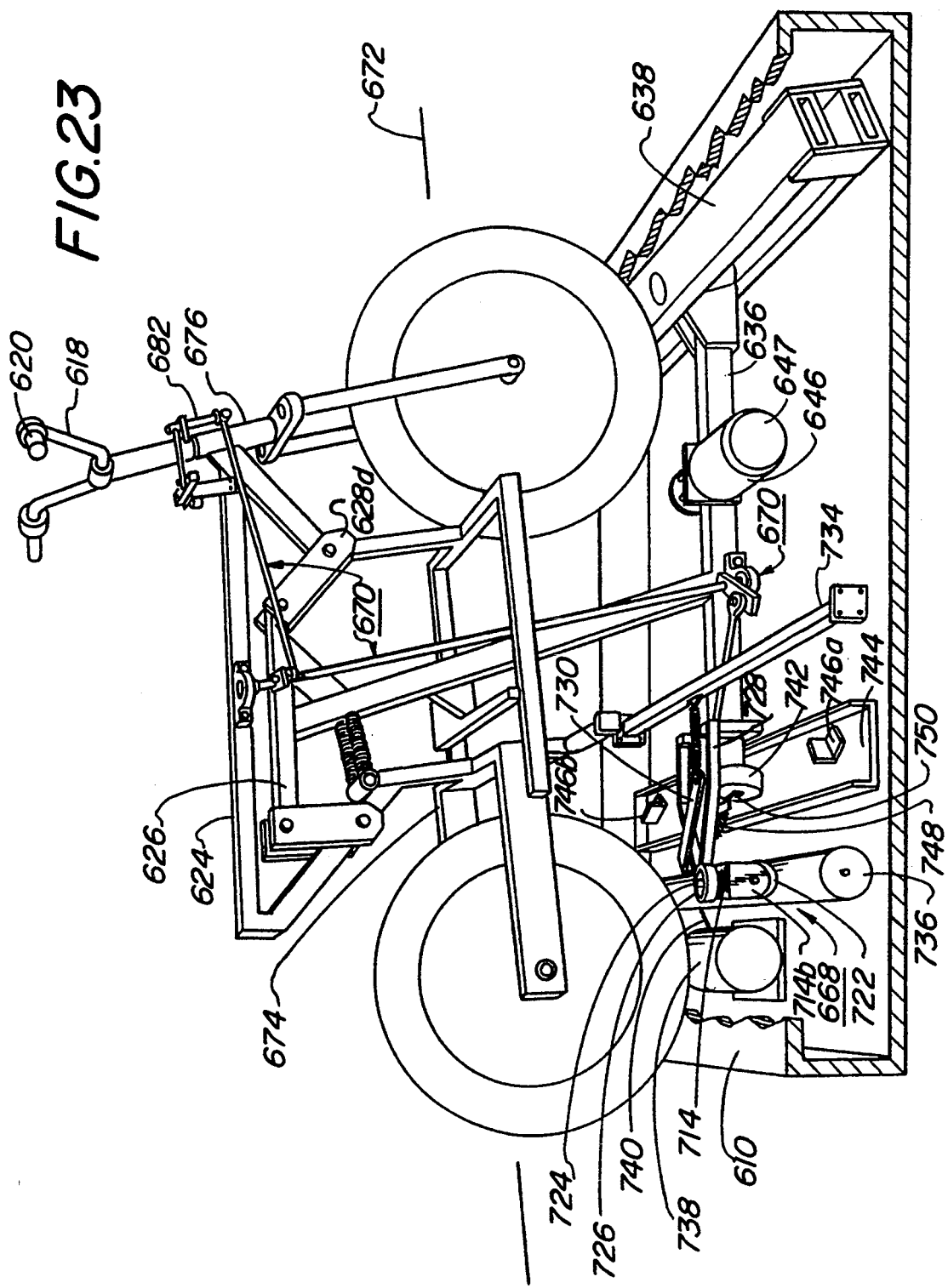
FIG. 23 is a right side, perspective view of the motorcycle simulator shown in FIG. 20, with the vacuum-formed body and the base removed.

Still referring to FIG. 23, linkage system, generally designated 670, interconnects the handlebar 618 and the slew generator 668. When the handlebar 618 is rotated by the operator of the simulator 600 to simulate turning a motorcycle, the motion of the handlebar 618 is transferred through the linkage system to the slew generator 668. In turn, the slew generator 668 causes the rear portion of the frame 624 to swing relative to the front portion of the frame 624.

Figure 24:
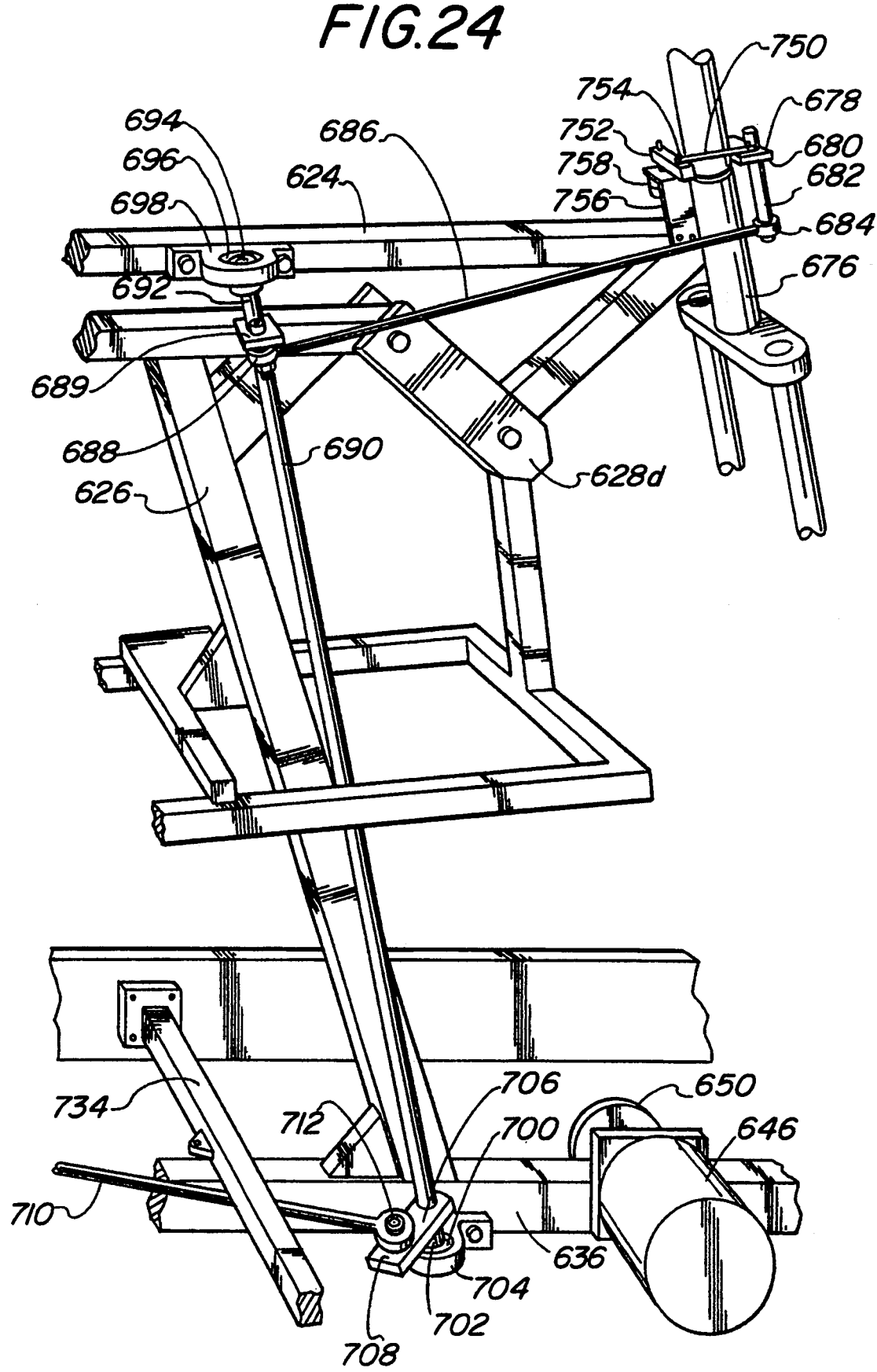
FIG. 24 is a right side, perspective view of a portion of the steering linkage and wheelie linkage of the motorcycle simulator shown in FIG. 23, with portions broken away.

The details of the steering system of the present invention, from the handlebar 618 to the slew generator 668, can best be appreciated initially in reference to FIGS. 23 and 24. FIG. 23 shows that the frame 624 has a longitudinal axis 672. In relation to the axis 672, the frame 624 has a rear portion 674, and the rear portion 674 of the frame 624 is distanced from the handlebar 618.

As shown in FIG. 23, the handlebar 618 includes a stalk 676, and the stalk 676 turns when the handlebar 618 is turned. As best shown in FIG. 24, a stalk bracket 678 is rigidly attached to the stalk 676, and an end 680 of the stalk bracket 678 undergoes a side-to-side translational movement when the handlebar 618 (and, hence, the stalk 676) are rotated.

A stalk link 682 is rigidly connected to the end 680 of the stalk bracket 678, so that as the end 680 of the stalk bracket 678 moves translationally, the stalk link 682 also moves translationally. In turn, the stalk link 682 is connected through a rod end coupling 684 to a first steering link 686. The first steering link 686 is connected through a rod end coupling 688 to an upper steering bracket 689, and the bracket 689 is rigidly connected to a second steering link 590. Accordingly, it will be appreciated in reference to FIG. 24 that when the first steering link 686 is moved translationally, the bracket 689 is caused to rotate, which in turn rotates the second steering link 690. A first end 692 of the second steering link 690 includes a ball 694, and the ball 694 is rotatably received in the socket 696 of an upper steering block 698. The upper steering block 698 is rigidly connected to the frame 624.

Still referring to FIG. 24, a second end 700 of the second steering link 690 is ball-shaped and is rotatably received in the socket 702 of a lower steering block 704. The lower steering block 704 is rigidly connected to the bearing bar 636 of the base 610. Also, the second steering link 690 is rigidly connected to a lower steering bracket 706, and an end 708 of the lower steering bracket 706 is caused to move translationally when the second steering link is rotated.

As shown in FIG. 24, a third steering link 710 is connected to the lower steering bracket 706 through a rod end coupling 712. When the lower steering bracket 706 is caused to move translationally, this translational motion is imparted to the third steering link 710 to cause the third steering link 710 to move forwardly or rearwardly, as appropriate.

Referring back to FIG. 22, the remainder of the steering system can be seen. As shown in FIG. 22, the third steering link 710 is connected to a pallet roller bracket 714 through a rod end coupling 716. Specifically, the third steering link 710 is connected to an L-shaped portion 715 of the pallet roller bracket 714. When the third steering link 710 moves translationally, it causes the pallet roller bracket 714 to rotate about an axis 718. The bracket 714 has two mounts 714a,b (mount 714a shown in FIG. 22, mount 714b shown in FIG. 23) extending downwardly from the bracket 714, and an axle 720 is connected to the mounts 714a,b between the mounts 714a,b.

A pallet roller 722 (FIGS. 22 and 23) is rotationally engaged with the axle 720. Preferably, the pallet roller 722 is made of polyurethane and is wine barrel-shaped, i.e., the first and second ends of the pallet roller 722 have diameters which are less than the diameter of the pallet roller 722 near the middle of the pallet roller 722. In other words, the pallet roller 722 has first and second ends and a radial cross-section that is circular in shape, and the diameter of the cross-section taken at a location intermediate the ends of the roller 722 is greater than the diameter of the cress section of the roller taken near either end of the roller 722.

In cross-reference to FIGS. 22 and 23, the pallet roller bracket 714 has an upwardly projecting shaft 724, and the shaft 724 is rotationally engaged with a pallet roller bearing 726. In turn, the pallet roller bearing 726 is rigidly attached to or formed integrally with an A-shaped bracket 728, and the A-shaped bracket 728 is rigidly attached to the frame 624. A spring bracket 730 is rigidly connected to the pallet roller bracket 714, and a return spring 732 is connected to the spring bracket 730 and a cross-bar portion 734 of the base 610 to urge the pallet roller bracket 714 into the at rest position (i.e., the position the pallet roller bracket 714 has when the handlebar 618 is oriented for straight travel of the simulated motorcycle) shown in FIG. 22.

Still referring to FIGS. 22 and 23, the pallet roller 722 rests on an elongated cylindrical rolling pin 736. The rolling pin 736 is caused to rotate by a slew motor 738 (FIG. 23). More specifically, the slew motor 738 turns a belt 740 (FIG. 21), and the belt 740 is engaged with the rolling pin 736 by means well-known in the art to rotate the rolling pin 736. In one presently preferred embodiment the slew motor 738 is a 1 horsepower electric motor, and the speed of the slew motor 738 is controlled by the computer of the present invention as more fully disclosed below, based upon the position of the throttle handle 620.

FIGS. 22 and 23 show that a bearing roller 742 is rotatably connected to the bearing bar 636 of the base 610. As shown, the bearing roller 742 can roll in a trough 744 that is rigidly attached to the base 610, and stops 746a, 746b limit the range of rolling motion of the bearing roller 742. It will accordingly be appreciated that substantially all of the weight of the frame 624 is borne by the bearing roller 742, and not the pallet roller 722.

To keep the pallet roller 722 in contact with the rolling pin 736, a pre-load spring 748 is connected to an axle 750 of the bearing roller 742 and to the A-shaped bracket 728. The pre-load spring 748 is in tension, with a tensional force of about one hundred pounds (100 lbs.).

Referring generally to FIG. 23, the skilled artisan will recognize that with the linkage system described above, rotational motion of the handlebar 618 is transferred to rotational motion of the pallet roller bracket 714 about the shaft 724 and, thus, turning motion of the pallet roller 722 about the axis 718 (FIG. 22). Also, the pallet roller 722 is caused to rotate about its axle 720 by the constantly rotating rolling pin 736. When the pallet roller 722 turns about the axis 718, the combined effect of the turning of the pallet roller 722 on the rotating rolling pin 736 is to cause the pallet roller 722 to urge the shaft 724 sideways (to the left if the handlebar 618 is turned right, and to the right when the handlebar 618 is turned left). The shaft 724 in turn urges against the pallet roller bearing 726, which in turn urges the A-shaped bracket 728 to move sideways.

Recall that the A-shaped bracket 728 is rigidly connected to the bearing bar 636, and that the bearing bar 636 is pivotally connected to the base 10. Also recall that the bearing bar 636 is rigidly connected to the beam 626, so that as the bearing bar 636 moves, the entire beam 626 and frame 624 move. Consequently, turning the handlebar 618 causes the rear portion of the frame 624 to slew transversely relative to the longitudinal axis 672 of the simulator 600.

The present invention also provides means for generating an electrical signal representative of turning motion of the handlebar 618, and turning motion of the wheelie motor 646. First, with reference to FIG. 24, the stalk link 682 is connected to one end of a potentiometer link 750, and the potentiometer link 750 is connected to a potentiometer bracket 752 through a rod end coupling 754. The potentiometer bracket 752 is in turn pivotally connected to a fixed bracket 756, and the fixed bracket 756 is rigidly attached to the frame 624. A steering potentiometer 758 is attached to the fixed bracket 756 and operably engaged with a shaft (not shown) of the potentiometer bracket 752. Consequently, the output signal of the steering potentiometer 758 changes when the handlebar 618 is turned, because the potentiometer bracket 752 (and shaft) is caused to move by the potentiometer link 750 when the handlebar 618 is turned. The signal from the potentiometer 758 is sent to the computer of the present invention for processing as discussed below.

Referring to FIG. 22, to sense the turning of the wheelie motor 646, a wheelie potentiometer 760 is engaged with the cam 650 by means well-known in the art. Consequently, when the wheelie motor 646 turns the cam 650, the output signal of the wheelie potentiometer 760 changes. This signal is sent to the computer of the present invention, for processing as disclosed below. Preferably, the potentiometers 758, 760 are 5 k ohm potentiometers.

Figure 25:
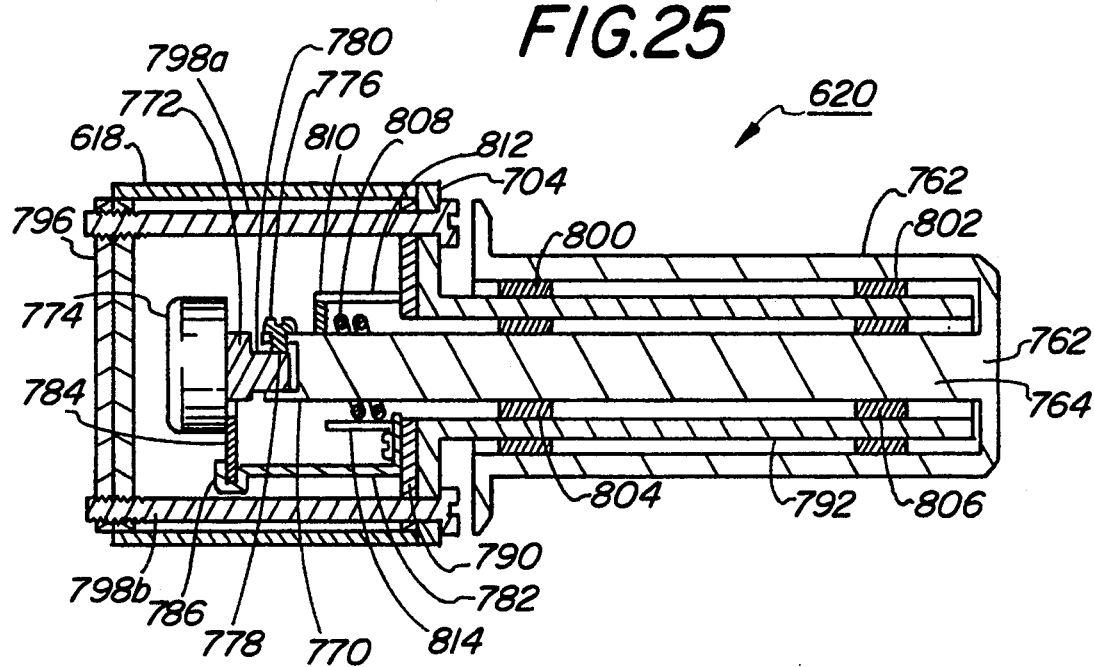
FIG. 25 is a cross-sectional view of the throttle handle of the motorcycle simulator, as seen along the line 25—25 in FIG. 20.

Now referring to FIG. 25, the details of the throttle handle 620 of the present invention can be seen. As shown in FIG. 25, the throttle handle 620 includes an outer annular grip 762 and an inner cylindrical shaft 764 rigidly attached to or formed integrally with an end 768 of the grip 762. The end 770 of the shaft 764 which is opposite the end 768 of the grip 762 is selectively engaged with a post 772 of a handle potentiometer 774, which is preferably a 5 k ohm potentiometer. More particularly, an engagement screw 776 is threadably engaged with a channel 778 formed in the shaft 764, and the engagement screw 776 can be rotated to abut a flat surface 780 of the post 772 to hold the post 772 stationary relative to the shaft 764. Thus, when the grip 762 is turned, the post 772 of the handle potentiometer 774 is turned, causing the output control signal of the potentiometer 774 to change. The output control signal of the potentiometer 774 is sent to the computer of the present invention for further processing, as described below.

To hold the potentiometer 774 stationary with respect to the handlebar 618, the potentiometer 774 is fastened to the handlebar 618 via a two-piece bracket 782. More specifically, the potentiometer 774 is rigidly attached to an arm 784 of the bracket 782, and the arm 784 is in turn engaged with a groove 786 that is formed in a leg 788 of the bracket 782. The leg 788 is in turn bolted to a face plate 790 of the handlebar 618. The use of a two-piece bracket 782 as described reduces the likelihood of the potentiometer 774 mechanically binding when the grip 762 is turned.

FIG. 25 shows that to support the grip 762 and shaft 764, an annular support tube 792 extends coaxially between the grip 762 and shaft 764. The support tube 792 includes a flange 794, and the flange 794 is attached to a support plate 796 of the handlebar 618 by two elongated bolts 798a, 798b.

Two cylindrical bearings 800, 802 are positioned between the grip 762 and support tube 792, and two additional cylindrical bearings 804, 806 are positioned between the support tube 792 and shaft 764. Preferably, these bearings 800-806 are type cylindrical bearings made by Boston Gear. The bearings 800-806 radially support the components of the handle 620.

To urge the grip 762 into a neutral position, a torsion spring 808 is connected to the face plate 790 and a retainer screw 810. The retainer screw 810 is threadably engaged with the shaft 764. Also, two stops 812, 814 are attached to the face plate 790, and the screw 810 can abut the stops 812, 814 to limit rotational motion of the grip 762.

It is to be appreciated that with the above arrangement, the grip 762 can be easily removed from the handlebar 618 by unscrewing the bolts 798a, 798b. Then, the potentiometer 774 can easily be removed from the shaft 764 by unscrewing the screw 776 until the screw 776 no longer abuts the flat surface 780 of the post 772 of the potentiometer 774, and removing the potentiometer. The potentiometer 774 can accordingly be easily replaced by another like potentiometer (not shown) by engaging the other potentiometer with the shaft 764 and tightening the screw 776 against the post of the other potentiometer.

Figure 26:
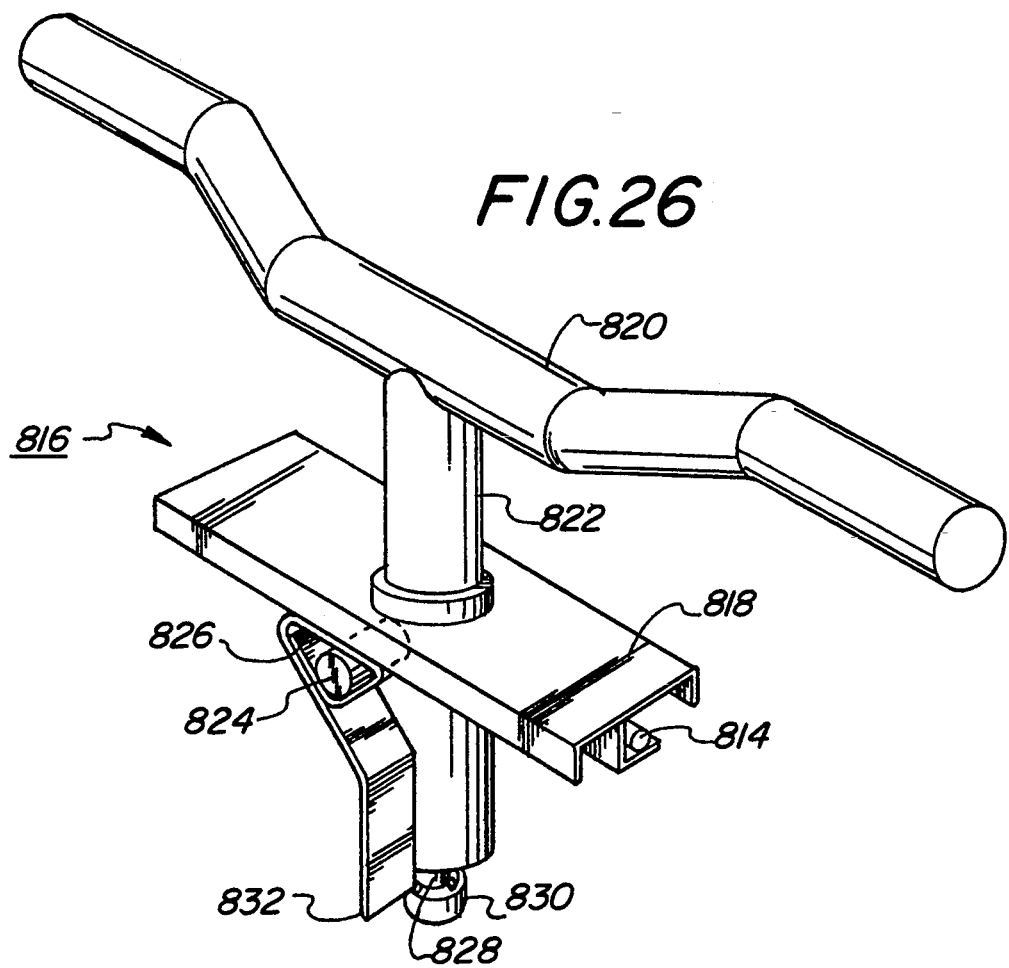
FIG. 26 is a perspective view of a stand-up embodiment of the motorcycle simulator of the present invention.

FIG. 26 shows an alternate embodiment of the motorcycle simulator of the present invention, wherein the user stands in front of a handlebar assembly, generally designated 816. The assembly 816 is connected to a support plate 818, and the plate 818 is rigidly connected to a game console or base (not shown).

More specifically, the assembly 816 includes a handlebar 820, and the handlebar 820 has a stalk 822 which is rotatably engaged with the support plate 818 by means well-known in the art. A bar 824 which preferably has a resilient outer coating extends outwardly from the stalk 822. A V-shaped bracket 826 is rigidly attached to the support plate 818, as by welding, and the bar 824 is received in the V-shaped bracket 826.

When the handlebar 820 is turned, the stalk 822 is also turned. The cooperation of structure between the bar 824 and the V-shaped bracket 826 causes the bar 824 to ride up on one of the legs of the V-shaped bracket 826, causing the handlebar 820 to rise upwardly as a consequence, to give the user of the assembly 816 a tactile indication of turning.

FIG. 26 also shows that the stalk 822 is rigidly connected to the post 828 of a handle potentiometer 830. Thus, when the handlebar 820 (and, hence, the stalk 822) is turned, the post 828 is turned, causing the output signal of the handle potentiometer 830 to change. This output signal is sent to a computer for further processing. Preferably, the handle potentiometer 830 is a 5 k ohm potentiometer.

To hold the potentiometer 830 stationary, the potentiometer 830 is rigidly attached to an L-shaped bracket 832, and the bracket 832 is in turn attached to the V-shaped bracket 826. If desired, a vibrational motor 719 such as the motor disclosed in co-pending U.S. patent application Ser. No. 07/674,076, now U.S. Pat. No. 5,203,573, assigned to the same assignee as the present invention and incorporated herein by reference, is electrically connected to the computer and is operably engaged with the plate 818 for causing the plate 818 to vibrate in response to the computer program.

More specifically, as disclosed in the above-referenced U.S. patent application, the vibrating motor has a rotor shaft, and a weight is attached to the motor shaft for causing the shaft (and, hence, motor 719 and plate 818) to vibrate when the shaft rotates, to thereby simulate passage of the simulated vehicle over rough terrain.

The materials of the present invention, except where noted above, are made of strong, rigid materials, suck as steel or composites.

Figure 27:
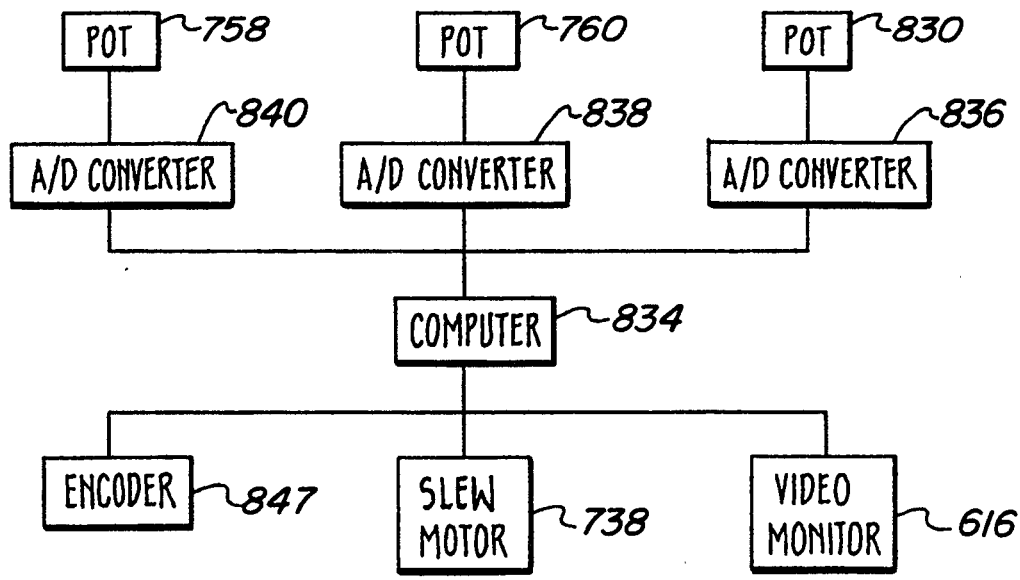
FIG. 27 is a block diagram of the signal processing components of the motorcycle simulator.

In the operation of the simulator 600, reference is made to FIG. 27. As shown, the signal from the handle potentiometer 830 is sent to an analog-to-digital (A/D) converter 836. From the converter 836, the signal is sent to a computer 834.

Also, FIG. 27 shows that the signal from the wheelie potentiometer 760 is sent to an A/D converter 838 and thence to the computer 834, and the signal from the steering potentiometer 758 is sent to an A/D converter 840 and thence to the computer 834.

It is to be understood that the computer 834 causes a display of a simulated space to be presented on the monitor 616 (FIG. 20) in accordance with a pre-stored program and the receives signals from the potentiometers 758, 760, 830 by means well-known in the art. As envisioned by the present invention, the particular computer simulation program that defines the simulated space can be any suitable program, such as an arcade motorcycle game or a motorcycle training program. Thus, the motorcycle simulator 600 (FIG. 20) can be used in conjunction with a wide variety of computer simulation programs and corresponding simulated spaces.

Based upon the steering signal from the steering potentiometer 758, the computer 834 computes a new course and speed for the motorcycle being simulated by means well-known in the art, and changes the video display accordingly based upon well-known techniques. Also, based upon the signal from the wheelie potentiometer 760, the computer 834 computes a new attitude for the motorcycle being simulated, as more fully discussed below. Further, based on the signal from the handle potentiometer 830, the computer 834 computes a new attitude and velocity for the motorcycle being simulated by means well-known in the art, and changes the video display accordingly based upon well-known techniques.

In addition to changing the video display based upon the signals from the wheelie, handle, and steering potentiometers 760, 830, 758, the computer 834 also causes the motorcycle simulator 600 to provide a tactile simulation of a wheelie maneuver, and of the passage of a motorcycle over rough terrain, and of the effects of throttle position during a turn of a motorcycle. These tactile indications are synchronized with the visual display provided on the monitor 616. To this end, FIG. 27 shows that the computer 834 is electrically connected to the encoder 647, the slew motor 738, and the video monitor 616.

Figure 28:
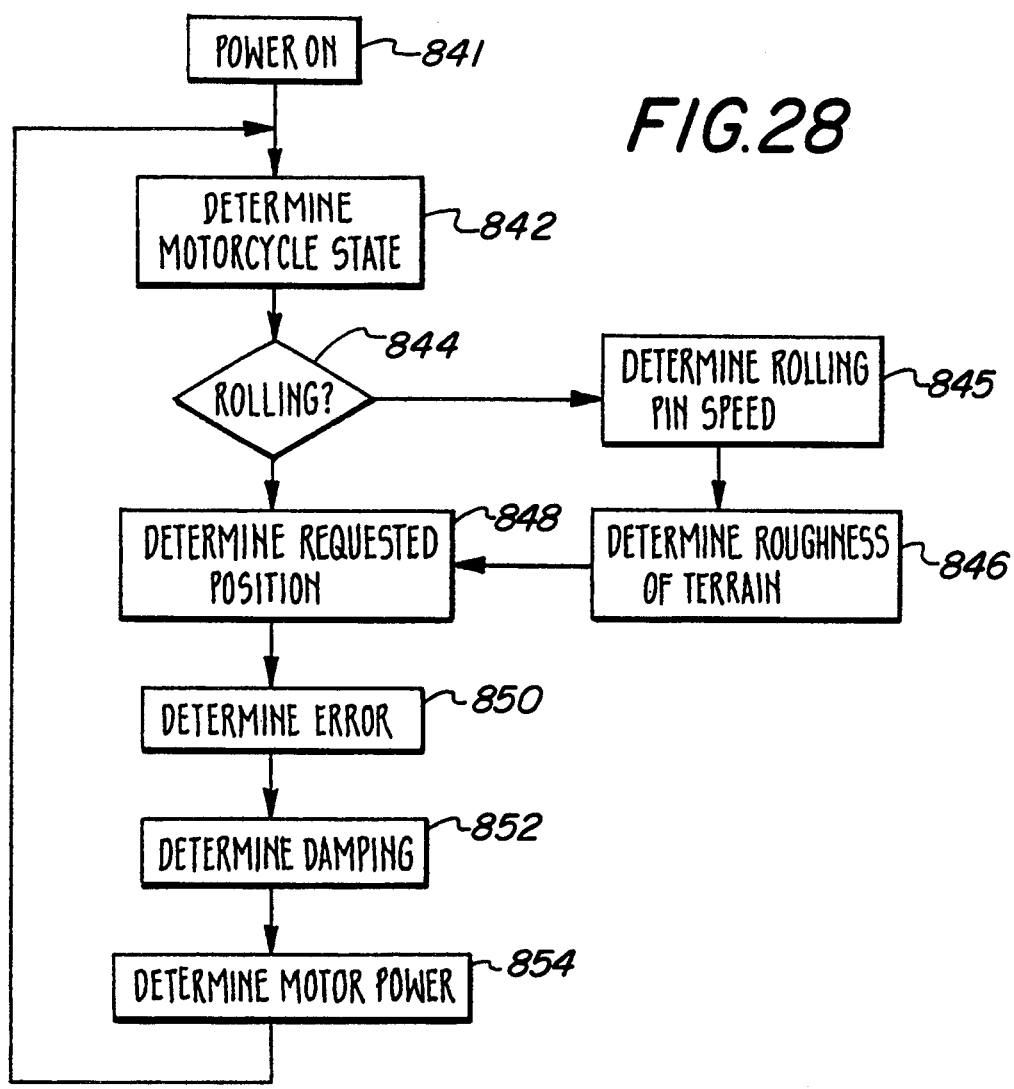
FIG. 28 is a flow diagram showing the portion of the computer program which causes the frame of the motorcycle simulator to move.

In reference to FIG. 28, the operation of the computer 834 in controlling the encoder 647 and, thus, movement of the frame 624 relative to the beam 626 can be seen. The computer operation begins at power on (block 841). As shown in block 842 of FIG. 28, based upon the signals from the potentiometers 758, 760, 830, the computer 834 determines the state of the simulated motorcycle in the simulated space. Next, at decision block 844, the computer 834 determines, by well-known means using standard equations of motion, whether the simulated motorcycle is rolling over the simulated terrain.

If so, the computer 834 proceeds to block 845. At block 845, the computer 834 determines the desired speed of the rolling pin 736 based on the position of the throttle handle 620, as indicated by the signal from the handle potentiometer 758. More specifically, the computer 834 causes the slew motor 738 (and, hence, the rolling pin 736) to turn at an angular speed that is in direct proportion to the position of the throttle handle 620. As the skilled artisan will appreciate, the speed of rotation of the rolling pin 736 determines the speed of slewing motion of the simulator 600 when the handlebar 618 is turned.

From block 845, the computer 834 proceeds to block 846, wherein the computer 834 determines the position of the simulated motorcycle in the simulated space. Based upon this determination, the computer determines whether the computed position correlates to simulated rough terrain. To determine whether the terrain is "rough", each game cycle the computer accesses a terrain table which maps, for each incremental area in the simulated space, a corresponding terrain value.

Based upon the mapped terrain value, the computer determines whether the terrain is "rough", and what the degree of roughness is, as indicated by the roughness value.

From block 846, the computer 834 proceeds to block 848. If at decision block 844 the computer 834 determined the motorcycle was not rolling, the computer 834 determines, based upon well-known equations of motion, whether the motorcycle is jumping, landing, or crashed, and then proceeds to block 848.

At block 848, the computer 834 determines a "requested position" ("REQ") as follows:

If the motorcycle is rolling, then

REQ = slope of track under motorcycle

If desired, the REQ value can be multiplied by a terrain roughness value as determined at block 846 above.

If the motorcycle is jumping, then

REQ=current motorcycle attitude+JUMP factor, wherein the JUMP factor is determined by the computer 834 based in part upon the control signal from the handle potentiometer 830.

If the motorcycle is landing, then

REQ=current motorcycle attitude−LAND factor, wherein the LAND factor is determined by the computer 834 based upon the JUMP factor, i.e., the LAND factor increases linearly with increasing JUMP factor.

If the motorcycle is crashed (i.e., has gone end-over-end, or is sliding in the simulated space, based upon equations of motion) then REQ=random up or down.

Next, the computer 834 proceeds to block 850, wherein the computer 834 determines an error signal as follows:

error=REQ−CURRENT POSITION (of motorcycle)

From block 850, the computer 834 proceeds to block 852, wherein the computer 834 determines a damping factor as follows:

damping=current motor speed×DAMP, wherein current motor speed is the speed of the wheelie motor 646 as represented by the signal from the wheelie potentiometer 760, and DAMP is a damping factor that is empirically determined to yield the desired degree of motion of the frame 624 relative to the beam 626.

From block 852, the computer 834 proceeds to block 854, wherein the computer 834 determines a motor power signal as follows:

power=(error−damping)×GAIN, wherein "error" and "damping" are determined in blocks 750, 752, respectively, and GAIN is empirically determined to yield the desired degree of motion of the frame 624 relative to the beam 626.

The computer 834 sends the motor power signal to the encoder 647 to cause the encoder 647 to apply a voltage to the wheelie motor 646 as appropriate to attain the requested position determined at block 848. The computer 834 then loops back to block 842 to cycle through the loop again.

Although the preferred embodiments of the present invention have been principally shown and described as relating to arcade games, the present invention, including any one of its inventive aspects, may be used for other purposes such as a bicycle training system for athletes or as an exercise machine. In addition, while the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

What is claimed:

1. A vehicle simulator, comprising:
   a frame on which a person can sit;
   a coupler movably connected to the frame;
   a beam movably connected to the coupler;
   a video monitor;
   a computer having a predetermined computer program stored therein, the computer being electrically connected to the video monitor for displaying a changing video image on the monitor in response to the predetermined computer program, the computer also being operably engaged with the frame;
   a control electrically connected to the computer, the control being manipulable by a person sitting on the frame for generating a control signal and sending the control signal to the computer for causing the computer to move the frame relative to the beam in response to the control signal and to change the video display on the monitor in response to the control signal;
   a wheelie motor, responsive to signals from the computer; and
   a cam operably connected to the wheelie motor, the cam also being operably connected to the frame for translating rotational motion of the wheelie motor into translational motion of the frame relative to the beam.

2. The simulator of claim 1, wherein the coupler comprises four links.

3. The simulator of claim 1, wherein the simulator is a motorcycle simulator and wherein the predetermined computer program simulates motion of a motorcycle over a terrain, and wherein the control includes a manually grippable throttle handle rotatably attached to the frame and operably engaged with a potentiometer for generating the control signal, the control signal being representative of the position of the handle relative to the frame.

4. The simulator of claim 3, wherein the throttle handle comprises an annular hollow grip having a wall, a closed end, and an open end, and defining a longitudinal axis, the throttle handle further comprising an elongated shaft disposed within the annular grip coaxially with the grip, the shaft having a first end attached to the closed end of the grip and a second end extending into a portion of the frame.

5. The simulator of claim 4, wherein the frame includes a handlebar having an open end, and the second end of the shaft extends into the open end of the handlebar.

6. The simulator of claim 5, further comprising a potentiometer mounted on the handlebar and operably connected to the second end of the shaft for generating the control signal in response to rotational movement of the grip.

7. The simulator of claim 6, further comprising a support tube positioned in the grip between the wall of the grip and the shaft, the support tube having an end, the end of the support tube being connected to the handlebar.

8. The simulator of claim 7, further comprising at least one bearing positioned between the wall of the grip and the support tube.

9. The simulator of claim 8, further comprising a bracket attached to the handlebar and a screw threadably engaged with the bracket for holding the potentiometer onto the bracket.

10. The simulator of claim 1, further comprising a wheelie member operably engaged with the cam and the frame for interconnecting the cam and the frame.

11. The simulator of claim 5, wherein the motor is electrically connected to an encoder, and the encoder is electrically connected to the computer, wherein the computer generates a wheelie signal to cause the encoder to cause the motor to rotate in response to the wheelie signal.

12. The simulator of claim 11, wherein the wheelie signal is representative of simulated terrain in the predetermined computer program, and the encoder causes the motor to rotate back and forth for moving the frame to simulate passage of the frame over the terrain of the predetermined computer program.

13. The simulator of claim 11, wherein the wheelie signal is representative of the control signal, and the encoder causes the motor to rotate a preselected amount in a first rotational direction for moving the frame to simulate movement of the frame during a wheelie.

14. The simulator of claim 1, wherein the simulator is a motorcycle simulator and wherein the predetermined computer program simulates motion of a motorcycle over a terrain, and the simulator further comprises a handlebar rotatably attached to the frame, a slew generator operably coupled to the frame, and a linkage system interconnecting the handlebar and the slew generator for causing the slew generator to move the frame in response to rotational movement of the handlebar.

15. The simulator of claim 14, wherein the frame has a longitudinal axis and a rear portion distanced from the handlebar, and the slew generator includes an elongated rolling pin rotatably disposed adjacent the rear portion of the frame and oriented with its longitudinal axis generally perpendicular to the axis of the frame, the slew generator also including a motor coupled to the rolling pin for causing the rolling pin to rotate about the longitudinal axis of the rolling pin.

16. The simulator of claim 15, wherein the slew generator further includes a pallet roller connected to the rear portion of the frame and disposed on the rolling pin.

17. The simulator of claim 6, wherein the rear portion of the frame includes a bracket having a forward end connected to the rear portion of the frame and a rear end distanced from the frame, and the pallet roller is connected to the rear end of the bracket.

18. The simulator of claim 17, wherein the bracket is an A-shaped bracket.

19. The simulator of claim 18, further comprising a bearing roller rotatably attached to the rear portion of the frame for supporting the frame.

20. The simulator of claim 19, further comprising a roller spring connected to the rear portion of the frame and the rear end of the A-shaped bracket, the roller spring being in tension to hold the pallet roller against the rolling pin.

21. The simulator of claim 20, wherein the pallet roller has first and second ends and a radial cross-section that is circular in shape, and the diameter of the cross-section taken at a location intermediate the ends of the roller is greater than the diameter of the cross-section taken near either end of the roller.

22. A vehicle simulator, comprising:
a frame having a longitudinal axis on which a person can sit;
a handlebar rotatably attached to the frame at substantially one end of the longitudinal axis of the frame
a slew generator including an elongated rolling pin rotatably disposed adjacent a rear portion of the frame distanced from the handlebar and oriented such that the longitudinal axis of the rolling pin is generally perpendicular to the axis of the frame, a motor coupled to the rolling pin for causing the rolling pin to rotate about the longitudinal axis of the rolling pin and a pallet roller mounted on the frame and disposed on the rolling pin; and
a linkage system interconnecting the handlebar and pallet roller of the slew generator for causing the pallet roller to be disposed on the rolling pin so that the rotational motion of the rolling pin causes the frame to move in response to rotational movement of the handlebar.

23. The simulator of claim 22, wherein the rear portion of the frame includes a bracket having a forward end connected to the rear portion of the frame and a rear end distanced from the frame, and the pallet roller is connected to the rear end of the bracket.

24. The simulator of claim 23, wherein the bracket is an A-shaped bracket.

25. The simulator of claim 24, further comprising a bearing roller rotatably attached to the rear portion of the frame for supporting the frame.

26. The simulator of claim 25, further comprising a roller spring connected to the rear portion of the frame and the rear end of the A-shaped bracket, the roller spring being in tension to hold the pallet roller against the rolling pin.

27. The simulator of claim 26, wherein the pallet roller has first and second ends and a radial cross-section that is circular in shape, and the diameter of the cross-section taken at a location intermediate the ends of the roller is greater than the diameter of the cross-section taken near either end of the roller.

28. The simulator recited in claim 22, further comprising:
a coupler movably connected to the frame;
a beam movably connected to the coupler;
a video monitor;
a control manipulable by a person sitting on the frame for generating a control signal; and
a computer having a computer program stored therein, the computer connected to the video monitor for displaying a changing video image on the monitor in response to the control signal and the computer program, the computer also connected to the control engaged with the frame for causing the frame to move relative to the beam in response to the control signal.

29. The simulator of claim 31, wherein the coupler comprises four links.

30. The simulator of claim 28, wherein the simulator is a motorcycle simulator and wherein the predetermined computer program simulates motion of a motorcycle over a terrain, and wherein the control includes a manually grippable throttle handle rotatably attached to the frame and operably engaged with a potentiometer for generating the control signal, the control signal being representative of the position of the handle relative to the frame.

31. The simulator of claim 28, further comprising a wheelie motor and a cam operably connected to the wheelie motor, the cam also being operably connected to the frame for translating rotational motion of the wheelie motor into translational motion of the frame relative to the beam.

32. The simulator of claim 31, further comprising a wheelie member operably engaged with the cam and the frame for interconnecting the cam and the frame.

33. The simulator of claim 32, wherein the motor is electrically connected to an encoder, and the encoder is electrically connected to the computer, wherein the computer generates a wheelie signal to cause the encoder to cause the motor to rotate in response to the wheelie signal.

34. The simulator of claim 33, wherein the wheelie signal is representative of simulated terrain in the predetermined computer program, and the encoder causes the motor to rotate back and forth for moving the frame to simulate passage of the frame over the terrain of the predetermined computer program.

35. The simulator of claim 33, wherein the wheelie signal is representative of the control signal, and the encoder causes the motor to rotate a preselected amount in a first rotational direction for moving the frame to simulate movement of the frame during a wheelie.

36. A throttle handle for a vehicle simulator, comprising:

an annular hollow grip having a wall, a closed end, and an open end, and defining a longitudinal axis;

an elongated shaft disposed within the annular grip coaxially with the grip, the shaft having a first end attached to the closed end of the grip and a second end;

a handlebar having an open end, wherein the second end of the shaft extends into the open end of the handlebar, the handlebar being attached to the vehicle simulator;

a potentiometer mounted on the handlebar and operably connected to the second end of the shaft for generating a control signal in response to rotational movement of the grip indicative of rotational movement of the grip; and a support tube positioned in the grip between the wall of the grip and the shaft, the support tube having an end, the end of the support tube being connected to the handlebar.

37. The throttle handle of claim 36, further comprising at least one bearing positioned between the wall of the grip and the support tube.

38. The throttle handle of claim 37, further comprising a bracket attached to the handlebar and a screw threadably engaged with the bracket for holding the potentiometer onto the bracket.

* * * * *